United States Patent [19]

Hruschak et al.

[11] 3,790,958

[45] Feb. 5, 1974

[54] DATA COMMUNICATION TERMINAL

[75] Inventors: Joseph P. Hruschak; George R. Ellis, both of Fairport, N.Y.

[73] Assignee: Xerox Corporation, Stamford, Conn.

[22] Filed: Sept. 9, 1971

[21] Appl. No.: 179,136

Related U.S. Application Data

[63] Continuation-in-part of Ser. No. 74,095, Sept. 21, 1970, abandoned.

[52] U.S. Cl. .............. 340/172.5
[51] Int. Cl. .............. G06f 3/04
[58] Field of Search .............. 340/172.5

[56] References Cited

UNITED STATES PATENTS

| | | | |
|---|---|---|---|
| 3,411,142 | 11/1968 | Lee et al. | 340/172.5 |
| R26,984 | 11/1970 | Hirvela | 340/172.5 |
| 3,340,515 | 9/1967 | Little | 340/172.5 |
| 3,348,209 | 10/1967 | Brooks | 340/172.5 |
| 3,414,888 | 12/1968 | Gehrmann et al. | 340/172.5 |
| 3,417,377 | 12/1968 | Victor | 340/172.5 |
| 3,431,559 | 3/1969 | Webb | 340/172.5 |
| 3,540,004 | 11/1970 | Hansen | 340/172.5 |
| 3,541,527 | 11/1970 | Rhodes | 340/172.5 |
| 3,587,044 | 6/1971 | Jenkins | 340/172.5 |

*Primary Examiner*—Paul J. Henon
*Assistant Examiner*—John P. Vandenburg

[57] ABSTRACT

A data communication terminal including a storage device having a capacity of *n* characters. In the compose mode of operation wherein the input to the terminal is a random data source, such as from a keyboard, the input data stored in the storage device is automatically monitored to determine the number of characters stored therein. If the number of characters stored is greater than a predetermined maximum block size of *yn* characters, a data block comprising *kn* characters is prepared for transmission to an output device when $k \leq y < 1$. If the block of *kn* characters is received without error by the output device, the block of *kn* characters is cleared from the storage device, or, alternatively, the block of *kn* characters is retransmitted to the output device.

12 Claims, 51 Drawing Figures

INVENTORS
JOSEPH P. HRUSCHAK
GEORGE R. ELLIS
BY Irving Kesch...
ATTORNEY

PATENTED FEB 5 1974 3.790.958

SHEET 08 OF 31

DATA COMMUNICATION TERMINAL

RELATED APPLICATIONS

This application is a continuation in part of U. S. application Ser. No. 74,095, filed Sept. 21, 1970, and now abandoned.

BACKGROUND OF THE INVENTION

Prior art data communication terminals are operated in the input, or compose, mode by either one of three general techniques. In the first technique, generally known as on-line keying, typed characters are transmitted at the keyboard operator's keying rate, thereby monopolizing the transmission channel and severely limiting the number of terminals per circuit. In the second technique, known as buffered keying, the typed input data is accumulated by an electronic buffer and then transmitted as a complete block. However, the message size is limited to the capacity of the buffer. In the third technique, known as off-line keying, a high capacity medium such as paper tape or magnetic tape is employed. This technique requires media-handling, may result in long transmissions which monopolize the transmission channel, may introduce a substantial delay in the keying-to-transmission interval, and is generally uneconomical.

Another disadvantage of the prior art data terminals is in the interface between the keyboard operator and the terminal. For example, assume that the operator is utilizing a terminal which operates on the buffered keying technique. Further assume that the electronic buffer has a capacity (typical capacities range from about 500 to about 1,500 characters) of 600 characters. However, the particular message being composed in this example requires 1,000 characters. Since the capacity of the buffer is 600 characters, the keyboard is "locked" as the 600th character is entered into the buffer, the 600 characters being transmitted when polled by a network controller. The keyboard is then "unlocked" and the remaining 400 characters in the message may be then typed into the now empty buffer. The 400 characters are then transmitted when the terminal is subsequently polled.

As can be readily observed, this procedure is time consuming and more importantly, places more demands on the operator to account for the interruptions during the compose mode.

SUMMARY OF THE INVENTION

The present invention provides a novel data communication terminal which utilizes a novel technique for overcoming the disadvantages of the prior art techniques described hereinabove.

The terminal of the present invention contains an electronic data storage medium, or buffer which, although finite in capacity, is controlled in such a manner that it normally appears infinite to the keyboard operator. At averaging keying rates, the operator may enter data continuously as if she or he had sole use of the system and as if the data is being transmitted directly to a remote network controller, or computer, without interference to or from other terminals which may be connected onto the same multiterminal communications circuit. There are no limits on message lengths or (within the total traffic handling capabilities of the system) no limits on the number of simultaneous users. Because of the "transparent" nature of the buffer to the operator, the operator does not have to be trained as to its intricacies or even to be made aware of its existence.

The effect of unlimited capacity is achieved by operating the buffer as if the ends were connected together to form a circular configuration. Input data is begun at an automatically assigned index point and subsequent entries progress from that location. The total, actual, capacity of the buffer is available for data entry until the starting point is again reached. However, progressive segments of data are made ready for transmission and as the earlier segments are transmitted the space that they occupied is again made available for data entry. Several minutes of continuous typing would be required to completely fill the buffer, but this is normally ample time for the computer to poll the terminal a number of times and expunge the buffer of previously-entered data (where each data block is transmitted and acknowledged in the order of entry). In the rare cases where typed data does fill the buffer, perhaps due to momentary system overloading, the keyboard will be disabled and an indicator will be presented until buffer space again becomes available.

The buffer control circuitry allows a message of a predetermined block size, such as 512 characters, to be transmitted in its entirety. Messages of greater lengths will be automatically segmented into blocks of up to the predetermined block size. More than one such message or block may be accumulated by the buffer prior to a poll and transmission sequence. The order of transmission is as entered. The computer will generally retain the blocks of a segmented message until the final block of that message is received, as detected by control codes, prior to forwarding the message to a preselected destination.

Transmissions from the computer to the terminal will also comprise messages or message-blocks up to approximately the predetermined block size. A message of any overall length may be transmitted by the use of successive blocks and transmission to another output device to maintain continuous or near-continuous operation.

In particular, the present invention provides a relatively small amount of electronic storage, for example, 1,024 characters using a delay line or other storage medium, and yet appears to the operator as virtually "infinite" buffer. This is achieved by organizing the buffer or storage, in ring fashion (where the functional end is connected back to the beginning) and automatically assigning a block area, e.g., 512 character positions, for data entry. Upon the filling of the block area or upon the entry of an "end of message" code or function, the data in the block is made ready for transmission. The operator is immediately assigned a contiguous area and entry may continue without interruption. Transmission of the previous data will occur when the terminal is polled by the computer or controller (which controls the communications to/from all associated terminals and circuits). The previous storage area is again made available for entry when the computer notifies the terminal of a successful transmission. Hence, message segments of up to the block capacity are transmitted and assembled by the computer. As the terminal is typically polled every few seconds, and a minute or more is required at normal keying rates to "fill" the entire storage area, storage space should always be available for continuous keying.

The "infinite buffer" storage concept described hereinabove, in addition to the advantages already set forth provides:

1. a facility for operator correction or alteration of data prior to its commitment to the communications channel, and
2. an automatic retransmission feature for data detected to be in error.

It is an object of the present invention to provide an improved data communications terminal which includes a dynamic storage element that is controlled in a manner such that an operator may enter information into the terminal at a substantially continuous rate without tying up the communications channel due to the interleaving of data-block transmissions to/from the various terminals as controlled by a network controller, such as a digital computer.

It is another object of the present invention to provide an improved data communications terminal which includes a dynamic recirculating buffer, or memory, the buffer being controlled in the "compose," or transmit mode, such that the length of any individual transmission is restricted to some maximum block length less than the total storage capacity of the buffer.

It is still a further object of the present invention to provide an improved data communications terminal which includes a dynamic recirculating buffer, the buffer being controlled in the input, or compose mode, such that all transmissions from the terminal are automatically restricted to some maximum block length less than the buffer capacity. Messages exceeding the maximum block length are automatically partitioned into additional blocks. The "filled" block is transmitted before the remaining storage of the buffer is filled.

It is still an object of the present invention to provide an improved data communications terminal which includes a data buffer, the finite capacity of the buffer appearing "infinite" to a key operator to allow substantially continuous keying without interruption to complete a message.

It is still a further object of the present invention to provide an improved data communications terminal which includes a recirculating delay line or other static or dynamic storage medium for storing data therein, the terminal retransmitting data to a remote data sink, such as a network controller, if the initial data transmission was received in error by the data sink.

It is an object of the present invention to provide an improved data communication terminal including a storage device having a capacity of n characters. In the compose mode of operation, wherein the input to the terminal is a random data source, the input data stored in the storage device is automatically monitored to determine the number of characters stored therein. If the number of characters stored is greater than a predetermined maximum block size of yn characters, a data block comprising kn characters is prepared for transmission to an output device wherein $k \leq y < 1$. If the block of kn characters is received without error by the output device, the block of *kn* characters is cleared from the storage device, or, alternatively, the block of kn characters is retransmitted to the output device. Upon the successful transmission of the first entered data block of kn characters, a contiguous storage area is immediately made available for the continuation of data entry; one or more blocks of data may thus be entered and delimited. Since the last position of storage space is logically and functionally made contiguous to the first position of storage, data entry progresses through storage in a continuous, or "circular," manner.

DESCRIPTION OF THE DRAWING

For a better understanding of the invention as well as other objects and further features thereof, reference is made to the following description which is to be read in conjunction with the accompanying drawing wherein:

FIG. 9*ba* illustrates the distribution of the access locations within the recirculation registers.

DESCRIPTION OF THE PREFERRED EMBODIMENT

GENERAL DESCRIPTION

Figure 1A:
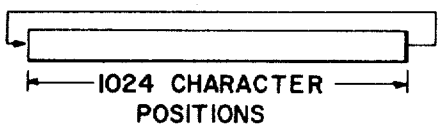
FIGS. 1*a* and 1*b* are simple schematic diagrams depicting the arrangement of the buffer utilized in the present invention.

All transmissions, to or from the terminal, are to be automatically restricted to some maximum block length. This maximum transmission-block length size in the preferred embodiment is selected to be 512 characters in length, including text and control information. Such a block size is chosen for two basic reasons: (1) to allow a certain level of "system efficiency" to be maintained (such that no one terminal may monopolize the system and to provide a good compromise between overhead and useful information), and (2) the assumption that the majority of entire messages (e.g. 90%) will fall within that block size thereby minimizing the number of segmented messages and the associated editing and queuing requirements imposed upon the central computer.

The approach using blocks places no limit on the maximum message length. "Long" messages, exceeding the block size, will be automatically partitioned, or segmented, and the resulting blocks will be handled essentially independently. For "short" messages, one to 512 characters in length, each such message may be treated as a block, for transmission purposes, or, in other systems, multiple "short" messages may be "packed" together with intervening delimiting codes to form an overall block meeting the 512-character limit or less.

The fact that up to 512 characters may be accumulated, from any combination of consecutive "short" or "long" messages being composed, does not limit total operator entry to this number. One of the primary goals of the present invention is to permit continuous entry of information without interruption "lock-outs," or other apparent delays which would hinder composition. To accomplish this the terminal is provided with more than 512 characters of buffering. The basic concept of the present invention is to allow the operator to continue to compose should a "block" be filled, on the premise that that block will be transmitted (and the buffer space again made available) before the operator can "fill" the remaining space. This finite, total, buffer space will then appear to be "infinite" to the operator; i.e., it can never be filled. In practice, of course, the filled condition might arise due to unusually heavy traffic demands or because of a system malfunction. However, under normal circumstances (or even with normal peak traffic) such a "filled" condition will not occur more than some very small percentage of the time (e.g., 1 percent of the time). Even in such a case there will be no loss of data; the operator will be merely inconvenienced by a "lock-out" of the keyboard or other input device.

The total buffer space is selected to be 1,024 characters, or twice the maximum transmission-block size. While the total space need not be an integral multiple of the block size for keyboard-input, certain advantages are to be gained when the same buffer is utilized for reception. A single buffer, then, will permit efficient operation in either a "compose/transmit" mode or a "receive" mode. This half-duplex nature of the terminal is sufficient from a performance standpoint and minimizes both the total buffer requirements and the associated logic circuitry.

Buffer Organization and Usage

The total buffer space of 1,024 characters may be viewed as "cyclic" in nature, where the physical or functional end is connected back to the beginning. The dynamic storage device utilized in the present invention is a recirculating magnetostrictive delay line although any compatible dynamic recirculating buffer may be utilized, such as a MOS shift register or, with appropriate interface modifications, a static device (e.g. magnetic core array, monolithic solid-state devices) may be utilized. The buffer may then be depicted in the manner shown in FIG. 1*a*.

Figure 1B:
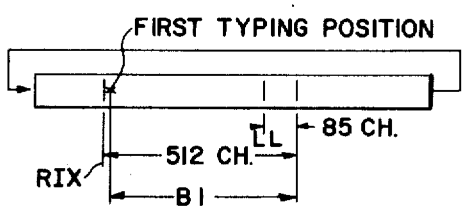

When the operator begins to compose, a space of 512 characters will automatically be allocated by the control means for the first message or message partition. The boundaries of this space are indicated by a reference index (RIX) indicating the start location and block envelope B1 delineating the field of subsequent 511 locations allocated. The operator is allowed to make corrections on the current type-line and the detection of an "end of line" indication to the logic circuitry implies that the just-completed line is ready for transmission. To insure that this feature is always observed, and that a typeline is not "split" for transmission, the logic creates a third buffer boundary reference (LL) representing the last line. Considering a type-line (maximum) of 80 characters, and that an "end of line" or carriage return (CR) code is stored, the LL reference is set 85 characters from the end of the B1 field. Hence, a CR detected anywhere after LL and before the last location of B1 will make that block ready for transmission, albeit up to 85 characters shy of the 512-character maximum. This is depicted in FIG. 1*b*.

Composition and Transmission

The operator may begin composing, with each keystroke causing a code to be stored in contiguous order from the RIX, or index location. A correction procedure will permit any one or more characters on the current type-line to be corrected or deleted in storage. Each CR will be stored taking previously-entered data from the control of the operator, and the entered data will be packed in the available space. A type-line may comprise from zero characters (CR's only) to 80 characters.

While a CR will indicate that the associated typeline has been "released" for transmission, either one of two other conditions must be met to allow transmission to take place upon a subsequent poll from a remotely located network controller: (1) at least one "ending" code has been entered from the keyboard or (2) a CR has been entered within the LL-B1 area prior to the entry of an ending code. Two types of operator-ending codes are available, to be used as appropriate. The "normal" ending condition is created by actuating an end of message key on the keyboard. Where the operator may wish to temporarily terminate a partially-composed message, due to an interruption, or to allow an awaiting incoming message to be received and printed, a temporary end key on the keyboard is activated. For illustration, two cases are described which essentially cover all possible cases.

First, consider the entry of a "long message" (greater than 512 characters). The operator will compose until a CR is detected within the LL-B1 area, defining a message segment suitable for transmission. Subsequent keyboard entry will be stored adjacent to the transmission segment and composition may continue. Any time thereafter, upon being polled, the terminal will transmit the first block through the last CR position located in the LL–B1 area. Upon acknowledgment from the network controller that the block has been received without error, the first block-space will be expunged and the original reference repositioned relative to the next block in storage. If negatively acknowledged, i.e., the block was received with errors, the block may be retransmitted. The objective, of course, is to complete the transmission sequence before the operator has filled the current space; at an average typing rate of 4 char/sec, for example, about 1.8 minutes are available for this. The sequence may continue ad infinitum until the operator signifies the completion of the message by depressing the end of message key or by signifying a partial completion by depressing the temporary end of message key.

For a second case, consider that the operator is entering a "short" message or successive short messages. Prior to being polled, each message will either be treated (for transmission purposes) as an individual block or, alternately (in certain system configurations) as if they were portions of a single message. When polled, transmission will occur from the first block time through the most recent ending-code position. In this manner, "short" messages will always be transmitted in their entirety; this minimizes the network controller overhead required to assemble fragments of messages. If multiple short messages are ready within the buffer, they are optionally transmitted individually or as a group upon a poll. Upon completion of a successful transmission sequence, the buffer reference will be "relocated" to encompass the next untransmitted composition area.

Receiving

The data communications terminal of the present invention includes a receive mode of operation wherein a data block at a time is transferred from the transmission line to the buffer storage, the block being subsequently read out of the buffer storage to the printing mechanism or other output device.

Since the terminal has 1,024 characters of space available, the first block received (of up to 512 characters) will leave at least 512 character spaces available. If the first block is received error free, the controller is acknowledged and may send a second awaiting block. A second such block may now "fill" the terminal buffer if the first block has not been completely printed or transferred to a designated output device.

In the preferred embodiment of the invention the terminal operates in a half duplex mode i.e., receiving and transmitting is not done simultaneously.

DETAILED DESCRIPTION

The term "input device" will be utilized to represent an input data source such as a keyboard, punched card reader, etc. which forwards data to be stored in the buffer via the storage control module of the present invention and the term "output device" will be utilized to represent a device, or data sink, such as a digital computer, terminal printer, card punch, etc. which receives data being transferred from the storage control module.

In general, the storage control module of the present invention is a part of a data communication terminal which includes an interface module which interfaces the input and output devices and the storage control module. The storage control module of the present invention is a module which essentially acts as a dynamic buffer for the input device, formatting and modifying the data as directed, while translating the input data rate and format into the output device data rate and format. The input data transfer rate is controlled by the input device and the output data rate is controlled by the output device.

In the description of the present terminal, a common bus approach will be utilized. This gives all the I/O devices and the storage control module a common input and output bus and enables the same input and output lines to interact with other terminal modules. The basic terminal module that controls the transfer of information between input devices, the storage control module and the output devices is called the central control unit or CCU. The CCu polls all the I/O and storage devices within the terminal presenting an address and poll code on the input bus of each module. The module whose address is presented on the input bus responds to the CCU with a control code. For example, some of the responses translated by either an I/O device or module could be: no response indicating there is nothing to transfer; an enter-mode command. The enter-mode command will essentially prime the terminal for data transfers and includes such information as whether or not data is going to enter storage control from a low speed random access device (i.e., from a keyboard) or from a fairly high speed device in a pre-blocked data format (from a remote computer). The enter-mode command also tells the terminal printer whether or not it can operate in the low or high speed mode and addresses the output device which is to receive information. The enter-mode command is issued by the input device to the output device which, in turn, will either transfer data to a remote device or store (digitally or graphically) the data presented by the input device.

Responses to the CCU poll command may take the form of a status/command response. The status/command response essentially tells the CCU that a particular addressed terminal module has a command or status which is to be translated out to the output bus of the CCU and subsequently to the input bus of the other modules. A status/command is either geared for a specific module or has a general impact on all modules. The status/command is either responded to by one device or by all devices.

Data transfers are set up by responding to the CCU with a data transfer request code. Only the SCM and the input device respond with a data transfer request. The CCU responds by permitting the data to be transferred from the SCM or input device to the module input bus, encoding the data as data is transferred to or from the SCM.

The CCU polls all devices and looks for a response on its input bus and acts upon that response if that response indicates that information is to be translated between modules and/or the input and output devices. The CCU directs data flow and essentially acts as a pair of transfer gates to gate that information from the device that the CCU has addressed to all the other modules so that the information is available to any device which is on the bus. The CCU allows the modular concept to be applied towards a data terminal by essentially giving a common I/O interface for all the devices, and sets up a standard mode of interaction between devices by issuing certain commands for translating information between input device, output device and the SCM.

Figure 1C:
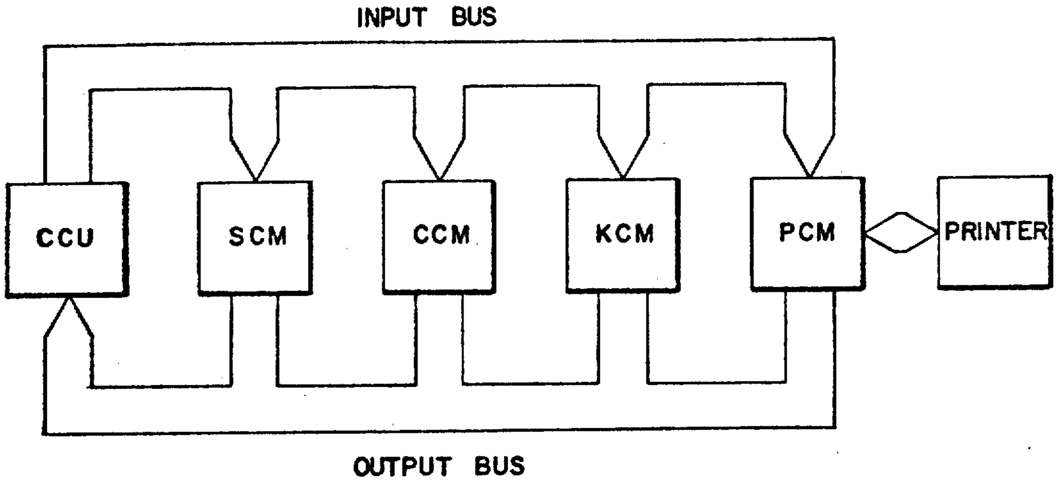
FIG. 1*c* is a block diagram illustrating the common bus technique utilized in the data terminal of the present invention.

The basic modules that may comprise the terminal are the KCM, PCM and the CCM, in addition to the SCM and the CCU described above, The KCM, or keyboard control module, simply interfaces the keyboard, the random compositional type data interface that an operator composes information with, to the storage control module and output device. The PCM, or printer control module, interfaces the printer to the CCU module bus. The SCM is a storage control module. The storage control module is a device which acts, as set forth hereinabove, as a device for storing and formatting information from the input device and forwarding it to the output device on command and also acts as the speed translator between input and output devices. In the description of the present terminal, all data transfers must go through the SCM and then to the ancillary devices. The CCM, or communication control module, effectively is the interface between the module bus and data set interface usually destined to the remote data sink, such as a digital computer functioning as a network controller. The CCM simply synchronizes the information with the data set and information to or from the computer. The discussion set forth hereinabove describing the devices and modules connected to the CCU has been briefly described to show their general interaction with the SCM, which is the subject of the present invention. FIG. 1*c* is a block diagram illustrating the common bus technique utilizing the modules as described hereinabove.

The SCM will now be discussed in terms of the basic functions and modes of operation thereof. The first mode of operation, or Mode 1, signifies that the input device entering information to the SCM is of low speed random input compositional type data source, such as from a keyboard, and sending information to an output device which accepts information in accordance with a predetermined block format. The block format accepted by the output device is essentially equivalent to the message format compiled by the input device. By format we are referring simply to that specific set of codes which delimit the various fields of information for a message or message block. For example, a control, or start, code represents the start of a message and delimits the beginning of an address field where the address field contains the address information for the final destination, the other code delimiting the end of the address field and, of course, the beginning of the message field. The final format codes required for the message or message block formatting are the end or temporary end codes. A normal message comprises one message block and transmission sequence, the message block starting with a start of address field code followed by an end of address code, a start of message code and finally an end of message, or character field code. The transmission sequence is that set of transmissions sequentially sent from the terminal or accepted by the terminal which are sent in one batch process, batch process describing one mode of operation. A transmission sequence really comprises one complete message, messages of one block of the type described hereinabove in a transmission sequence would comprise one transmission block and that block would be one message.

A transmission sequence could also contain various different blocks of data. These blocks could be many message segments comprising one message being of the format described above. Blocked information would be information starting with a start-of-address field code followed by an end-of-address field/start of message code followed by a temporary end code. That field of data delimited by the start-of-address code and temporary end code would delimit one message block of a particular transmission sequence. The complete message would comprise multiple transmission blocks and would be transferred in one transmission sequence. Each successive block would begin with a start of message code which would be specifically a start code delimiting the beginning of a message block. The end of block code would then either terminate that message and transmission sequence or terminate a specific transmission block within the transmission sequence. The message block which is terminated by an end of message code would differentiate the end of a complete transmission sequence and of course differentiate the end of complete message. The SCM fits into this transmission sequence of events because Mode 1 operation interfaces a keyboard or other random access type compositional device with an output device where the output device only accepts pre-blocked data, data which comprises data blocks that fit the format just discussed. The SCM insures that the information being transferred from the keyboard to the output device fits the format of the output device.

Information which is presented by the compositional random access type data input device via the KCM enters the SCM memory and the SCM monitors the information stored in the memory to determine message length by sensing end of the message and end of line codes. Once sufficient information to comprise a message block is stored, the SCM begins retrieval and sets up a data transfer with the output device at the same time information is being inputted by the input device so that the input device essentially is already communicating with the output device. As information is keyed in, the operator assumes that that information is transferred through the communication interface and out to the destination device. The SCM monitors the information as it comes into it and stores it in the buffer memory. The SCM then monitors the information stored in the buffer memory and makes a decision when enough information has been presented to the SCM to comprise a data block transfer. The amount of information necessary to comprise a data block is determined by monitoring the information placed in the buffer. Determination is based upon having an end code stored or an end of line code stored in storage at a location sufficient to automatically partition that message in multiple blocks and to begin a data transfer. The SCM attempts to set up a data link between itself and the output device as soon as possible. It does this so that it can delete or expunge storage of the first in information presented to it by the keyboard as quickly as possible so that it can keep as much vacant storage ahead of the operator as possible. This enables the operator to keep composing, without interruption, as long as desired.

The KCM type input device is allocated message control by the SCM on a line at a time basis due to printer limitations. Line at a time control refers to the ability of the keyboard operator to modify characters within a line of type.

At this point, the storage and retreival of information will be discussed. The technique utilized in the present invention for accessing a delay line is to utilize various types of marker codes within the delay line.

Figure 2:
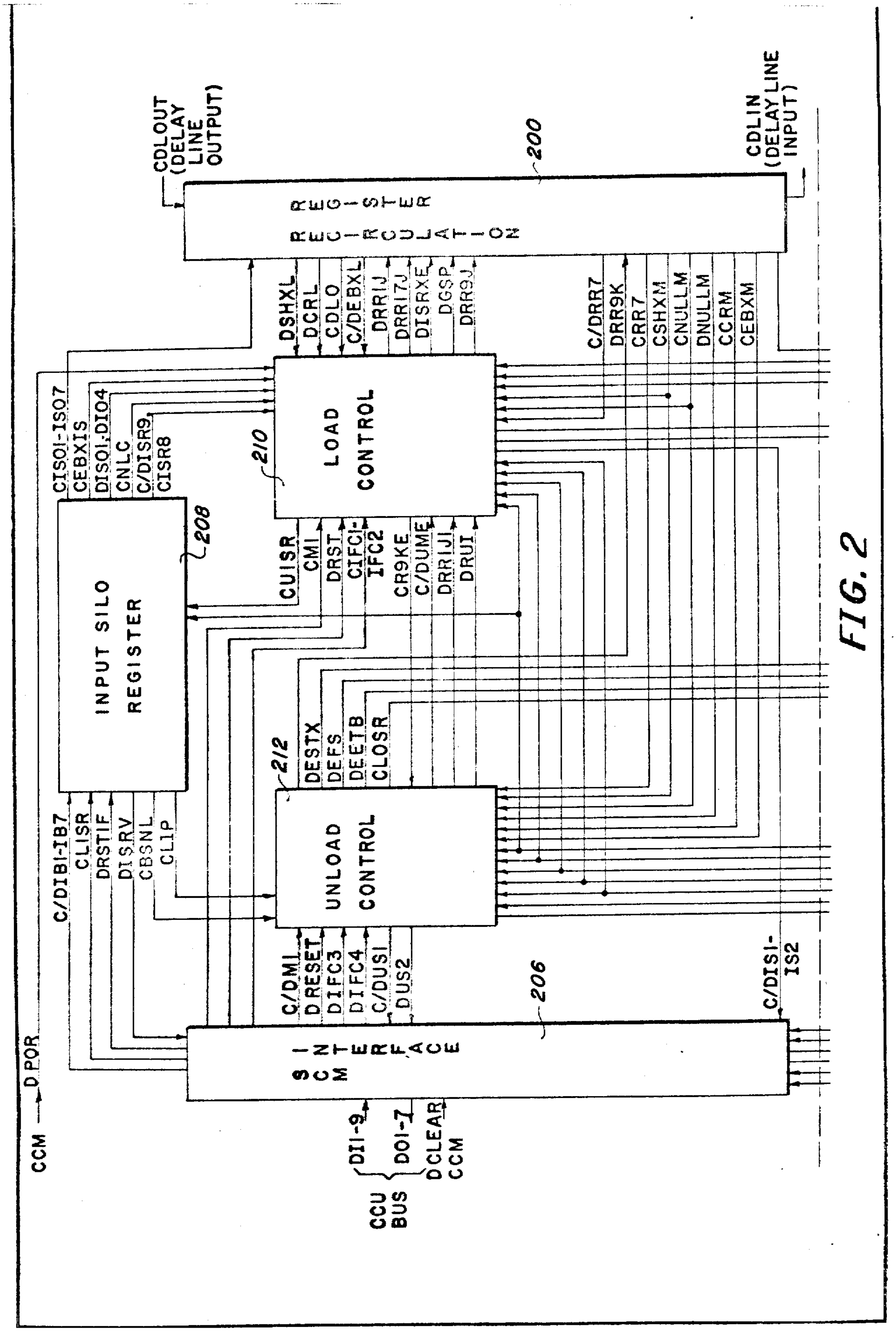
FIG. 2 is a block diagram of the novel storage control module utilized in the data communication terminal of the present invention.

Referring now to FIG. 2, there is shown the block diagram of the storage control module utilized in the data communications terminal of the present invention. Data within a recirculating delay line, utilized as the storage buffer in the preferred embodiment of the invention, is circulated through recirculation register 200. Asociated with the recirculation register 200 is a time base and tracking counter 204. The tracking counter 204 keeps track of the bit position of accessible marker bits that move along the delay line and keeps track of the character words which are accessible along the delay line. The tracking counter 204 sets up a reference marker bit indicating an index location. A reference marker, or index location, is generally utilized with a recirculating type buffer. The index reference is a specific count from the tracking counter 204. This count, for the purpose of the present description, is selected to be the all zero count. Of course, any count can be used and is associated with that location we call index. The first-in information, or the first information presented to storage, is always relative to the index location such that the first character is stored at index and subsequent characters stored in location 2, location 3, etc. following the index location. The index location will be referred to as location 1. Location N will be referred to as an arbitrary location within the delay line, N plus 1 being one location removed from that arbitrary location. The tracking counter 204 synchronizes the control logic of the terminal with the information in the delay line, in that it tells the control logic when to start searching for data in the delay line. The index location is the relevant reference point for the terminal control logic. The marker bits keep track of the storage locations which represent the current load and unload locations as will be described hereinafter.

The recirculating delay line of the present invention is selected to have a capacity of 1,024 characters. The characters stored are 7-bit characters. A memory word comprises a 7-bit character plus one marker bit, such that the effective memory word length is 8 bits, the marker bit plus character bits. The marker bit precedes the word as it flows from the serial recirculating delay line memory such that the first bit of the memory word sensed is the marker bit. The next bit of the memory word is the most significant bit of the encoded data in storage, etc.

The SCM time base and tracking counter 204 is arranged so that the time base, a divide by eight counter which divides the length of the memory word into 8-bit increments, gives synchronization on a bit basis with the data that flows through the recirculation register from the delay line. The information that flows is accessible at specific time periods relative to the time base. The time base therefore comprises eight time slots, each time slot being associated with the location of data bits as information moves serially through the register and is accessible by the control logic. Data is transferred into or out of the delay line during the eighth time slot. A decision is made to operate on the data at time slot seven and carried out at time slot eight. This gives us bit synchronization and allows data to be moved relative to the trailing edge of a timing clock pulse.

The marker bit location is used to designate the current load position and current unload positions. A load position is defined as that position in memory at which the next data available for storage into memory will be stored. The unload position is termed that position in memory at which the next piece of data which is to be retrieved will be retrieved from.

Describing the use of marker bits, assume reset conditions with a vacant storage media. The initial data inserted, for example by keyboard operation, would be the start of address field marker, or control code. That particular character will be transferred to the SCM. The SCM then searches for one of two events, the existence of a marker bit, which could be uniquely defined as a load position marker, or the absence of a character stored at the index location. Since the delay line has been assumed to be initially cleared with no data in the line, all the storage locations of the delay line will be set at zero. Therefore, no load position marker bit is located within the delay line and the character will be stored initially at the vacant index location. At the same time that the character is stored in the index location, a marker bit is inserted into the first bit location next to the index location, this location being the marker bit location of the next accessible memory word. This location is the next load position and that particular marker bit will be designated the load position marker. It is uniquely the load position marker and not the unload position marker because concurrently an unload operation is not going on and the only marker that exists in memory is the load position marker. The control logic, as described hereinafter, knows this and correspondingly views that particular marker bit as the load position marker. The next character that is inserted in memory will then go into the location adjacent to the index location which has that marker bit and at the same time the information is loaded into storage that marker bit associated with that current data word which is being loaded will be removed or expunged from storage and then be transferred or set up into the next storage location which will, of course, be the third location in memory.

Effectively, as data is stored into memory, a zero is inserted into the marker bit location associated with the accessible memory word and a one is inserted into the next marker bit location of the next storage location, as the information moves by in a serial manner, the memory words being adjacent to each other. An eight-bit memory word consisting of a 7-bit character and the corresponding marker bit location is so modified concurrent with the insertion of marker bit in the next memory word defining the next load position illustrates that nine-bits are being inserted (or changed) in storage for each input character inserted. As the information is stored in memory and is compiled, sufficient information will be accumulated such that the SCM will begin an unload operation, the unload logic always beginning unloading at the index location. This is essentially a first-in/first-out mode of operation, so that the information first stored will be the information first retrieved. The control logic is therefore arranged to retrieve the information at the reference index, insert a marker bit in the next location (the location adjacent the index location), and generates a control signal UME (Unload Marker Envelope). This control envelope, or signal, controls the logic as follows: when UME is present, any marker bit which falls within the field of data overlapping the UME control signal represents the unload position marker. As the information is retrieved, the unload marker moves within the delay line as each data word is retrieved from storage. During this time, the only thing changed within the delay line is the marker bit, the marker bit being expunged from one location and put into the next adjacent location. The marker bit, corresponding at this time to the unload position, goes from location N to location N + 1. The data is not destroyed during the unload operation because, in accordance with the teachings of the present invention, the data may have to be retransmitted.

The unload control marker envelope always exists from index to unload position marker. When sufficient data is retrieved, the unload logic stops moving the marker bit, the unload control signal (UME) is removed and the load logic is signaled that any position marker found in the rest of memory is a load position marker.

Summarizing the operation of the storage and retrieval operation, a tracking counter 204 associated with the SCM tracks the information around the delay line by setting up a reference index location. The procedure for finding load/unload locations utilizes marker bits. Each marker bit represents one bit of storage associated with each memory word. The marker bit is interlaced with the memory word at a specific location. As information is loaded into storage, Information is initially loaded into the index location, the marker bit being inserted into the next location. The marker bit is moved as the load locations are moved and as data is inserted. Information is unloaded initially from the index location and a field of search is produced as the unload marker is moved. This field of search, or unload marker envelope, delimits the unload from the load field. A control signal is generated which gates out the load control logic from looking in that field which is associated with the unload control.

At the completion of an unload operation, when information is transferred from the delay line to the output device, the output device has control of the information presently in storage that it has received. It makes the decision whether or not it wants to retransfer the information. It can then call for a re-transferral of the information from the SCM. Because of this, the information which has been unloaded from the SCM is never destroyed until it is determined whether or not the output device wants a subsequent transfer of the same information. When the information transferred from the SCM to the output device is sufficient for its purposes, in other words that is the last transferral of information, the output device commands the SCM to clear the information within the buffer by a status command code. The SCM then proceeds to clear all information stored between the current index location and the current unload position marker location.

Clearing will occur from the index location to the unload position marker, clearing all information stored between those two points up to and including the unload position marker. At the time the unload position marker is found, a general reset signal is sent to the tracking counter 204 which resets the counter to the index location such that the storage location following the last storage location cleared or the location which was occupied by the unload position marker will then be set up as new index reference point and all the operations going on relative to the delay line will then be done by referencing the new index location.

In Mode I operation, automatic partitioning occurs very simply. The automatic partitioning logic is set up as part of the unload control logic. The unload control logic, as it is retrieving, or unloading information, will be sampling the data which it is unloading and looking for an end code. If the end code is not retrieved, it will then sample to find out whether or not the code that it is presently retrieving is a new line code within the last 85 character locations of the first 512 character locations of storage referenced to the index location. A flip-flop in the unload control logic is set up to constantly monitor the first 512 locations looking for a final end code or temporary end code inserted in the data's stream by the keyboard operator. If that code is present in memory the unload control logic is set up such that it will bypass automatic partitioning and will retrieve the information up to and including that end code which it finds within the first 512 character locations in memory. If, however, there is no end code within the first 512 character locations in memory prior to the decision for entering an unload operation, the decision for entering an unload operation is made on the basis of sampling the last 85 character locations in the first 512 character locations in memory, or the character locations between the 427th and the 512th character locations, to look for a new line code. If a new line code is found within that section of the memory, the unload control logic will be activated and begin unloading information to the output device. While retrieving, if the keyboard operator has still not inserted an end code in the data stream in the first 512 character locations in storage, then the control logic is set up to automatically partition the information at the first new line code it finds between the 427th and the 512th character location. If the new line code that is found is a carriage return code (CR) designating the end of a line either within the address or the message field, then, that carriage return code is replaced at the end of that message by an encoded (such as ASCII) control code ETB, representing the end of a transmission block, as the data is being retrieved. Upon retreival of the next block, the carriage return code is replaced with a start of message code so that the output device has a suitable format code to begin the next data block. If the code that is found between the 427th storage location and the 512th storage location is a code which delimits the end of the address field meaning that the address field was 427 characters or longer, and the end of message code has not been sensed, then the logic sets up a two-code sequence to tell the output device that it did the automatic partitioning and adds a control code representing the end of the address field to the output data of the partitioned data. When the logic begins transferring information for the second block, the output device is informed by the start of message field control code that this is the second or subsequent block of the particular partitioned message.

Mode II operation involves an input device, which is of a pre-blocked formated type. The information which is produced by the input device will be already formated and there will be no need for automatic partitioning of messages. The buffer will always be treating messages which are equal to or less than 512 characters in length. The basic difference in organization of the SCM for the Mode I and Mode II operations appears in the algorithm for finding the load and unload character locations and the algorithm for differentiating the number of messages in storage. In Mode I operation wherein information is continuously stored such that the data bits are piled up adjacent to one another, there are only two points of reference, the unload position marker and the load position marker, the unload and load position always being well differentiated by the unload control logic. In Mode II operation, many message blocks may be coming into storage, each of short duration, i.e ten, twenty, thirty, forty or fifty characters in length stacked up adjacent to one another. There is no problem differentiating the first-in information because that will always be loaded at the current index location. The basic problem of Mode II operation is defining the start of the last entering message data block within storage. An accounting scheme is utilized which keeps track of information which has been transferred from the input device and put into storage waiting for transfer to the output device. The input device, in Mode II, has control of the information on a block basis, a block basis meaning that line cancel, backspace, forward space etc. will not be required.

The information stored in Mode II, being stored into the delay line, always starts at the index location, assuming a device operating in Mode II begins loading information into a completely vacant delay line. The first character presented to storage will therefore be loaded into the first character location. Subsequent characters are stacked up one behind another just as in Mode I.

The basic difference between the load position in this mode of operation and load position in Mode I operation is that without any correction procedures it is assured that the load position will always be at a vacant location such that the memory can be sampled and asked if there is a marker bit at a location which is vacant or if the index location is vacant. An affirmative response on either one of the two questions defines that current location as the load location. An unload marker envelope is still utilized, as in Mode I, to define the unload field. When information is presented into storage to be forwarded to the output device, a bit is inserted into the marker bit location of the first character location of that particular message. This bit indicates that this message is valid (free of errors) and is to be forwarded to the output device. With many messages stacked up for the output device, the net effect is that one or many messages may be compiled into storage which has a marker bit in its first word location. The location of a bit in the marker bit location the first word of a message differentiates it from the current message or message block being compiled by the input device. The message or message block being loaded into memory by the input device will not have a marker bit at its start of message memory word location. A start message location can easily be differentiated from any other location in memory because it will either be (1) at the index location or (2) at that location which is uniquely described as a location which has an end-of-message code followed by a start message code. A two-code sequence, or two location sequence of an end-of-message code followed by a start-of-message code is sufficient to uniquely differentiate the beginning of a message.

SCM BLOCK DIAGRAMS

Referring now in detail to the block diagram of the SCM shown in FIG. 2, the SCM interface 206 interfaces the SCM to the CCU bus, the CCU bus controlling the interaction of the input and output devices with the SCM. The CCU transfers all status/command codes from the SCM to the other terminal modules. For example, the SCM interface via the CCU signals the input device when the recirculating delay line is full and cannot accept any more information, tells the output device when a message is available for transfer from the SCM, controls the transfer of information from the input device into the SCM input registers, etc. The input silo, or storage, register 208 is basically a three character storage register which stores data received from the input device until access to the delay line occurs and then operates in a predetermined manner to move information into the recirculation register 200 and into the delay line. The information that comes from the input device is gated by SCM interface 206 into the first of the input silo registers and then propagates through the input silo registers into its last stage where it is available for loading into the delay line. Load control logic 210 monitors the input silo register 208 to determine if information is available to store in the delay line. When information is presented at the input silo register 208, load control logic 210 will transfer this information into the recirculation register 200. Load control logic 210 also functions to differentiate the load position marker from any other marker within the delay line. The load control logic 210 does this in conjunction with unload control logic 212 by mutual differentiation of their fields of search. Recirculation register 200 is a 17 bit register required to access the delay line. The 17 bits in the recirculation register comprise the remaining 17 bits of storage. In other words, a delay line which has 8,175 bits of storage capacity and the 17 bits of storage of recirculation register 200 gives the total 8,192 bits of storage capability of the terminal. The recirculation register 200 is essentially a serial shift register required to access the delay line and monitor information stored within the current access location and the location preceding the access location as required to operate sufficiently on the stored data. The unload control logic 212 controls the transfer of information from the recirculation register 200 into six character output buffers located in output silo, or storage, register 214. The output silo register 214 stores data retrieved from the delay line for transfer to the output device. If essentially takes the information which is first into it (from the recirculation register) and presents it as the information first out (via SCM interface 206 and the output device). Thus, the output silo register 214 and the delay line are used on the first-in/first-out basis. The time base and tracking counter 204 provides the basic time base for the SCM to operate. The tracking counter sets up the index reference location and sets up the field of search for the delay line including fields of search for message partitioning, overflow and buffer full.

Figure 2A:
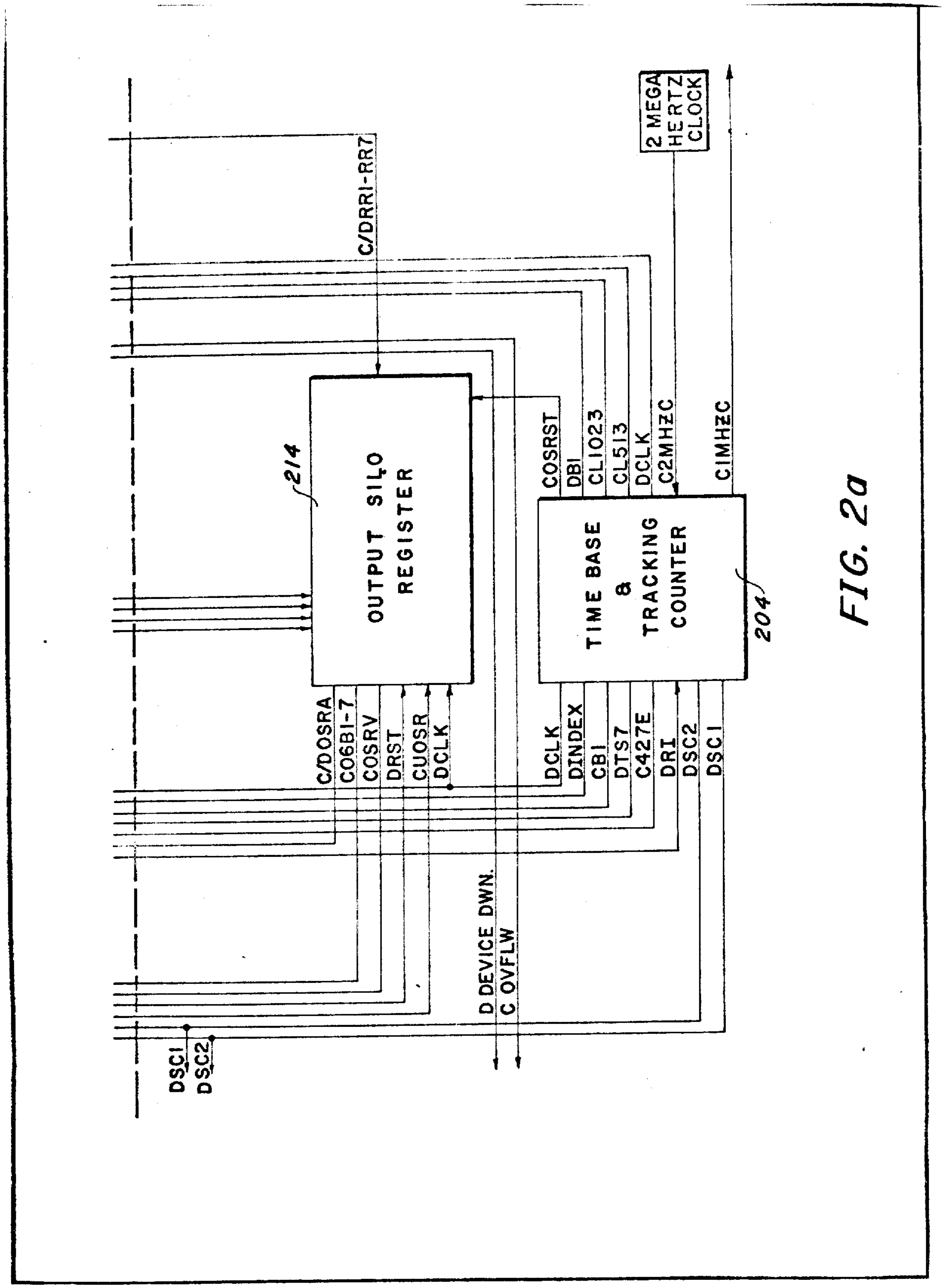
FIG. 2*a* is a continuation of FIG. 2.

It should be noted that the recirculation register 200, load control 210, unload control 212 and time base and tracking counter 204 are the only elements necessary to access and control the delay line which in actuality is the object of the present invention. The other elements have been set forth to complete the description of a SCM module utilized in a data communication terminal. The labeled reference leads shown in FIGS. 2 and 2*a* and the other block diagrams will be defined with reference to the description of the schematic diagrams of FIGS. 9*a* – 9*gg* set forth hereinafter.

Figure 3:
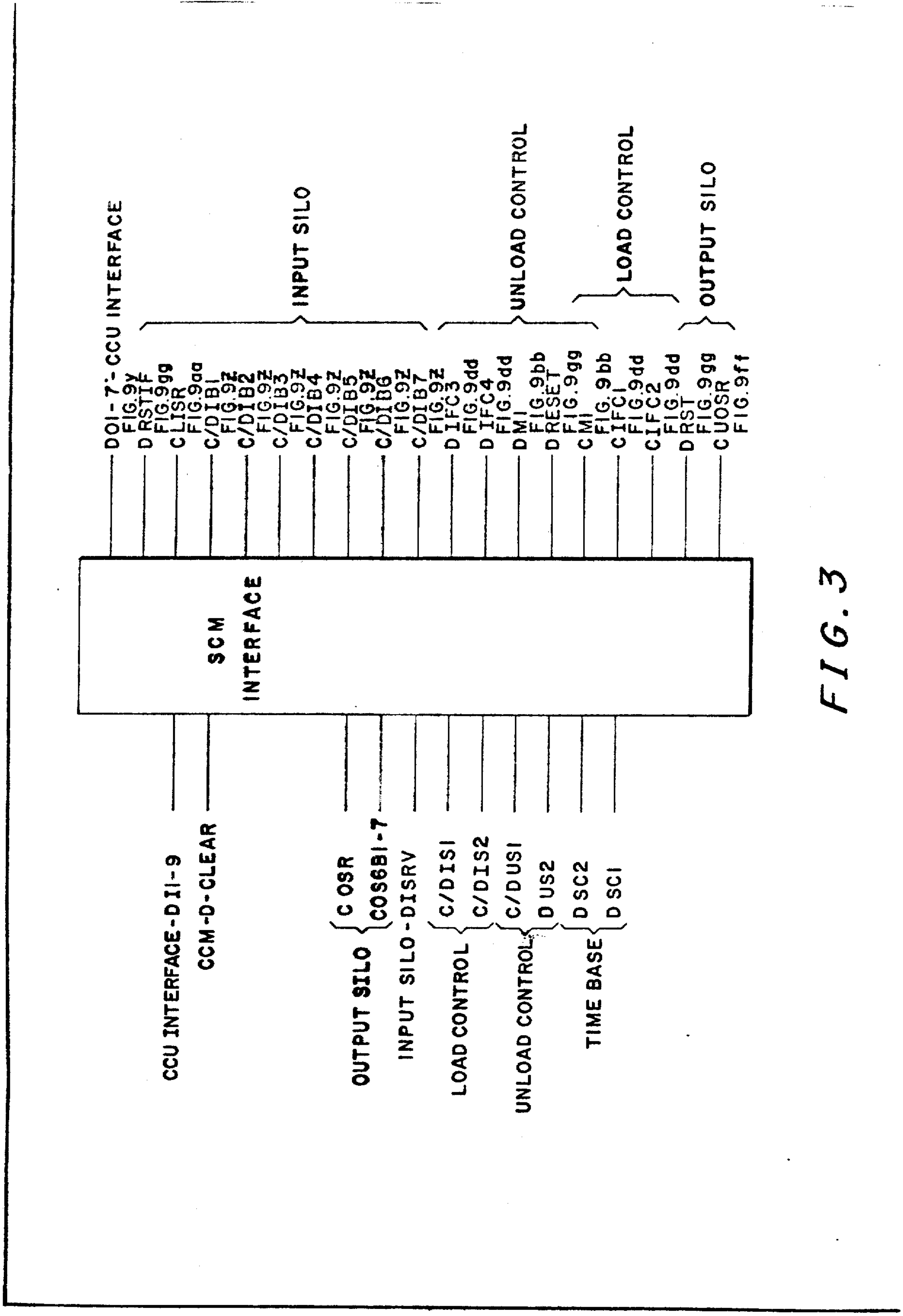
FIG. 3 illustrates the inputs to and outputs from the storage control module (SCM) interface.

FIG. 3 illustrates the basic SCM interface block and defines the inputs and outputs necessary for module interaction. Outputs D01 through 7 represent seven lines D01, D02, D03, D04, etc. through D07, which are coupled to the CCU interface. The signals below that interact with the input silo register 208, the unload control logic 212, the load control logic 210, and the output silo register 214. The inputs are similarly designated. Inputs DI1-9 represents nine lines DI1 through DI9. C0S6B1-7 represents seven signal lines C0S6B1 through COS6B7. C/D IS1 represents both signal polarities for the signal called IS1, CIS1 being the most positive signal designation while DIS1 represents the most negative signal designation. On all lines inputing and outputing the SCM interface, attached drawings and all schematics, C will always represent a logic 1 while D represents a logic 0 for positive logic notation.

Figure 4:
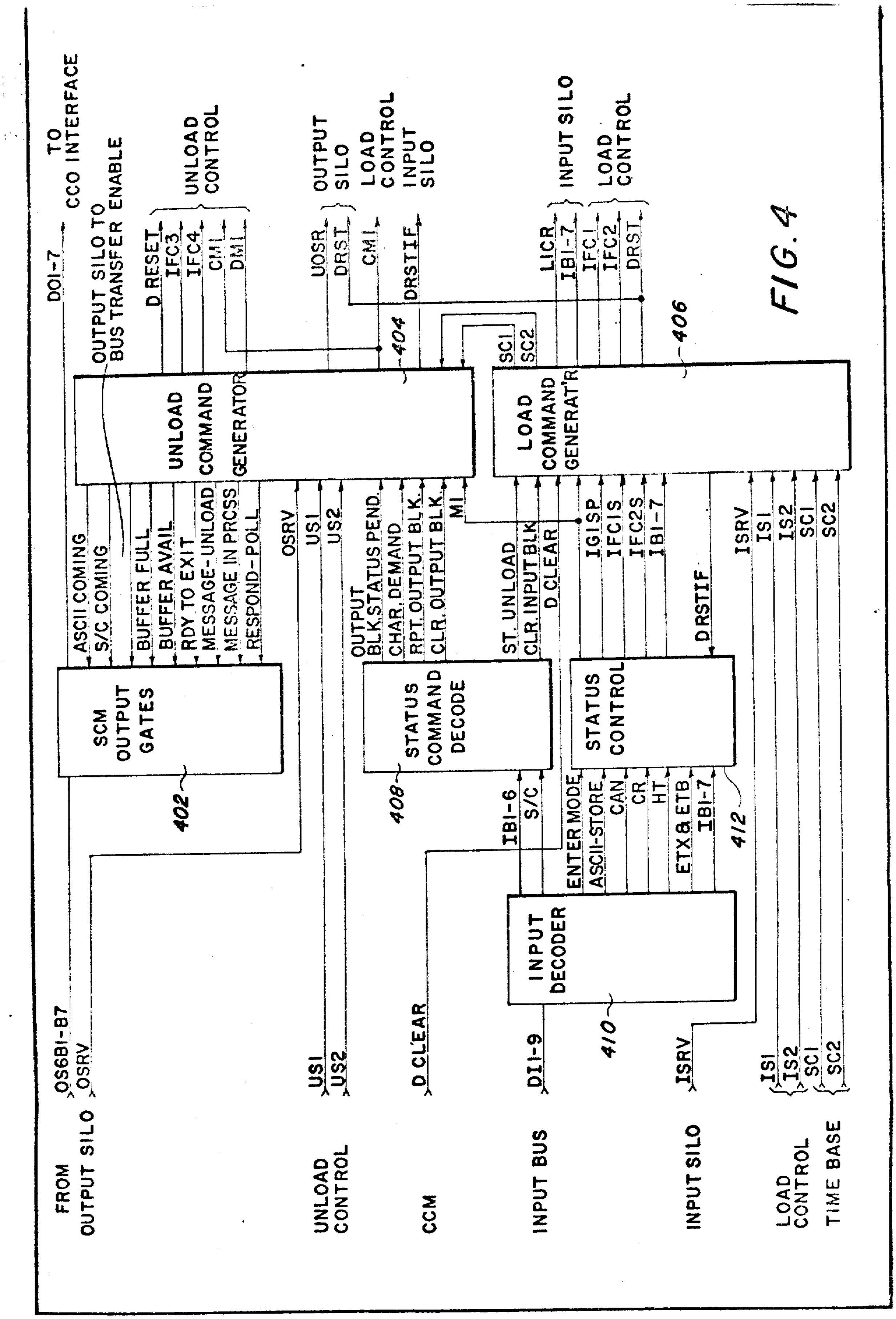
FIG. 4 is a block diagram of the SCM interface.

FIG. 4 represents a block diagram of the SCM interface 206. The SCM output gates 402 represent those gates which gate status/command codes and data out to the output bus. The unload command generator 404 represents that portion of the interface which interacts with the unload control logic 212. IFC3, IFC4 represent coded interface command lines. The load command generator 406 represents that portion of the interface which interacts with the load control logic 210. IFC1 and IFC2 are coded interface command lines. In Mode II operation, when the signals on lines IFC1 and IFC2 are 1, load command generator 406 has issued a start unload command. Start unload represents a status-command code which indicates that the information being loaded into the delay line may be forwarded to the output device. In Mode II operation where information has been loaded into the SCM by an input device and the input device determines that the information is valid and should be forwarded to the output device, the input device will issue a start unload command. A start unload command is then interpreted by the interface and transferred to the load control logic 210. The start unload command instructs the load control logic 210 to mark the beginning of that message so that it can be unloaded. If the signal on line IFC1 is set to 0 and IFC2 is set to 1, the input block is cleared from storage.

IGISP is a signal line which represents input status pending, indicating that the load command generator 406 is awaiting a status/command code telling it what to do with that block of information just transferred to storage. IGISP is set to 1 when a block termination code is received and reset to a zero when the input device command, start unload or clear input block, is completed and a suitable response issued The unload command generator 404 has signal lines IFC3 and IFC4 which indicate the reception of a status/command code instructing the logic as to the status of the output block. If both the signals on lines IFC3 and IFC4 are set to 1 (positive), the output block is to be cleared. If the signal on line IFC3 is set to a 0 and the signal on lead IFC4 is set to a 1, the output block is to be repeated.

Status command decode 408 decodes the information on the input bus. Input decoder 410 decodes infomation representing the status/command codes and the ASCII character information. Status control 412 controls the status between the terminal modules and controls the priority of events to occur, insuring that the status is sent to the output bus in the proper sequence.

Figure 5:
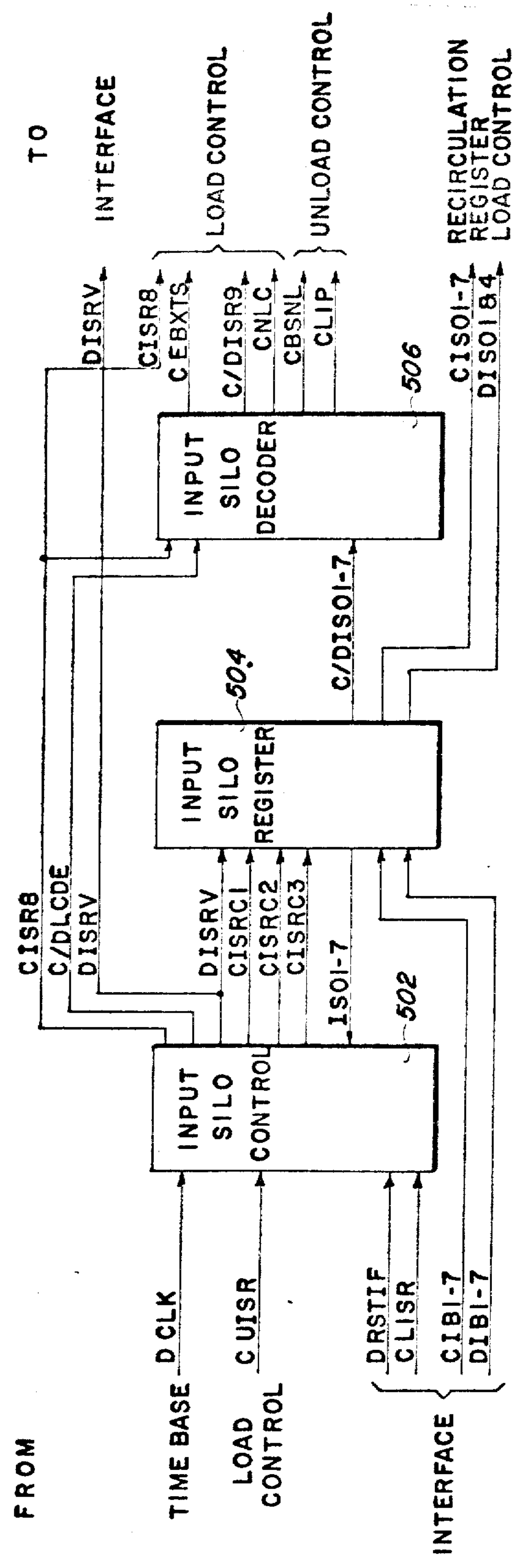
FIG. 5 is a block diagram of the input silo register.

The block diagram of the input silo register is shown in FIG. 5. Input silo control 502 is a tracking register which keeps track of the portions of the silo storing valid and the true data. Input silo register 504 comprises three character storage registers. Input silo control 502 has three control flip-flops. When each flip-flop is set to a one, it indicates that the particular register associated with that control flip-flop has true and valid data stored in it and the character is to be loaded into the delay line. Input silo decoder 506 decodes information from the last register of the input silo register 504 and indicates to the load control whether or not it is a normal character of a character representing a buffer sub-routine. These buffer subroutines are applicable to Mode I line correction operation. For example, the input silo decoder (1) decodes backspaces and directs the load control to do backspace in memory, (2) senses a two character sequence defining a line cancel and it directs the load control to do a line cancel operation, and (3 ) senses a forward step code (ASCII DC3) and directs the load control do a forward step operation.

Figure 6:
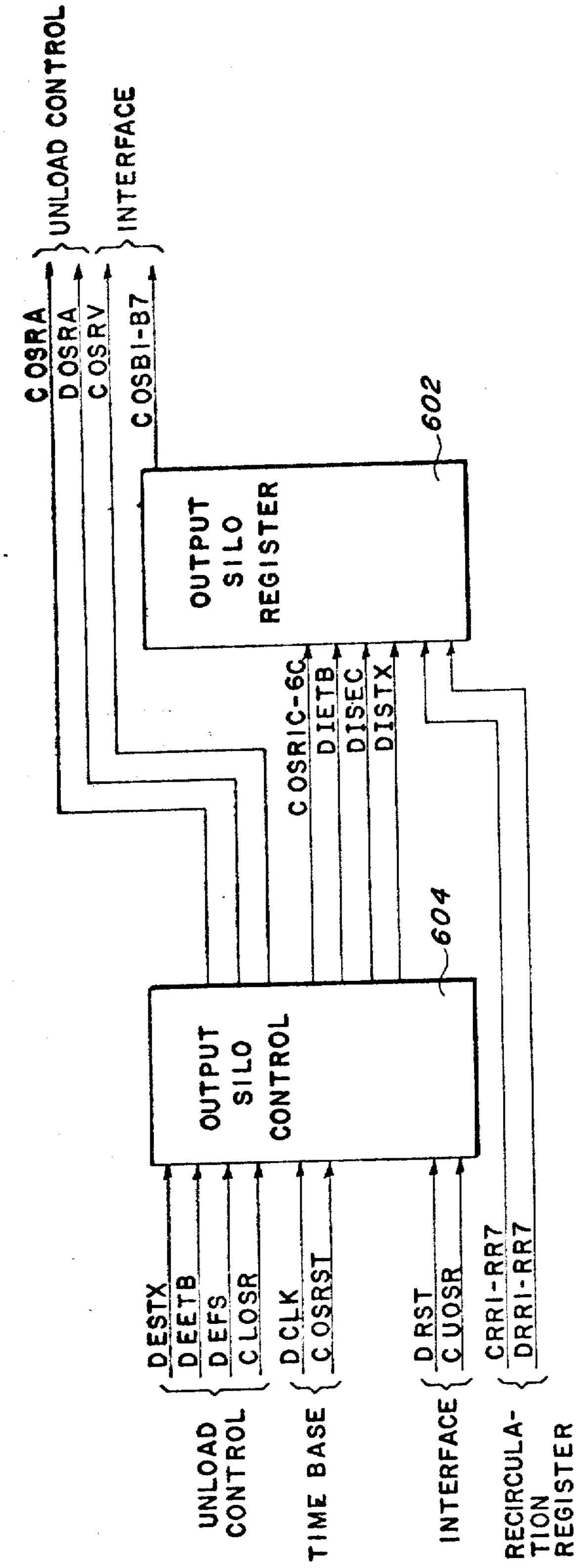
FIG. 6 is a block diagram for the output silo register.

FIG. 6 represents a block diagram of the output silo register 214. Output silo register 602 is a six character storage register. Output silo control 604 comprises six flip-flops, one associated with each register, which indicates whether or not information is deemed true and valid in the particular register.

Figure 7:
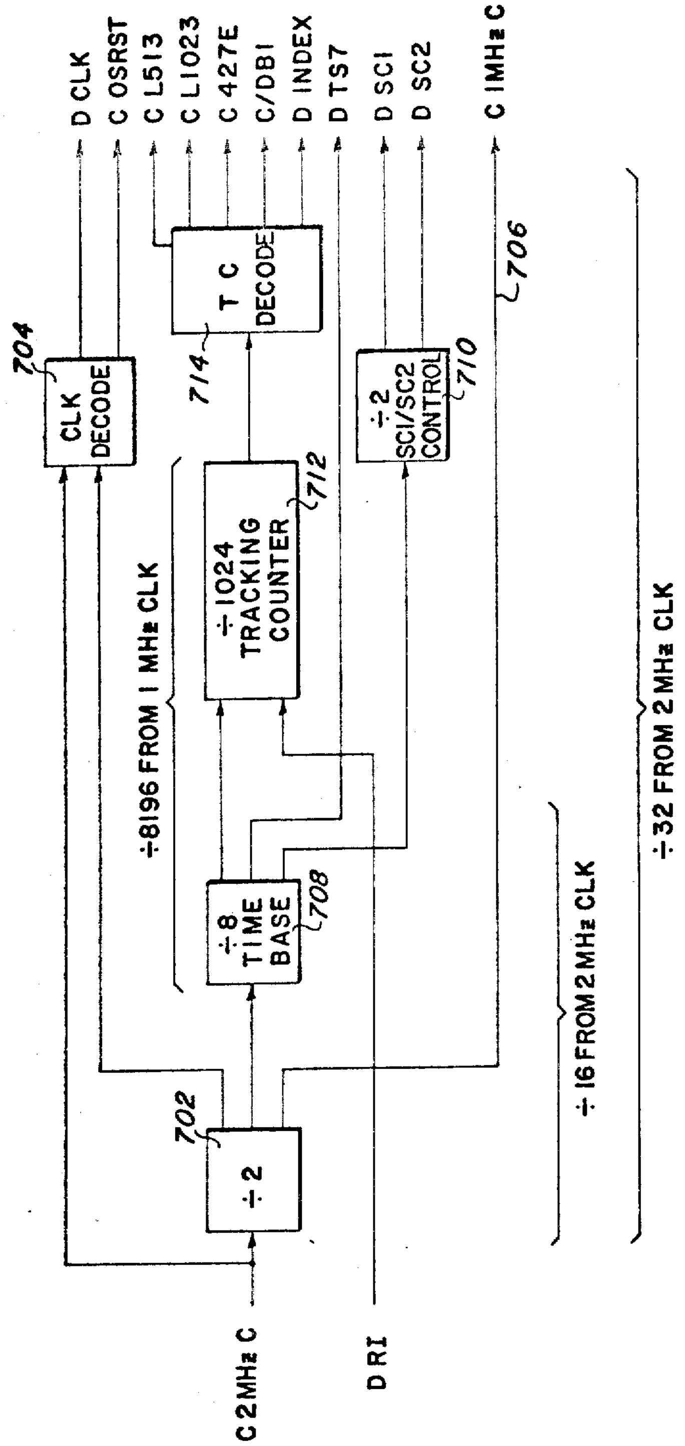
FIG. 7 is a block diagram of the time base and tracking counter.

Time base and tracking counter 204 represents the basic time base for the terminal. FIG. 7 illustrates a block diagram of how the time base operates. A divide by two counter 702 counts down the 2MHz clock, shown in FIG. 2, into a clock decode 704 which produces the CLK signal. CLK is a signal which is active for 250 nanoseconds and inactive for 750 nanoseconds and represents the basic clock signal used by the SCM control logic. The clock signal on line 706 is available for the delay line and is used to clock information in and out of the delay line. In particular, it clocks the information coming out of the delay line into a data flip-flop at the output of the delay line thereby synchronizing the delay line with the recirculation register clock CLK. SC1 and SC2 are the bus interaction clocks having a period of 16 microseconds and represent the basic clocks used for module interaction within the terminal. The SC1 and SC2 clock signals are out of phase from each other by 180 degrees and are active for only 500 nanoseconds out of the 16 microsecond period. The divide by eight time base 708 is used in conjunction with divide by two counter 710 to set up the SC1 and SC2 clock signals. The output of the divide by eight counter 708 corresponds to TS7 time which corresponds to the seventh time slot on an eight slot time base. The seventh time slot represents that time where all decisions to operate on data are made. The logic is set up so that that at the next clock time, equivalent to TS8, it acts on the decision made at TS7 time. A divide by 1,024 tracking counter 712 is reset by RI signal, RI being the reposition index signal, which resets counter 712 to the index location whenever the clear operation has been completed. As set forth previously, the output device commands the clearing of the output block. TC DECODE 714 generates five output signals, the first of which is INDEX, the reference index location. The second signal, B1, essentially differentiates the first 512 character locations from the last 512 character locations. The third signal, 427E, is a control signal, or envelope, encompassing the 427th through the 512th character locations (LL–B1). The fourth signal, L513, is equivalent to index location storage block 2 and it indicates where the second half of memory begins. The fifth signal, L1023, represents a signal envelope encompassing the last two character locations for use in a buffer full condition in Mode II and overflow condition of Mode I.

Figure 8:
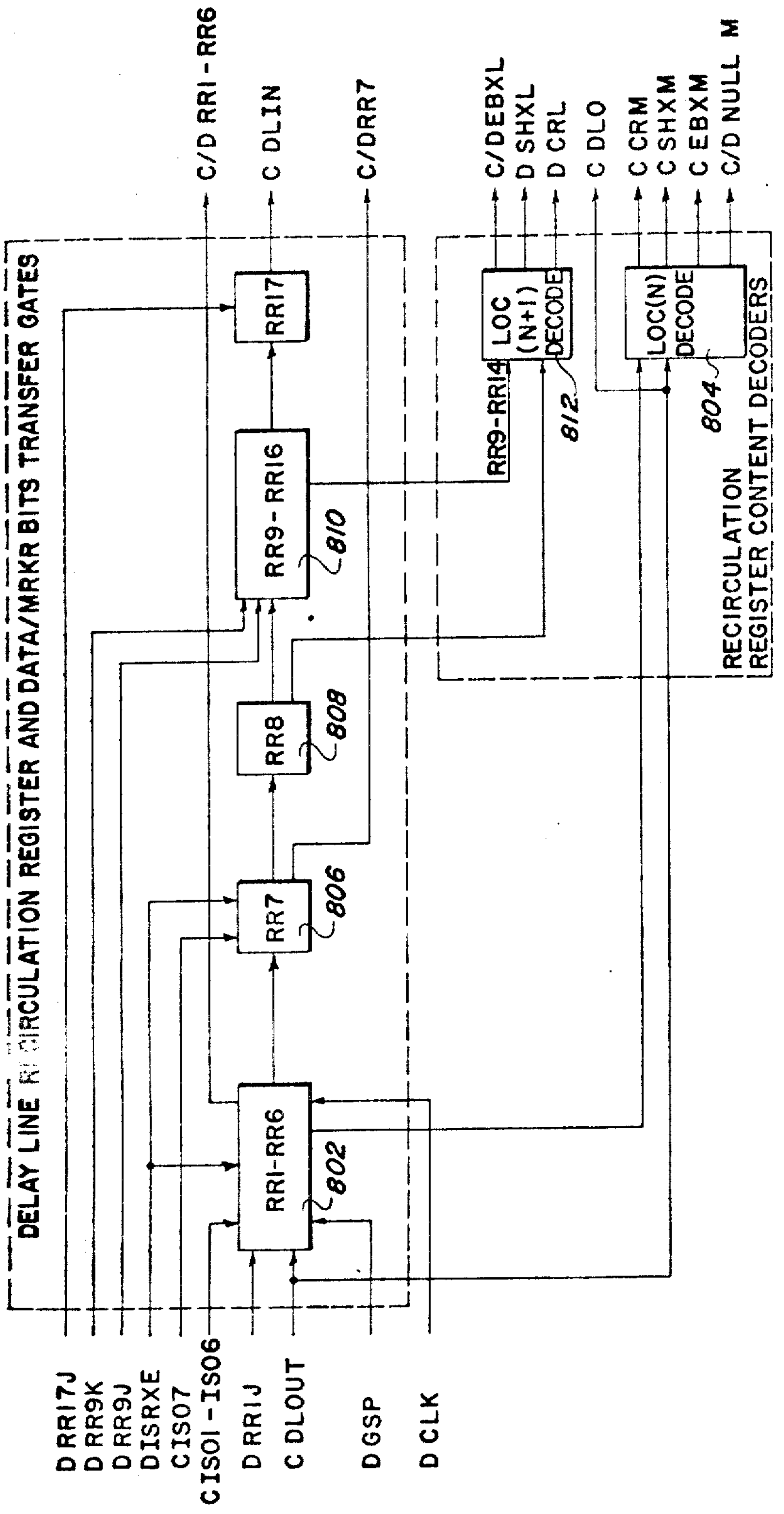
FIG. 8 is a block diagram of the recirculation register.

Referring now to FIG. 8, a block diagram of the recirculation register is shown. Block 802 represents a six bit serial register RR1–RR6, RR1 through RR6 representing 6 bits of the current access word at TS7 time. Decoder 804 monitors the bit information from the delay line, DLOUT, and block 802 to decode various control codes within the stored data. For example, signal NULLM represents a completely vacant storage location and EBXM represents that particular location is stored with an end of message code, either temporary or final end, this information being used by the unload control logic when it retrieves that particular end of message code. SHXM represents a start of address field code or start of message code and is used by the control logic to determine that that is a potential start of message code. CRM indicates that the current access location is loaded with a new line code. CDLO represents the delay line output and is shown inverted from the original input applied to register 802.

RR7, the output signal from register 806, represents the marker bit location at TS7 time. Register RR8, represented by block 808, and registers RR9–RR14, included in block 810, are coupled to the input of (N + 1) location decoders 812. These decoders decode the control code CRL, representing a new line code, and SHXL representing a start of or end of header control code. These decoders are used in the backspace operation, In particular, backspacing through the delay line is stopped when attempted at a new line code location. EBXL represents an end of message code. In Mode II operation, the combination of EBXL active and SHXM active indicates that the current access location represents the start of a message within the delay line. In other words, that start of message is at a future index location somewhere within the delay line. DLIN represents the delay line input and is the information presented directly to the delay line. RR1–RR6 and RR7 are the signals generated by their associated registers which go directly to the output silo register and represent the 7 bits of the encoded character at TS8 time which are gated into the output silo register. DCLK is the 2MHz clock signal used to clock the recirculation register. DGSP is a signal which generates a space code within the recirculation register when a forward step operation is being performed in Mode I. If we are forward stepping over a location that does not hold any information, the load control logic inserts a space code into the recirculation register. RR1J is a singal which is used for setting the marker bit at location (N + 1) at TS8 time whenever we transfer information into or from the recirculation register. RR9K is used in conjunction with RR1J and is the signal which expunges from storage the load position marker or unload position marker at location N. RR1J and RR9K are the two signals which move the load position marker through memory. RR9K is also used for clear operations whenever clearing information from the delay line. RR17J and RR9K, used in conjunction with one another, provide a backspace operation in memory such that the net effect is to move the marker bit backwards in memory. ISRXE is a control signal which loads the recirculation register with information from the input silo register. The recirculation register is basically a serial register, however, when IRXE is active, the recirculation register is loaded in parallel synchronously with the information that was in the input silo register. IRXE is normally only active for one microsecond and temporarily gates the recirculation register into a parallel mode, the recirculation register returning to the serial mode after IRXE becomes inactive.

MODE I – LOAD OPERATION

There are five types of load operations that occur in Mode I. They are, (1) a normal data character store, (2) a new line store, (3) a forward step operation, (4) a backspace operation, and (5) a line cancel operation.

A normal data character store operation begins when a character enters the SCM into the input silo register and propagates into the third character register thereof and is presented to the load control for storage in the delay line. The load control interrogates the output of the input silo register to determine what type of a storage operation is to be performed. Once the load control determines that a character is in the input silo to be stored in the delay line, the load control searches for the load position marker to determine the access location. Once the load position marker is located, the load control transfers the word from the output of the input silo register into the recirculation register for entering into the delay line. As the character is loaded into the recirculation register, the load position marker is propagated from the current access location to the next access location. The load control determines the load position marker by sampling the content of the recirculation register looking for a marker bit coincident in time with TS7 at RR9 (806) and outside the field of data contained within the unload field. Once the first access location for a data character has been located, the load control can continuously load characters into the recirculation register in sequence as the characters are available. The capacity of the input silo register determines the number of characters which can sequentially be loaded into the recirculation register, one behind the other.

When a new line code is presented to the load control for storage into the delay line, the load control samples the access location to determine the position of the new line code relative to the data which was previously stored. The memory control algorithm dictates that anew line code be stored in an access location which is void of data. This is to ensure that the new line code will not be written over any information stored at the access location. An attempt is made to correlate the information as displayed by the terminal printer with the information in the delay line by ensuring that the new line code will be inserted at the end of the printed line. In the event that the operator has performed a sequence of backspace operations and corrected a few characters, it is possible that the operator could insert a new line code without positioning the print head to the last character location of the line. For this reason, a series of forward step operations is done in memory if the access location contains a character, until a void location is located to store the new line code.

A forward step operation is indicated by the ASCII (American Standard Code for Information Interchange) character code DC3, an arbitrary choice of many of the suitable control codes available in ASCII code and not predefined by the machine control logic. It should be noted that the data operated upon in the SCM may be encoded in any suitable binary code, such as the aforementioned ASCII code. The forward step operation would be used by the keyboard operator to reposition herself, after a correction sequence in which several backspace operations have occurred, back to the original starting position or while repositioning herself to correct several characters within a print line. A forward step operation is done in memory by moving the marker bit forward in memory from the current access location into the next access location without destroying any information stored at the current access location. If the access location is void of information and a forward step operation has been requested, then the load control assumes that the operator is using the forward step key in a repeat mode to move forward in the line and position herself with several spaces on paper. Prior to the initiation of a forward step operation, the load control samples the access location to determine whether or not an ASCII control code is stored. If a control code is not stored in the location, for example, then a space code is inserted in memory concurrent with the movement of the marker bit. This ensures that the location of a null code in memory represents a location which is void of control information. In summary, the forward step operation is performed by moving the load control marker from access location N to access location N + 1.

A backspace operation is performed by moving the load position marker from access location N to access location N−1. This is accomplished by moving the marker bit backwards in memory. As the backspace operation is only used within a print line, the load control samples the N−1 location of memory to determine if a new line code exists at that location. If the load access location is preceded by a new line code, the backspace operation is terminated, the load position marker remains at its original access location and the backspace code is cleared from the input silo register.

There are two types of clear operations performed in Mode I, a message clear and a line clear. A message clear operation is performed by the output device and not by the SCM. A line clear operation, however, is performed by the SCM. Both the message clear and line clear operation involve a two-code sequence generated by the keyboard. A message clear operation is determined, for example, by the ASCII cancel code followed by an ASCII ETX code. A line clear operation is deterimined by sensing a cancel code followed by an ASCII carriage return code, or alternately, a single code may be utilized and decoded accordingly, the choice being arbitrary and determined by the keyboard interface. The input silo register decodes the two code sequences and re-encodes it for load control operation.

When the cancel code is presented to the load control for storage, the load control loads the cancel code into the recirculation register just as it was another control code. If the cancel code is followed by a carriage return code, the input silo register brings up the appropriate control signals to tell the load control to perform a line cancel operation. The line cancel operation is performed in memory by doing a series of backspace operations followed by a clear operation. First, the load access location is determined and the location prior to the load access location is sampled for the presence of a new line code. If the load acess location is not preceded by a new line code, a backspace operation ensues. A series of backspaces are completed in the recirculation register until the load position marker is inserted into a location preceded by a new line code. At this time, the load control intiates a clear operation clearing the character from the load position access location, preserving the load position marker and clearing all information from the load access location to the end of the line. The line cancel operation is completed when the index code occurs and at that time the line cancel code is cleared from the input silo register. The number of backspace operations required by a line cancel sequence is equal to the number of characters initially entered within the current print line plus 1. The extra backspace operation is required to step over the cancel code which was inserted in memory. The cancel code was inserted in memory by the load control since the load control does not anticipate whether a line cancel or a message cancel has been requested by the operator. Each backspace operation requires one revolution of the delay line to be completed. Consequently, the number of revolutions of the delay line required by a line cancel operation is equal to the number of characters contained within the line to be cleared plus two. The two extra revolutions are accounted for by the backspace over the cancel code inserted in memory as set forth hereinabove and the backspace sampling for a new line code to begin a clear operation. The load access location is deemed the index location if the index contains a null code or is void of data.

The load location at location N is determined by the presence of a marker bit which is not contained within the unload marker field. Decisions to load a word into the recirculation register are made one bit time prior to the actual load operation.

In Mode 1 operation, the SCM attempts to ensure the operator at the keyboard that there is sufficient storage locations available for the entry of a complete print line of data. A buffer full condition exists when the SCM cannot assure that the keyboard operator has sufficient storage to complete one print line of data stored in memory. A buffer full condition is recognized by the load control logic when a new line code is inserted into the last 85 character locations of storage. A new line code is defined as a carriage return (CR), start of address field code (SOH), start of message code (STX), temporary end (ETB), or the final end (EXT), code entered into memory. A buffer full exit condition exists when the SCM assures itself that the operator can continue inserting information with a minimum of 512 character location available in memory. The object of the SCM is to ensure that the operator has as much potential storage available as possible. Consequently, the decision is made to exit a buffer full condition when a full block of data could be inserted by the keyboard operator. Once a buffer full condition has been initiated, the load control logic begins sampling the first block of memory and the 513th character location of memory for a null or void code indicating the absence of a character stored in one of these locations. A null code indication within the first 513 character locations of memory indicates that the operator can continue typing and inserting data into the delay line with full assurance that the buffer full condition has been exited with the availability of 512 continuous character locations of storage.

An overflow condition is defined as an abnormal condition arising from the insertion of 1,023 characters or more into the storage media. Since the print line of the printer is 80 characters long and the SCM buffer full determination takes place within the last 85 character locations of storage, the SCM is practically assured of determining a buffer full condition prior to a character going into the 1,023rd character location. If a code is stored into memory at that location, it indicates an abnormal load operation and that the input device has failed to recognize the buffer full code issued by the SCM interface. Under this condition, the SCM flags the input device and indicates an overflow condition. The overflow condition is exited in the same manner as the buffer full condition is exited. Once the overflow condition has been exited by the load control, the load control releases the input device and allows the operator to insert more information into memory.

Mode I – Unload Operation

The SCM load and unload control logic are designed as discrete entities, substantially independent in operation and function. The load control loads information into the delay line and is dependent on the unload control only for determining the field of data contained within the unload output block. The unload control samples the information stored within the delay at the recirculation register and operates in an appropriate manner dependent upon the information contained within the delay line.

The unload control has four state flip-flops which control the operation to be performed upon the output block of data stored within the delay line. The four states of the SCM are: (1) message to unload search (2) unload index (3) unload mode and (4) clear status pending. The unload control in addition contains a control flip-flop for generating the unload marker field indication which differentiates the field of data reserved for the unload control and output block. Initially, the unload control begins in a message to unload serach mode.

The message to unload search mode causes the unload logic to sample the delay line for an end code (ETX or ETB) in the first 512 character locations of storage to determine if a message or message partition was inserted by the operator for unloading to the output device. If an end code is not contained within the first block of memory, the unload control samples the last 85 character locations of the first block for a new line code (CR, SOH or STX) for potential message partitioning. The presence of any of these codes within the respective fields initiates the first of the unload operations. The first unload operation involves the exiting from the message to unload search mode into the unload index mode. At this time the unload control waits for the index location to begin unloading data from the index location. The information contained at index should be the first information contained in the delay line and consequently the first out information to be retrieved. When the unload control finds the index location, the unload control retireves the word contained at the unload location and inserts the unload position marker into the next location of memory. While the unloading of the character at the index location is occurring, the unload control logic samples the character for the presence of a start code (SOH or STX). The lack of a start code determined by the unload control causes the unload control to insert an STX code into the output silo register. The lack of a start code would indicate that retrieval was beginning on a block or partitioned message. Once the code has been retrieved from the index location, a normal unload mode is entered where information is retrieved as locations for storage are available in the output silo register and as the unload access location occurs. Dependent upon the availability of character storage in the output silo register, the unload control attempts to fill the silo register by sequentially retrieving successive characters from the delay line until the output silo register is filled. Concurrent with the entry into the unload mode and during the retrieval of information in the unload mode, the unload marker field signal (UME) is generated to differentiate the field of information being unloaded by the unload control. The unload marker field signal begins coincident with the index location and ends coincident with the arrival of the first marker bit in memory under the circumstances of the output silo register being completely filled with information. As information is being unloaded from the recirculation register into the output silo register, the unload marker envelope is maintained during the propagation of the marker bit. The availability of the output silo register to accept characters determines the marker bit location which ends the unload marker field signal. The number of characters successively retrieved from the recirculation register and entered into the output silo register is dependent upon the amount of character locations available in the output silo register.

Since the output device is requesting information to be transferred from the output silo register to the output device by way of the interface, the rate at which information can be retrieved from the delay line is dependent upon the rate of the output device. The unload control samples the delay line each revolution to determine the availability of storage locations in the output silo register and the occurrence of an unload position marker within the delay line.

The SCM exits the unload mode and enters the clear status pending state upon the retrieval of a final end code from the first block of memory. In the event of a message partition, the SCM unload control monitors the information retrieved from the last 85 character locatins of the first block of storage. If within this region a CR, SOH or STX code is found at the unload access location a temporary end code is inserted into the output silo register and the clear status pending state is entered.

Message partitioning in Mode 1 occurs if a final end code has not been inserted in the first 512 character locations of memory. The SCM while conducting the message to unload search and while in unload index and unload mode states constantly samples the first 512 locations of memory for the presence of a final end code. The presence of a final end code sets a flip-flop which disables the automatic partitioning of messages. If the disable automatic partitioning signal flip-flop has not been set, the SCM unload control will partition the message being retrieved within the last 85 characters of the first block of storage dependent upon the code which is first retrieved from that area of storage. In the event that a carriage return code is chosen for the message partitioning, then the carriage return code will remain within the storage media and an ETB code will be inserted within the output silo register. If message partitioning is to occur at that location dictated by the SOH or an STX code, the unload control assumes that the control code delimits the end of the address field. Specifically, the address field of the message has contained 427 characters or more. In this instance, the SCM unload control generates a two code sequence (ASCII FS code followed by ETB code) to indicate that the message partitioning has occurred at a definable control code location. When a suitable code has been located for message partitioning at the unload access location of memory, the marker bit remains at the location occupied by that control code. This ensures that the next message partition will begin with that control code as the first character of the subsequent partition.

In Mode 1 unload operation the unload control marker remains within storage during the clear status pending state. Consequently, the unload marker field signal must differentiate the unload field from the load field while the SCM unload control is awaiting the status of the output block.

The output device determines the status of the output block retrieved. The output device has an option of requesting a new block of data or requesting a subsequent transferral of the first block of data. In the event that the output device requires a retransfer of the output block, the output device issues a repeat output block status/command code which is decoded by the interface, buffered, and transferred to the unload control. The unload control acts upon the repeat output block command by first searching memory for the unload access location marked by the unload control position marker of the first retrieval and purges that marker bit from memory. When the unload control locates the unload position marker it is necessary to determine whether or not coincidence has occurred between the unload and load position markers. This coincidence is definable by the unload position marker being the only marker bit contained within memory. This is recognizable by sampling for the presence of a character at the location occupied by the unload position marker. The unload position marker is always the first marker relative to index in the delay line. The presence of a null code at the unload position marker location indicates that coincidence has occurred and the unload control preserves the marker bit within memory and goes directly into an unload index state. If coincidence has not occurred and a null code does not exist at the unload position marker location then the unload control cleans the unload position marker from memory prior to entering into the unload index state. Upon entering the unload index sate, the unload control waits for index to occur and begins retrieval again from index repeating the sequence previously described.

If the output device requests the tranfer of a new block of data, the output device issues a clear output block status/command code which is recognized by the interface, buffered, and transferred to the unload control. The unload control acts upon the clear output block command by starting a clear operation from the index location up to but not including the location occupied by the unload position marker. The unload position marker is cleared from memory but the word contained at the unload position location is preserved. Coincident with the completion of the clear operation, the unload control enters the message to unload search mode and repositions the tracking counter to the index code thus assuming the start of the next message block is stored at the new reference index location. Thus, the unload control begins searching the next block of memory for a discrete message, message partition or message which can be partitioned to form a new output block for the output device.

Mode II — Load Control Operation

In Mode II operation, the load control loads the character presented for storage into the delay line as the characters are entered into the input silo register. No operations are performed upon this information as it is loaded into storage. Any codes presented to the SCM used in the correction sequence of Mode I are totally ignored and loaded into memory as normal encoded characters. Consequently, the load position in Mode II operation is always differentiated by a load position marker at a location which contains a null code. Since backspace operations and line correction sequences will not be occurring, there are only two potential load positions. The first is the index location differentiable by a null code present at index, the second is that marker bit location which contains a null code. Interrogation of the input data by the load control exists only to define the buffer full condition of Mode II operation.

The SCM interface monitors the input data from the input device to determine the end of the input block and establish the point at which the status of the input block becomes pending. In Mode II operation, once the input device has loaded the input block into memory, the input device has block control of the complete block of information stored. Consequently, the input device may request that block to be cleared from memory for a subsequent transferral into the delay line. The input device must issue a command indicating the status of the message loaded to the SCM prior the initiation of another load sequence. If the input device wishes the input block to be transferred to the output device, the input device issues a start unload status/-command. The start unload status/command is interpreted by the interface, buffered, and transferred to the load control. The load control acts upon the start unload command by marking the message which has been defined by the input device to be unloaded to the output device. The load control empties the input silo register prior to interpreting the control lines on the interface to initiate a start unload operation. The start unload operation is performed by finding the start of the message which was loaded into memory and marking the start code such that the unload control will be able to interrogate that start code and begin an unload operation. The marking is performed by inserting a marker bit in a marker bit location occupied by the start code.

The start of message code is uniquely defined by the load control as existing either at the index location or at the access location containing an SOH or an STX code preceded by an ETX or ETB code. The operation of marking the nessages to be unloaded by inserting a bit in the marker bit location of the start code uniquely defines those messages which have previously been loaded into storage from that message which is currently being loaded or operated on by the load control. In performing the start unload operation, the load control first monitors the index location to determine if a marker bit is present. If a marker bit is not present at the index location, the load control inserts a marker bit to define that message as an output block. If the index location contains a marker bit, then the load control samples memory for an SOH or STX code preceded by an ETX or ETB code which does not contain a marker bit in the location occupied by the start of message code. The load control inserts a marker bit in the location of the start of message code, thereby differentiating that message from the next message to be received by the input device. During the start unload operation no action is taken upon the load control position marker. The load control position marker will uniquely define the next access location for the next character to be loaded into memory.

If the input device requests that the input block be cleared from memory, the input device issues a clear input block command. The clear input block command is recognized by the interface, buffered, and transferred to the load control. The load control acts upon the clear input block command by locating the beginning of the input block and clearing the input block from memory. The beginning of the input block is found by sampling the memory in the same manner as sampling memory for the starting input block to perform a start unload operation. Once the start location has been located, the load control inserts a load position marker at that location to define the new load position location and begins a clear operation clearing the memory word from that location to the end of the delay line (index).

The load control upon the completion of a clear output block or start unload command tells the interface control logic the status of the delay line. The load control tells the interface whether or not the delay line contains sufficient locations to accept a new block of information from the input device.

Mode II — Buffer Full and Overflow Operation

The buffer full condition is determined by the presence of an end code in the second block of storage. If multiple messages have been inserted into the delay line and the sum of the total number of characters present in memory is in excess of 512 characters, the final end code for the last input block presented into memory will fall within the last 512 characters of storage or the second block of memory. The load control monitors the information as it is stored into memory to determine whether or not a buffer full or an overflow condition exists. A buffer full condition is transferred to the interface upon the completion of a start unload command. An overflow condition results in the activation of a device down signal line indicating that an error has occurred in the sequence of events between the input device and the SCM. A buffer full indication simply tells the input device that the SCM cannot guarantee 512 continuous locations of storage available for the next input block. The SCM does not inhibit the ability of the input device to enter a new input block into storage. The SCM assumes that the input device is honoring the buffer full command or that the input device somehow has been monitoring the number of characters which have been inserted into memory and knows that the next block of information will not force the SCM into an overflow condition. The SCM load control monitors the exit of a buffer full condition by looking for a null code present within the first 513 character locations of memory, similar to Mode I operation.

An overflow condition exists when a code other than an end code has been inserted into the 1,024th character location of memory. Mode II operation defines the input device as capable of issuing a message block containing 512 continuous characters. For this reason, the SCM must guarantee that it can accept two complete blocks of information and store these blocks within the delay line. The SCM assumes that no block of information will be greater than 512 characters. However, it is possible that a block could be entered into memory which contained more than 512 characters. The determination of an overflow condition requires that any block of characters entered into the SCM should not be greater than 1,023 characters. An overflow condition is monitored by checking for the insertion of a character into memory adjacent to the index location. Since the delay line is a continuous recirculating memory element it is assumed that the index location will always contain information when loading the 1,024th character into memory. Furthermore, it is also assumed that if the 1,024th character is being loaded into memory then the first character located in memory must be a start code and that start code must be marked as an output block to be given to the output device. The SCM also assumes that the 1,024th character inserted will be an ETX or an ETB code. Any other operation or code would require an error on the part of either the SCM or the input block. If the input device was entering a block of data which was greater than 512 but less than 1,023 characters and entered the overflow condition, the SCM would allow this information to be accumulated into the input silo register until it became full of information. The SCM would then allow any more codes delivered to the SCM to be inserted into the last character location of the input silo register. This effectively means that total capacity of the SCM is 1,027 characters. Any characters in excess of this number will result in a loss of data. An overflow may be exited when the unload control removes the first block of information from the SCM. The load control will then take all the information available in the input silo register and store it into memory. Transfer of information from the input silo register to the recirculation register will not occur until overflow has been exited. This exit will occur only with the presence of a null code within the first 513 character locations of storage. If overflow exit does not exist, then this mode will be non-recoverable and will require operator intervention by way of a reset switch.

Mode II — Unload Operation

The four basic modes of operation contained in the Mode I unload operation are also contained in Mode II operation of the unload control. The unload marker field signal used in Mode I operation is also used to Mode II operation. The differences in the control logic account for the slight differences in sequence dictated by the use of marker bits as an accounting scheme to differentiate those messages which are deemed transferable to the output device from those messages which are being accumulated by the load control from the input device.

The load control begins in a message to unload search mode. In this mode of operation, the unload control constantly monitors the index location for the presence of a marker bit in the absence of a null code indicating that a start of message for an output block is stored in memory. Coincident with the determination of a valid output block stored in memory and starting at the index position, the unload control initiates an unload index operation unloading information from the recirculation register into the output silo register and exiting the message to unload search mode. As the information is transferred from the recirculation register into the output silo register, the unload control passes through the unload index state into the unloaded mode raising the unload marker field signal and inserting the unload position marker into memory while preserving the accounting marker at the index location. The normal unload retrieve mode then begins with the unload control attempting to fill the output silo register.

While in the unload mode of operation the unload control constantly samples the data retrieved from the recirculation register inserted in the output silo register for a final end code. Each block of information entered in Mode II must contain a final end code since automatic partitioning is not involved in Mode II operation. All blocks of information entered into memory in Mode II are assumed to be pre-blocked and do not contain more than 512 characters.

As the unload control retrieves the final end code from the recirculation register and inserts the code into the output silo register, the unload mode is exited and a clear status pending mode is entered. At the time of the retrieval of the final end code, the unload control clears the unload position marker from memory. The unload control position marker is no longer needed because the output block is uniquely definable as that block of information which begins at the index location and ends at the first final end code location relative to the index location. Similar to Mode I operation, the output device has the option of requesting for a retransfer of the output block, or requesting the new output block to be transferred from the SCM. The output block commands, repeat output block and clear output block, are interpreted by the interface and the unload control similar to Mode I operation. Since the unload position marker has been cleared from memory in Mode II, the repeat output block command initiates the unload control to move from the clear status pending condition into an unload index condition immediately. Upon entering the unload index condition by virtue of receiving the repeat output block command, the unload control waits for the index location and begins retrieval thereat. The difference between Mode I and Mode II operation for a clear output block command consists in the completion of the clear operation. In Mode I, the completion of the clear operation was defined by the unload position marker. In Mode II, the completion of the clear operation is defined by the location of the first final end code in memory.

Completing the clear operation for the clear output block command, the SCM unload control initiates a reposition index pulse repositioning the tracking counter such that the access location following the end code for the output block becomes the new index location. Just as in Mode I, the completion of the clear operation redefines the index and redefines the first in information and consequently the first out information. A message to unload search is initiated and the complete unload operation begins again.

DIFFERENCES IN CONTROL ALGORITHM FOR MODE I AND MODE II OPERATION

Mode I operation gives the input device control of information on a line basis. Mode II operation gives the input device control on a block basis. Correction procedures such as the use of backspace, forward step and line cancel subroutines are only available in Mode I operations. Automatic partitioning is only applicable to Mode I operation. The start unload/clear input block sequence are only applicable to Mode II operation. The only marker bits present in the delay line in Mode I operation are the load position marker and the unload position marker. The marker bits present in the delay line during Mode II operation are undefined in number and are used as load position markers, unload position markers and accounting markers to differentiate output blocks from input blocks. In either mode of operation, input blocks and output blocks are of undefined length. In Mode II operation, input blocks have a maximum character capability of 512 characters inclusive of start and end codes presented to memory. In either mode of operation, memory loading is continuous.

Message gaps or block gaps are not used in loading information in the delay line. In Mode I automatic partitioning, data in the delay line is not changed. All codes encoded by the SCM are encoded in the output silo register and not modified within the delay line. The minimum message length acceptable by the SCM consists of two characters—a start code and an end code.

The maximum input rate to the SCM allows three characters to be loaded into the SCM every delay line revolution (8.192 milliseconds in this implementation). The maximum output rate of the SCM allows the output device to demand six characters every delay line revolution. Buffer full indication for Mode I operation defines the inability to accept one more print line worth of data from the input device. Buffer full condition for Mode II operation defines the inability of the SCM to accept the maximum input block length.

DESCRIPTION OF THE SCHEMATIC DIAGRAMS

FIGS. 9*a* – 9*gg*

Referring now to FIGS. 9*a* – 9*d* the schematic diagram of the recirculation register is shown. At the top of the page of FIG. 9*a*, a timing and synchronism diagram for DCLK, DTS7, DRR1J and DISRXE is illustrated. This shows a typical timing diagram for loading information in parallel into the recirculation register.

DCKL is the basic high speed clock for the storage control module. DCLK is used as the serial shift clock for the serial shift register comprising flip-flops RR1, RR2, RR3, RR4 . . . RR18. When inserting information into the recirculation register, information is loaded in parallel into flip-flops RR2 through RR8. Information is inserted through the synchronous set and reset inputs of those flip-flops on the corresponding trailing edge of DCLK. Thus, DCLK is used as the clock to load RR2 through RR8 synchronously from the parallel gate structure, represented by the dashed elements 1, through the synchronous inputs.

DTS7 is the time slot 7 reference used by the storage control module to sample the recirculation register, flip-flops RR1 through RR7 and CDLOUT, the input from the delay line, in order to make a decision to do an operation on the data within the recirculation register. At DTS7 time, the least significant bit of the coded (ASCII) character to be sampled is present at the CDLOUT signal point. The most significant bit is stored in flip-flop RR6 and the marker bit location for the current access location is stored in flip-flop RR7.

DRR1J is a signal which is active when the marker bit is inserted into location N + 1, one time slot following the trailing edge of DTS7. DRR1J, through NOR gate 2, sets up the synchronous set and reset conditions for RR1 to set a one bit into RR1 on the trailing edge of the next DCLK. DRR1J, when inserting the marker bit at location N + 1, is active for only one bit time. DRR1J is normally used in conjunction with DRR9K (FIG. 9*b*) in setting the marker bit a location N + 1 at flip-flop RR1 and resetting the marker bit at location N at flip-flop RR9 at the synchronous set and reset inputs of RR9 flip-flop through gates 3, 4 and 5 when information is loaded from the input silo register into the recirculation register during a load operation and when information is transferred from the recirculation register into the output silo register during an unload operation. DRR9K and DRR1J move coincident with one another in most of the load and unload operations. Sequences in which DRR9K or DRR1J move independent of one another will be discussed hereinafter.

Figure 9A:
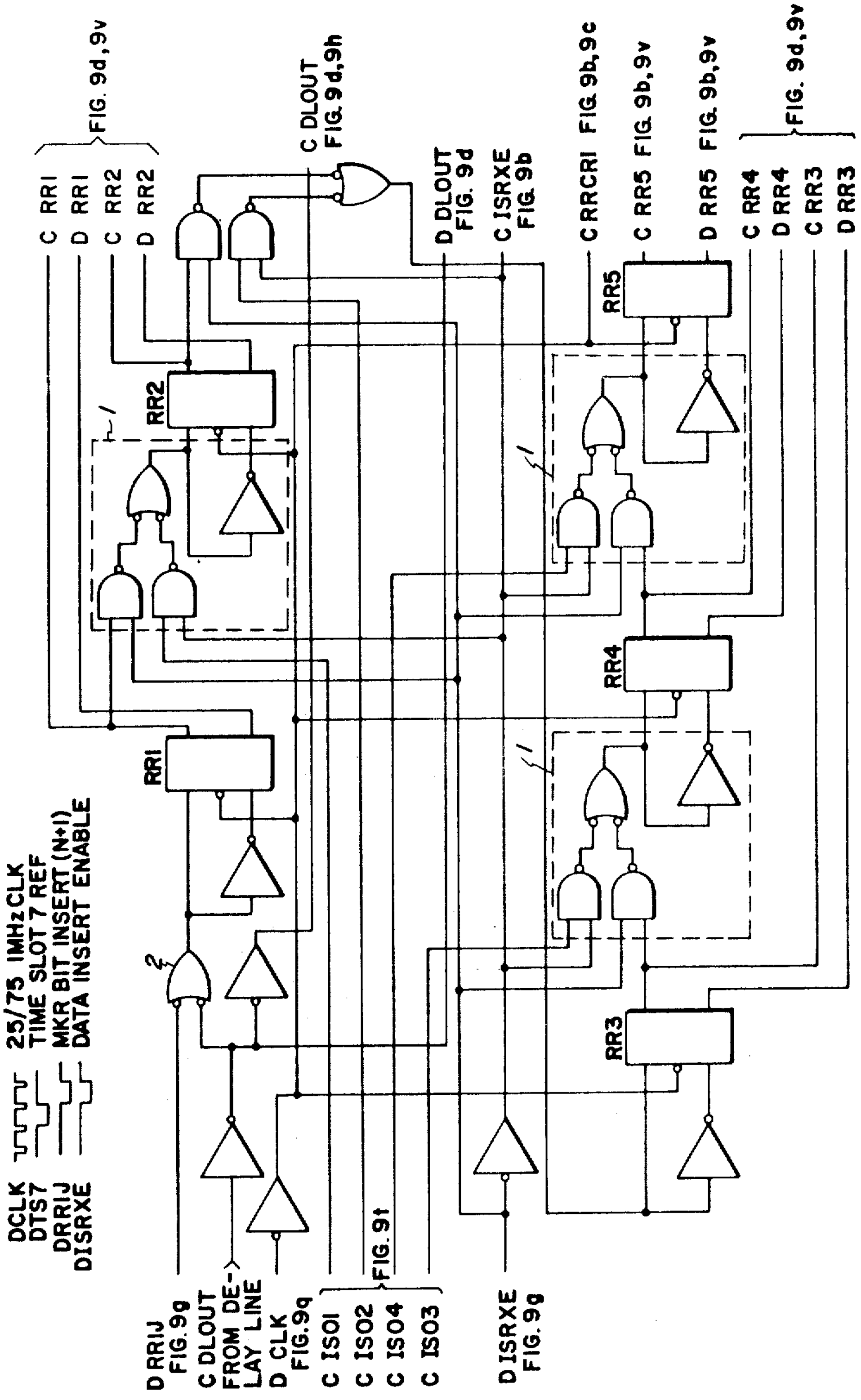
FIGS. 9*a* – 9*gg* are schematic diagrams of the storage control module block diagram of FIGS. 2 and 2*a;*
Figure 9B:
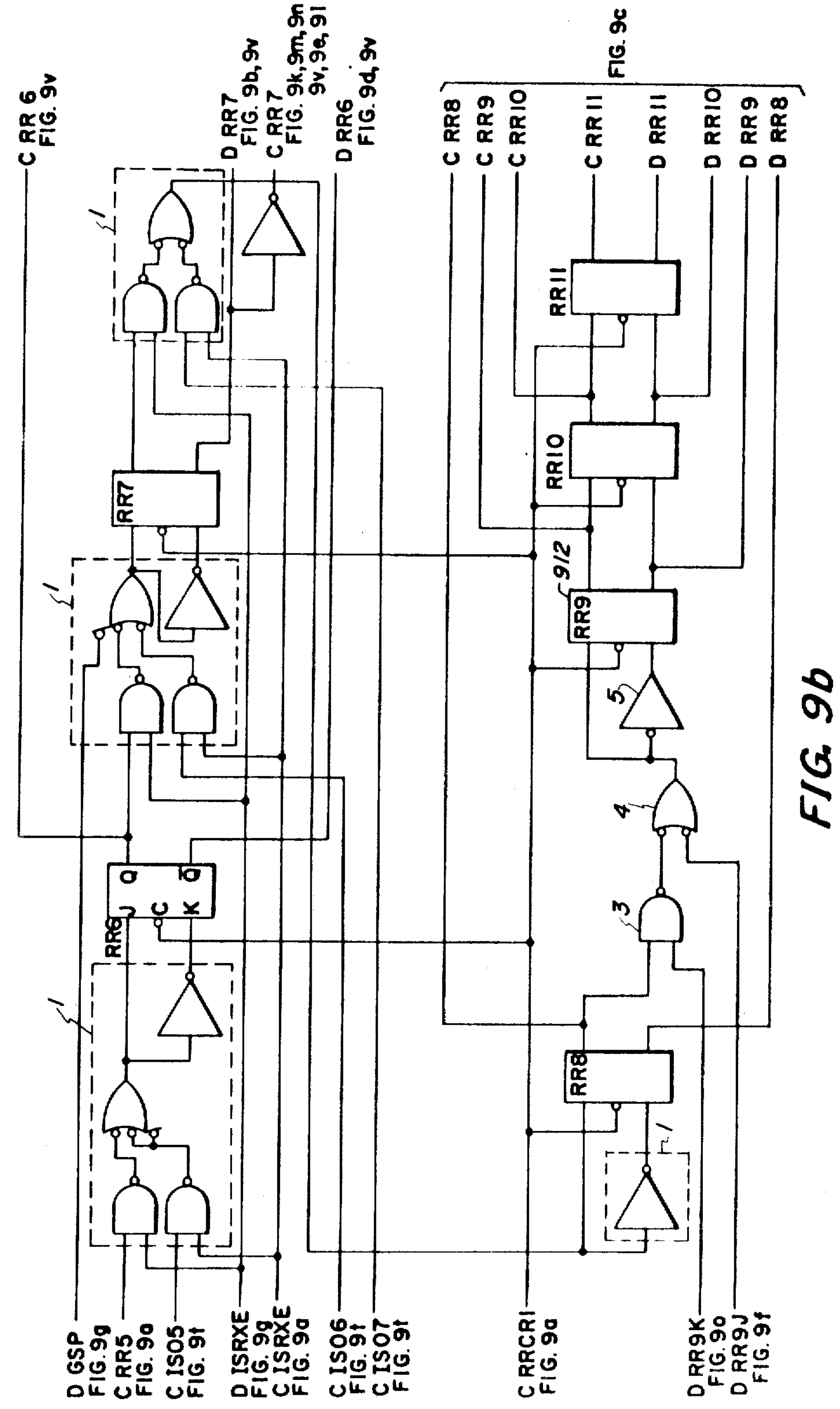

FIG. 9*ba* is a diagram illustrating the distribution of the access locations within the recirculation registers RR1 through RR17 during time slots 7, 8 and 1. At time slot 7, TS7, the recirculation register is sampled. At time slot 8, TS8, the flip-flops RR1 and RR9 for parallel transfer into or out of the recirculation register are set up and at time slot 1, TS1, the marker bit and data transfer are completed.

DISRXE is the data insert enable signal for initiating a parallel transfer from the input silo register into the recirculation register during a load operation. DISRXE is coincident with DRR1J and usually coincident with DRR9K. The transfer of information through gate arrays 1 is coincident with the setup of conditions for the movement of the marker bit from location N to location N + 1 through the synchronous inputs of the corresponding flip-flops. The gate array 1 coupled to the set input of RR2 comprises two transfer gates ORed together and through an inverter for setting the reset side of RR2 such that information can be directed by DISRXE to move in serial manner from RR1 to RR2 as a serial shift register when DISRXE is at a logic 1 condition. When DISRXE is at a logic 0 condition, CISO1, which is the least significant bit from the input silo register, is gated into the synchronous set and reset inputs of flip-flop RR2, gating the information from the input silo register into the recirculation register in a parallel mode. Inputs CIS01, CIS02, CIS04 and CIS03, CIS06 and CIS07 are correspondingly transferred in a parallel manner to the corresponding flip-flops RR2 through RR8 by control of DISRXE to load the recirculation register in parallel from the input silo register whenever a load data transfer is occurring.

CDLOUT from the delay line is directed through NOR gate 2 to set up the conditions at the synchronous input of RR1 in such a manner that the serial data stream from the delay line is entered into the shift register comprising flip-flops RR1 through RR18.

The D prefix of the DISRXE signal signifies that ground (positive logic 0 level) is the active signal. Whenever ground is applied, those gates associated with a serial flow are gated off and those gates associated with a parallel input are gated on. CIS01, CIS02, CIS04 and CIS03 represent four bits of the data which is loaded in parallel into the synchronous inputs of flip-flops RR2 through RR5.

FIG. 9*b* illustrates the remainder of the first eleven stages of the recirculation register and the gating to enter and exit the recirculation register. DRR9K is used to set up a marker bit in flip-flop 912.

DRR9J entering gate 4 sets up the synchronous inputs of flip-flop RR9 for the insertion of a marker bit at access location N when a start unload operation is in progress under the constraints of Mode II operation in that the beginning of a message is being marked for an unload operation to the output device. DRR9J is the signal which when active is at the logic 0 state for one bit duration. The leading edge of the 0 going pulse is coincident with the trailing edge of TS7 and the trailing edge of DRR9J is coincident with the trailing edge of the next DCLK cycle. DRR9J is active when a start code has been sensed in access location N and an end code has been sensed in access location N − 1 with the load control steered by the interface to do a start unload operation. DGSP is applied to the inputs of flip-flop RR7 via gate array 1 and is used during a forward step operation to insert a space code into the recirculation register when it has been found that the forward step operation is moving the marker bit from an access location which is void of information into the next access location.

DGSP is active at the logic 0 state and is of one bit time duration with its leading edge coincident with the trailing edge of TS7 and the trailing edge coincident with the trailing edge of the next DCLK cycle. Normally, when DGSP is active, DISRXE is inactive and steering the recirculation register in a serial shift mode. Consequently, DGSP overrides the transfer of RR6 into RR7 and sets up the condition to insert a 1 into flip-flop RR7 regardless of the content of RR6. Concurrent with DGSP active, DRR9K and DRR1J are also active transferring the marker bit from the current access location N to the access location N + 1.

Figure 9C:
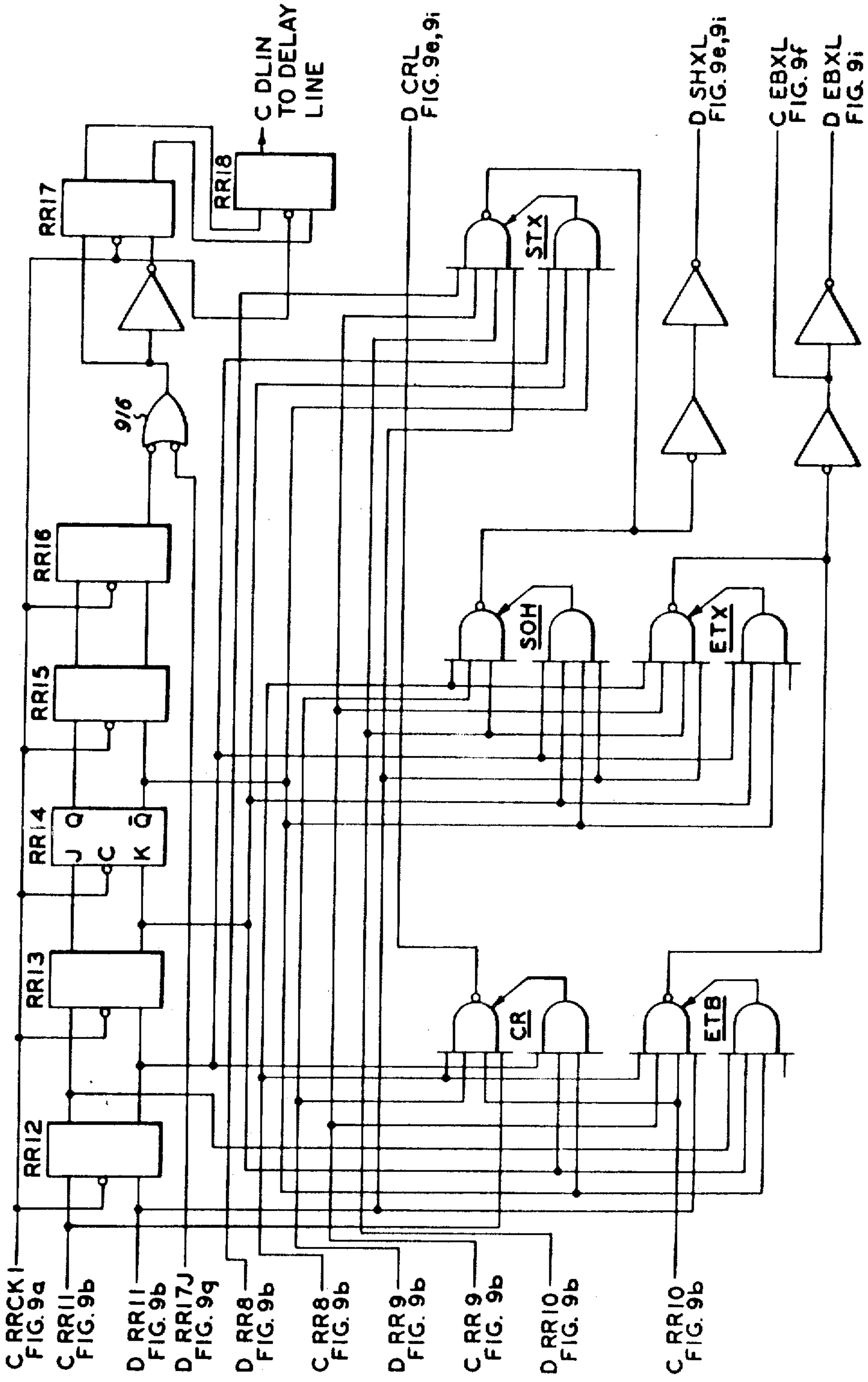

FIG. 9*c* illustrates the last stages of the recirculation register, flip-flops RR12 through RR17. The CR, ETB, SOH, ETX and STX 8-input decoders decode the control codes in the N − 1 location. The ETB and ETX codes are used in the same way in the SCM and one decoder could be used instead by utilizing one of those codes or a general code. Similarly, the SOH and STX codes and decoders may be replaced by one code and decoder. The recirculation register herein described is essentially a serial register. The output of a two input NOR gate 6 is coupled to the input of flip-flop RR17. An active 1 level at the output of gate 916 or at the RR17 flip-flop set input will set up a one in RR17.

During the initiation of a backspace operation, input signal DRR17J is normally in an active 0 state setting up conditions through gate 916 to set RR17. Concurrent with DRR17J in its active state, signal DRR9K is also active causing the marker bit to be moved from access location N into access location N − 1. DRR17J overrides the transfer of the contents of flip-flop RR16 into flip-flop RR17. The output CDLIN represents the data input to the delay line.

Figure 9E:
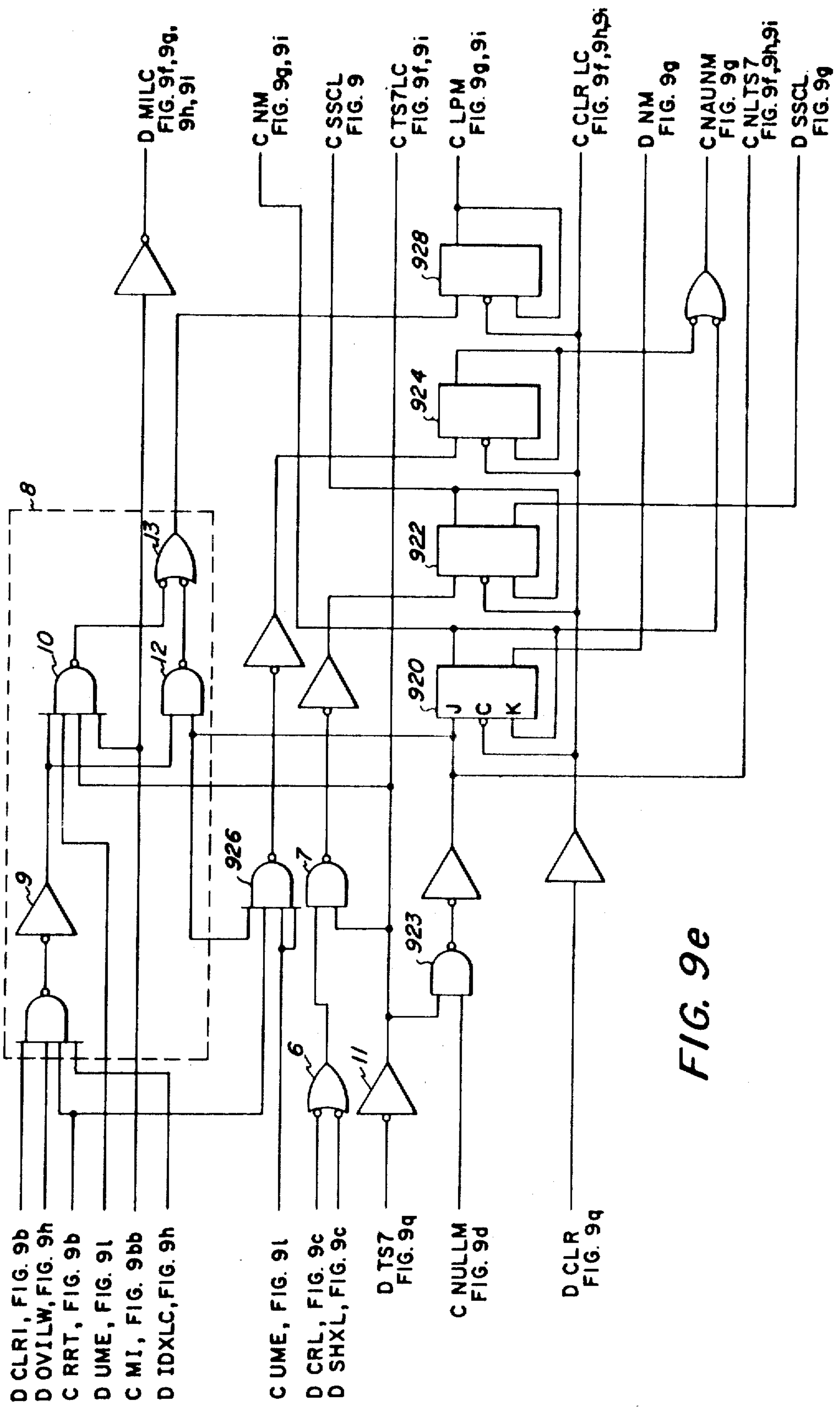
Figure 9F:
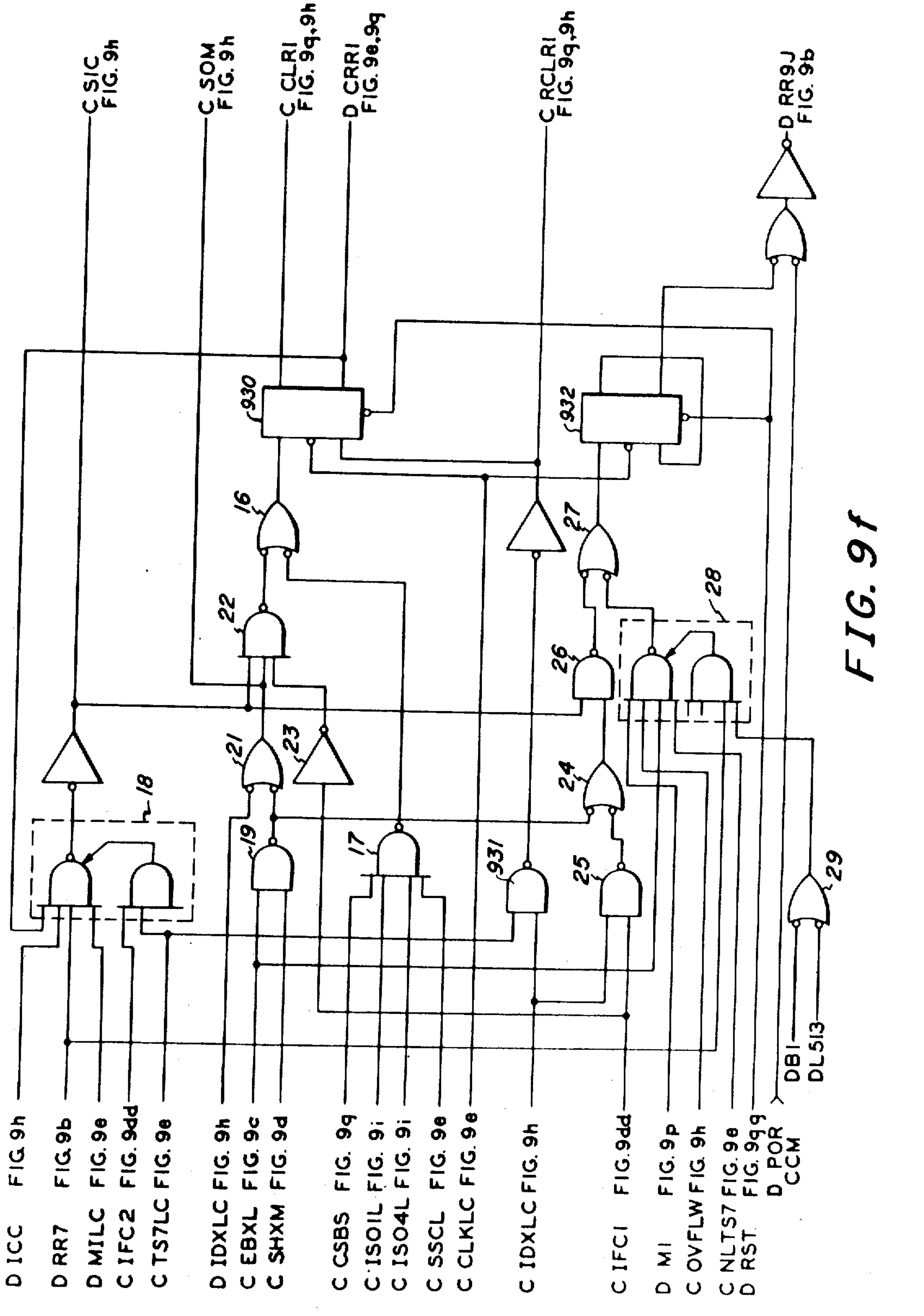
Figure 9G:
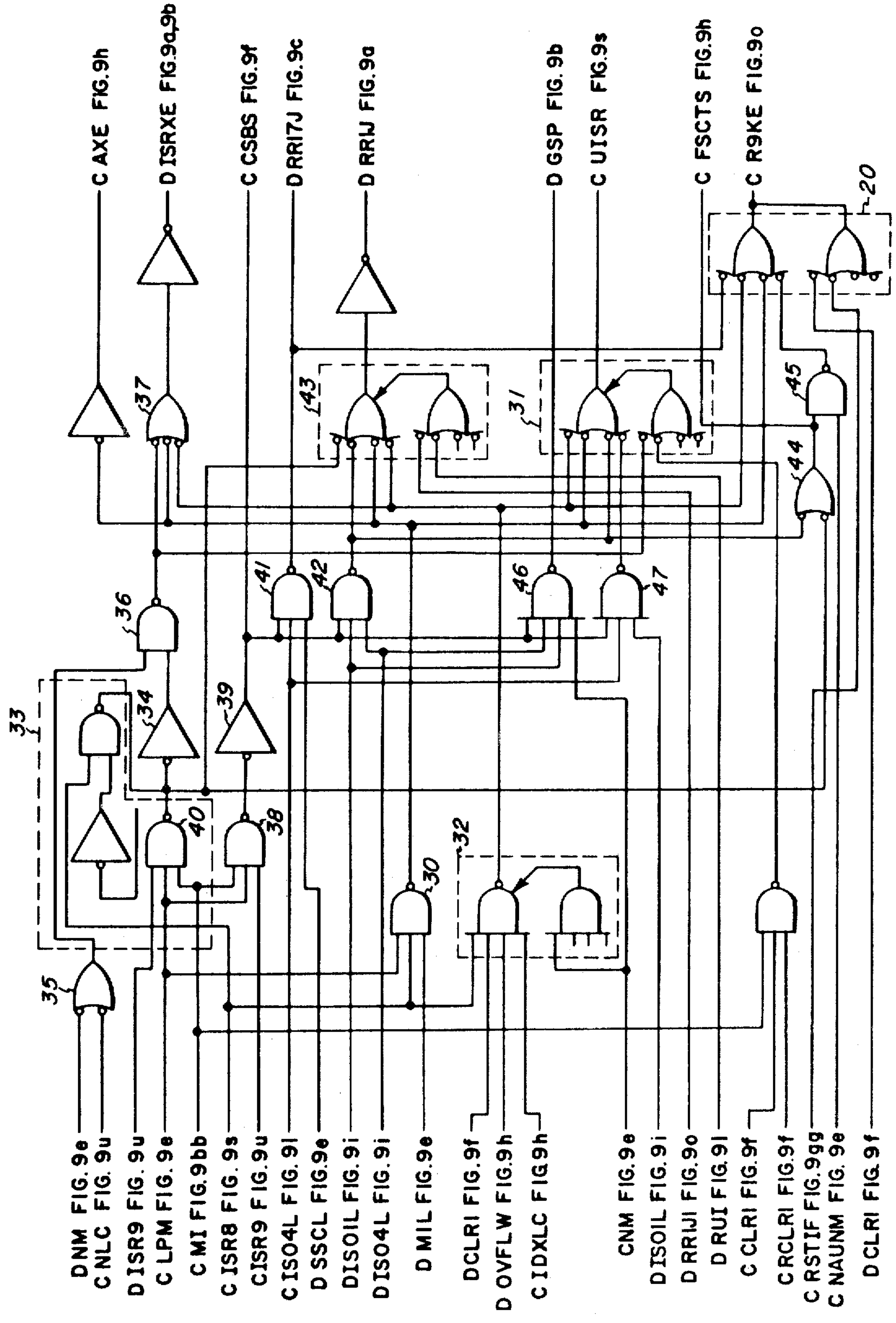
Figure 9H:
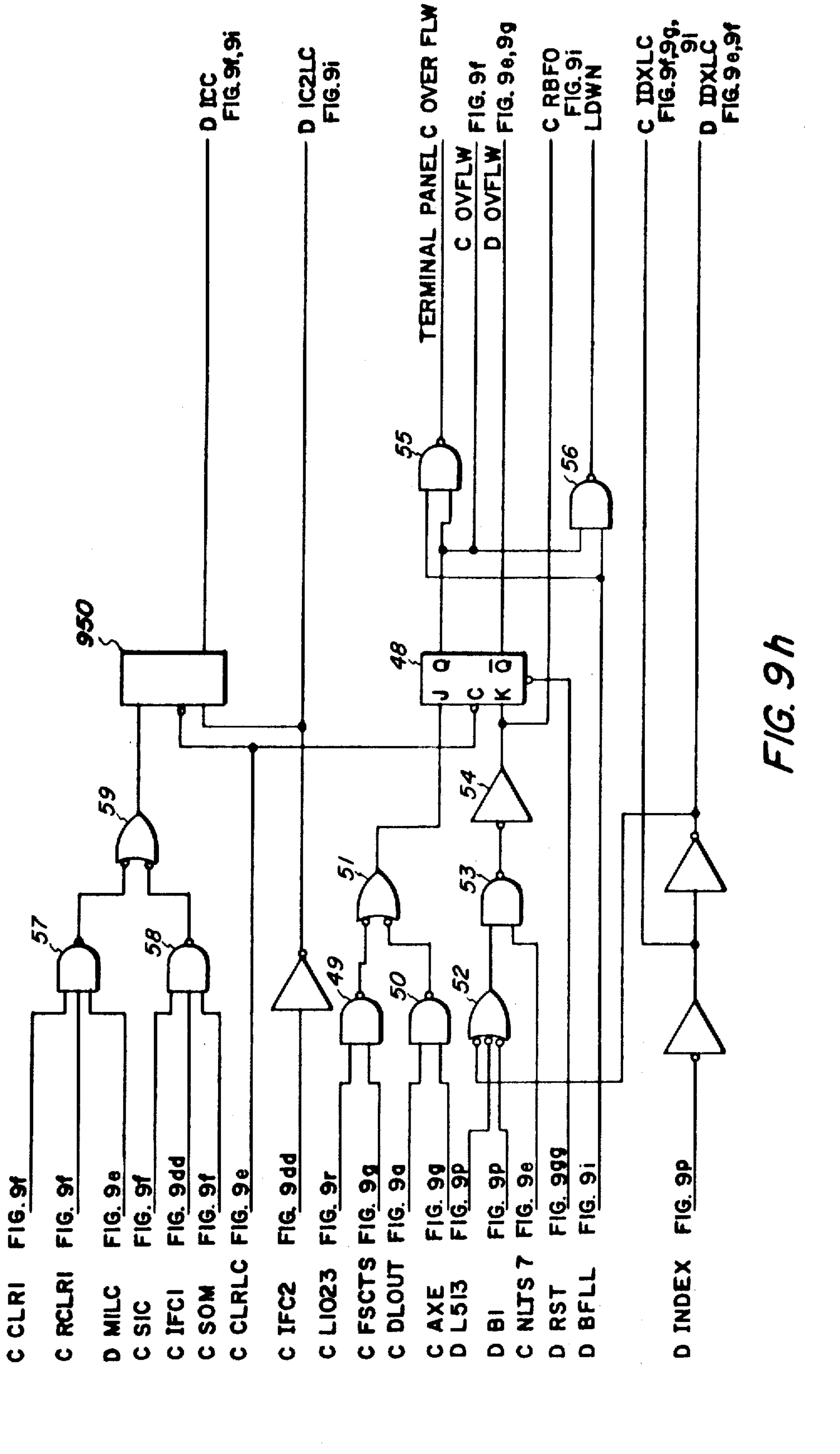
Figure 9I:
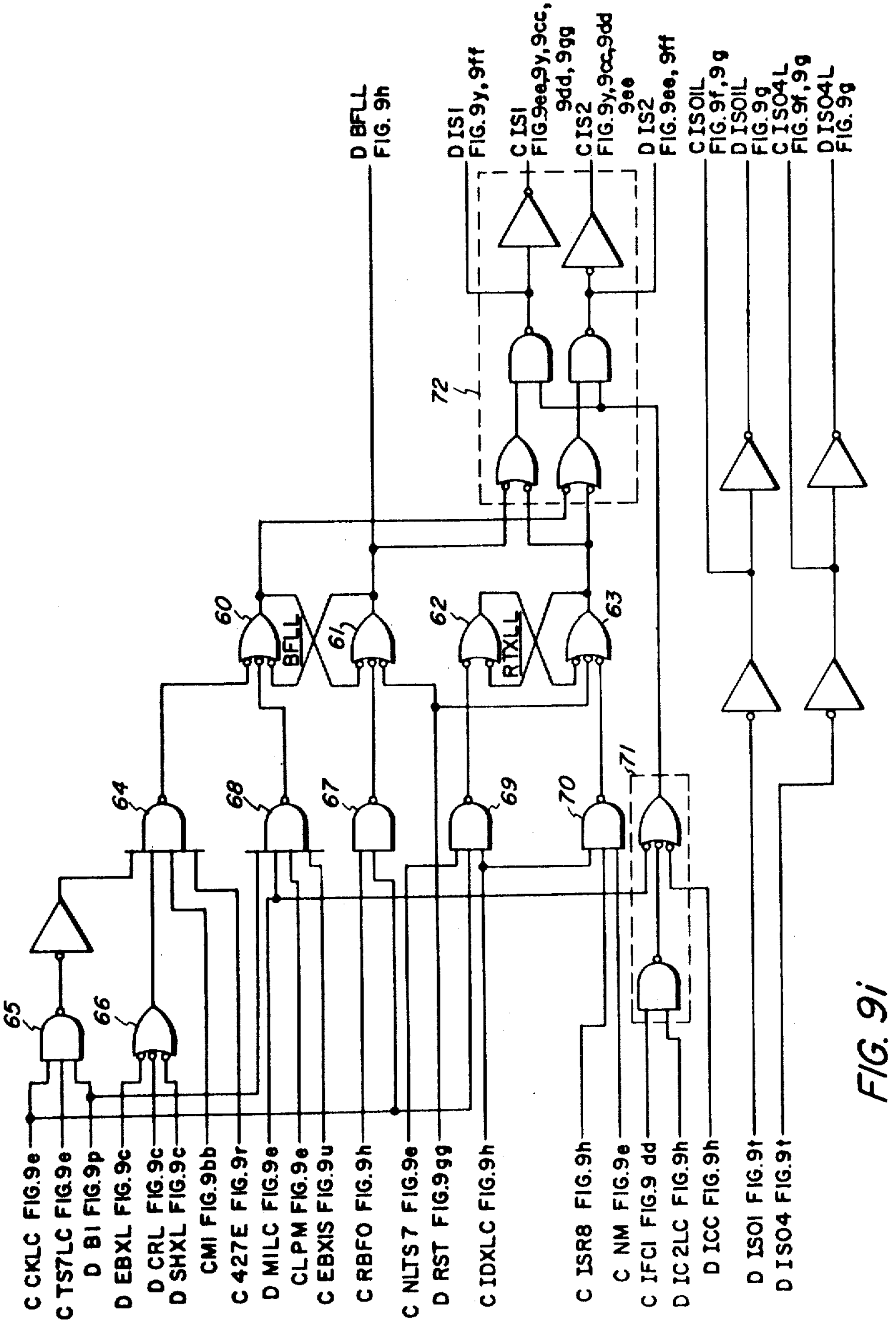
Figure 9J:
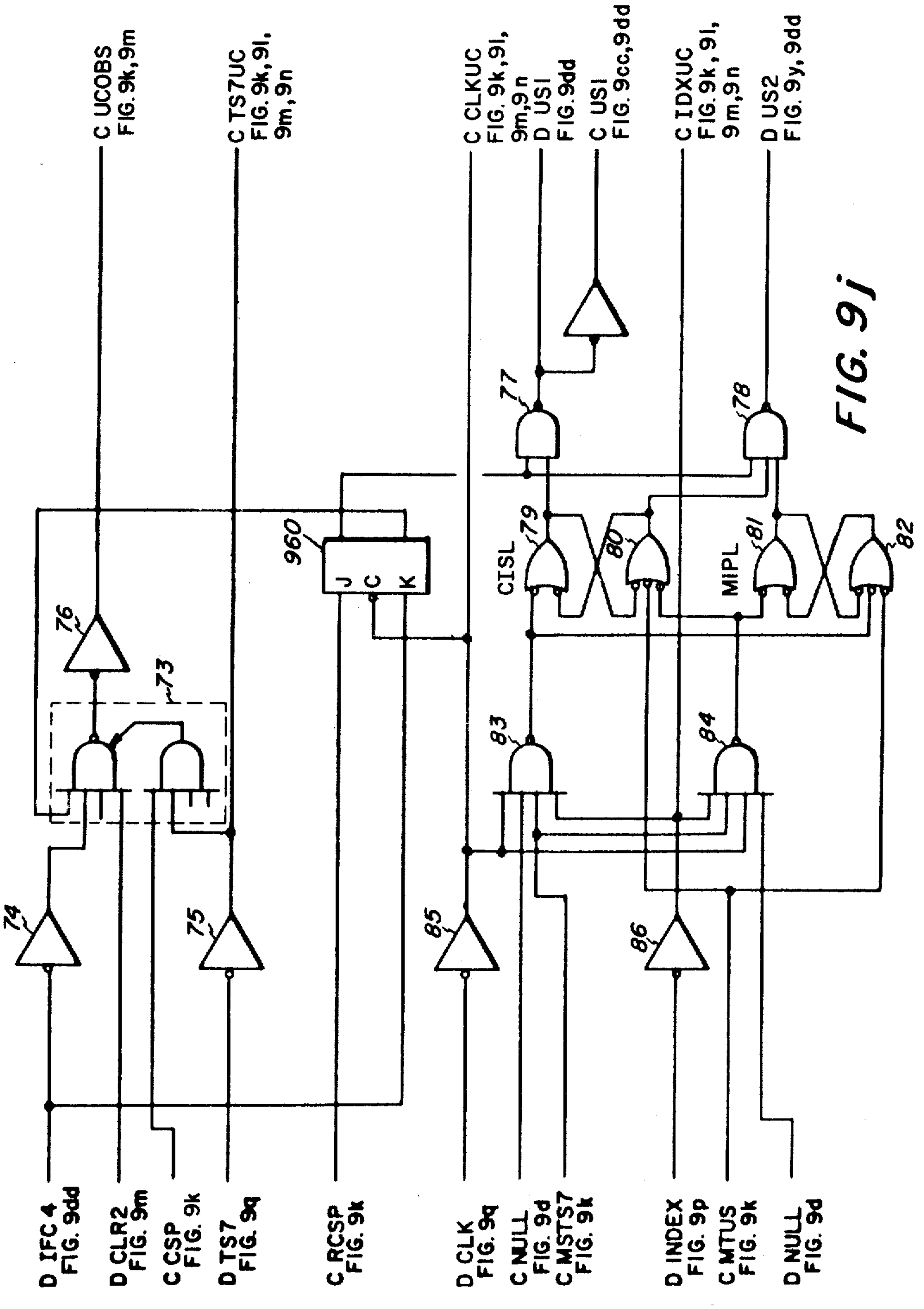
Figure 9K:
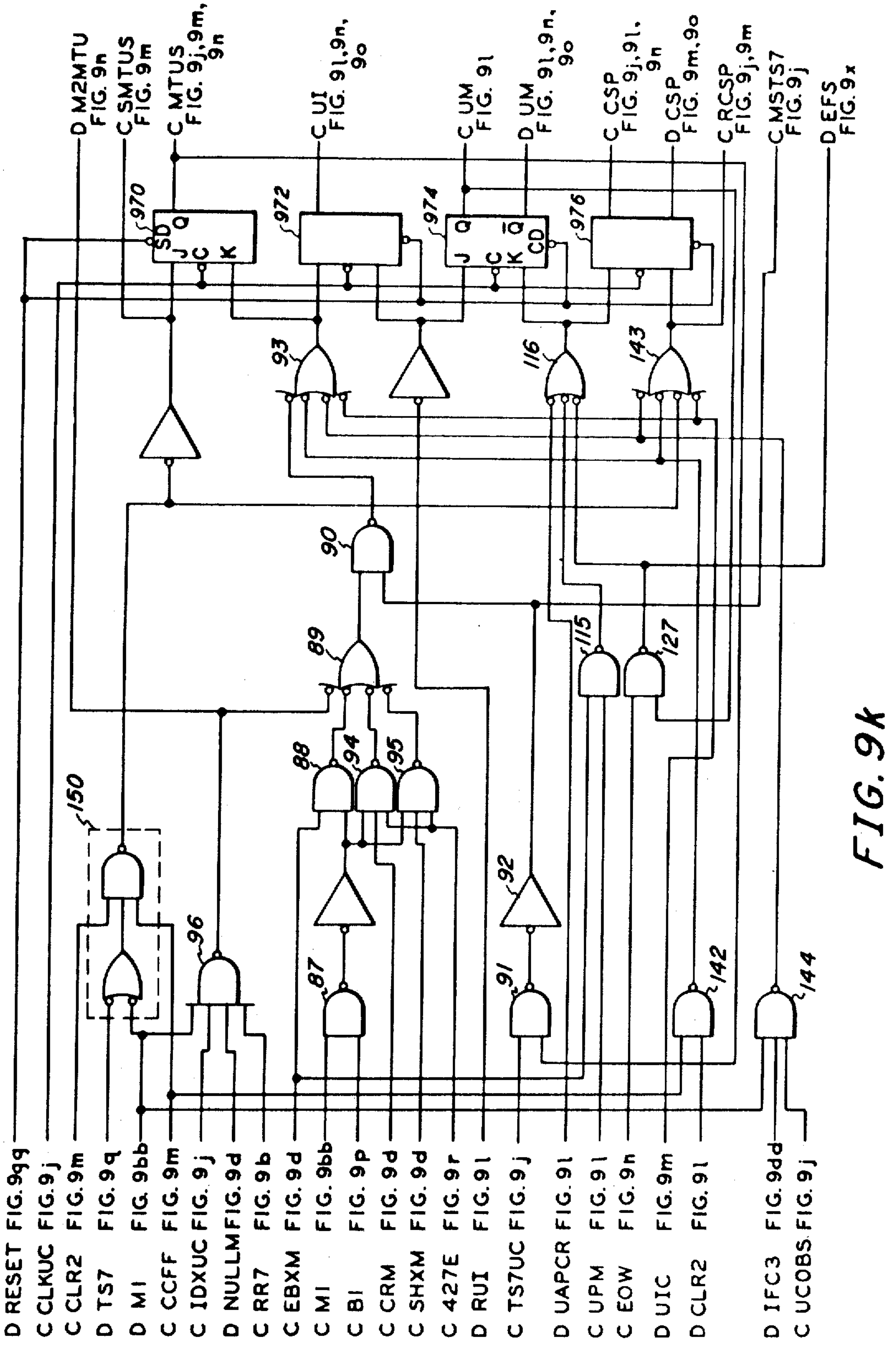
Figure 9I:
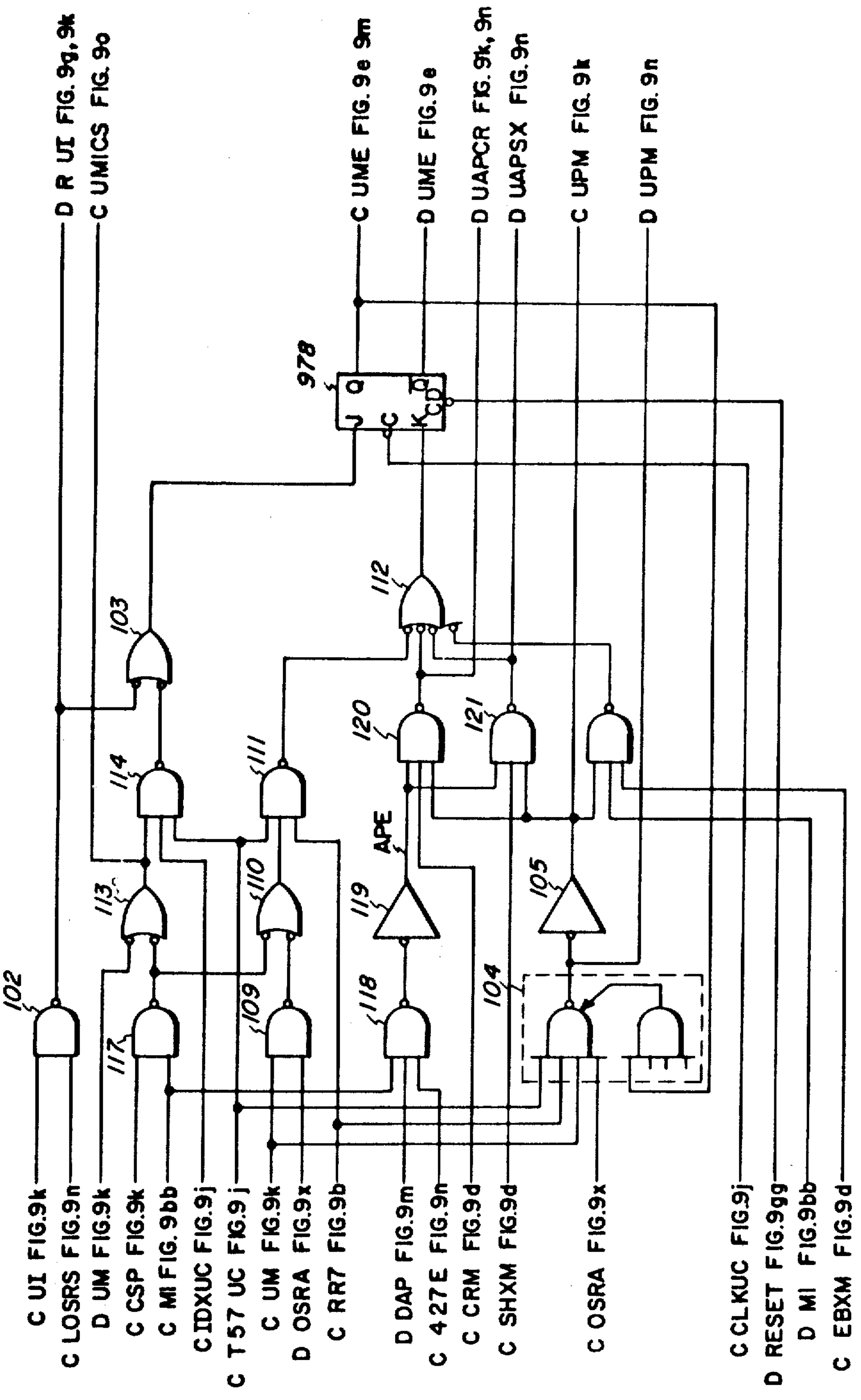
Figure 9M:
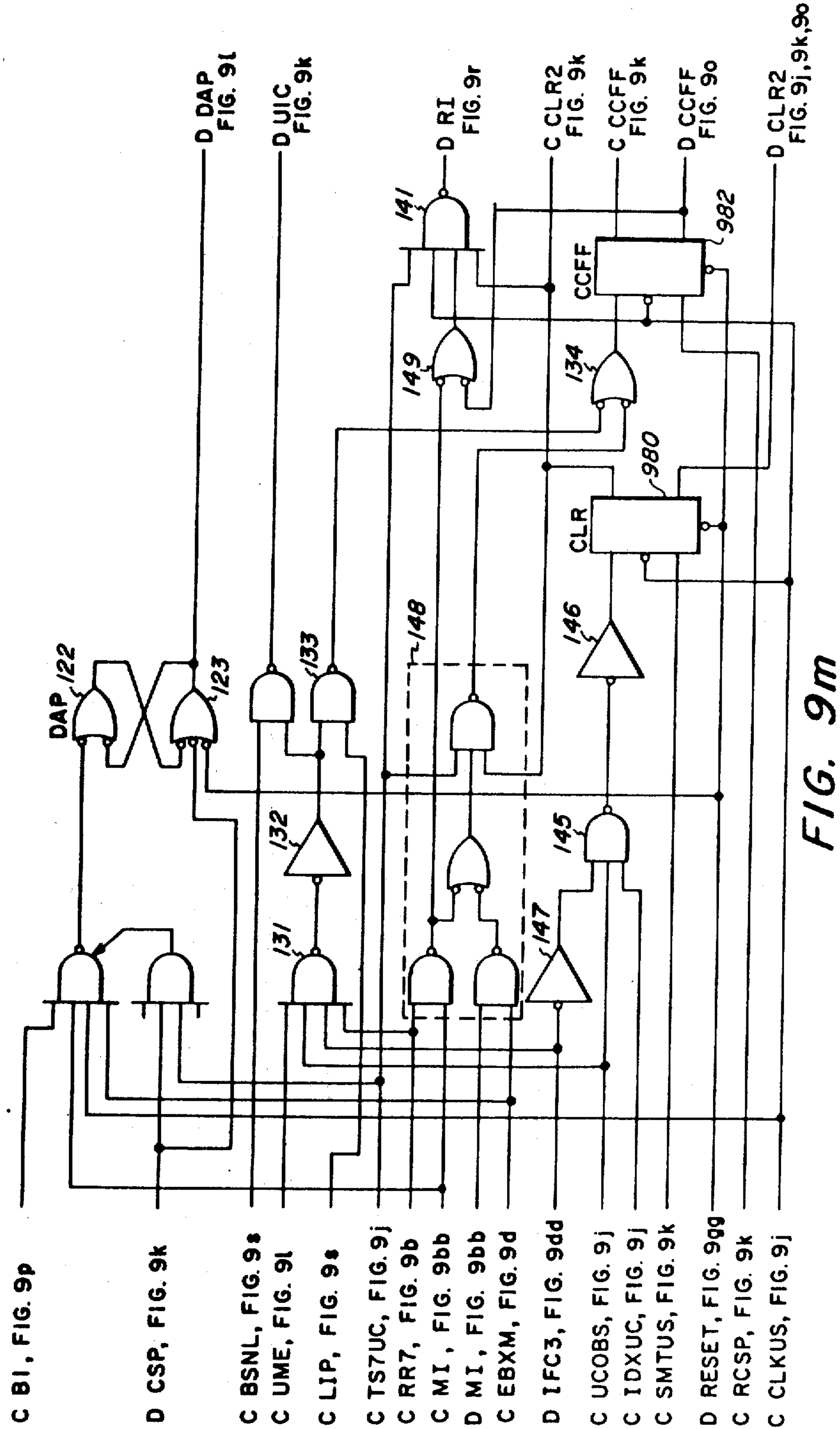
Figure 9N:
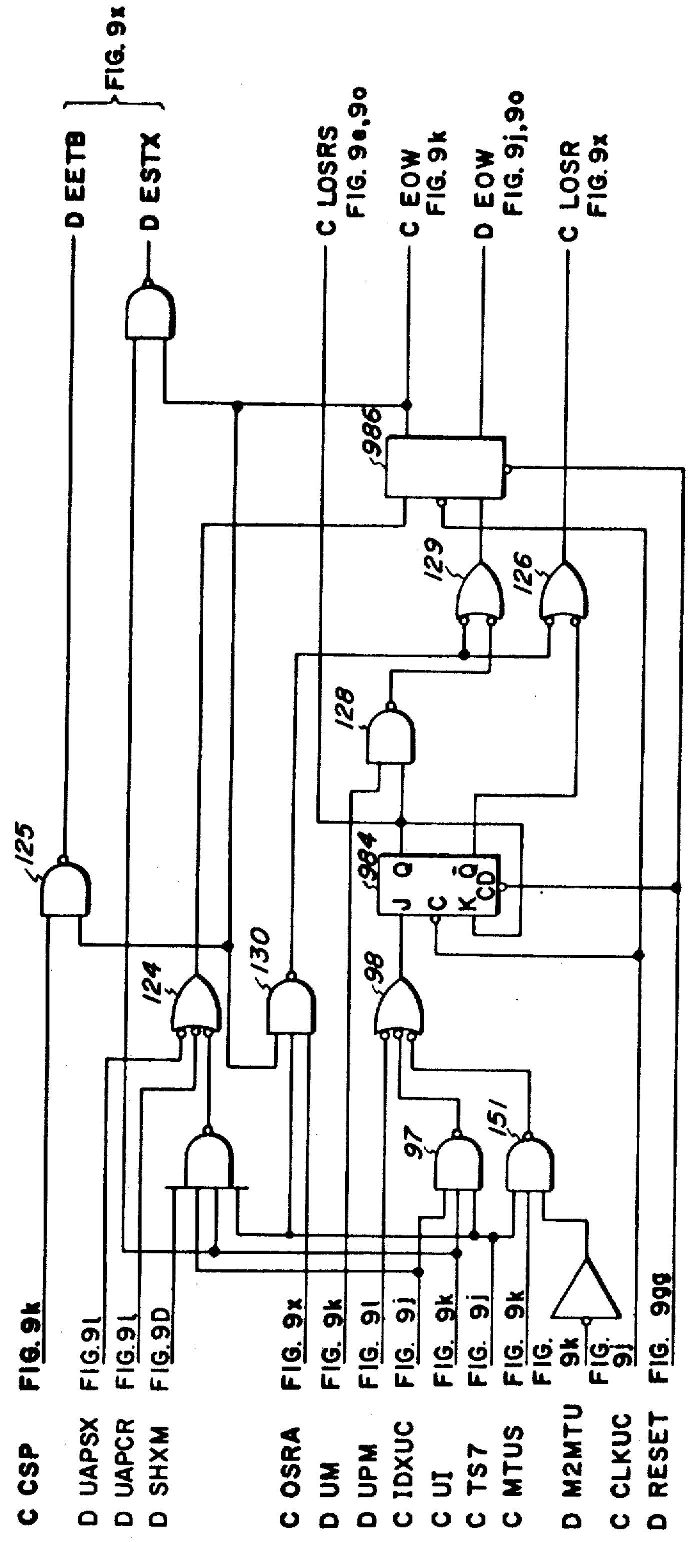
Figure 9O:
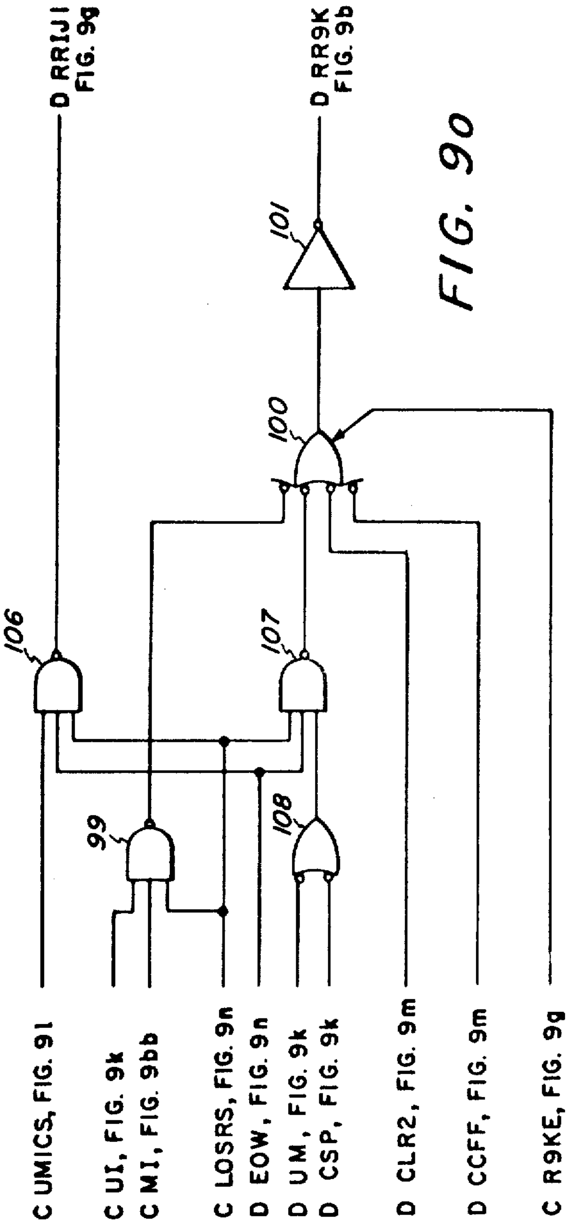
Figure 9P:
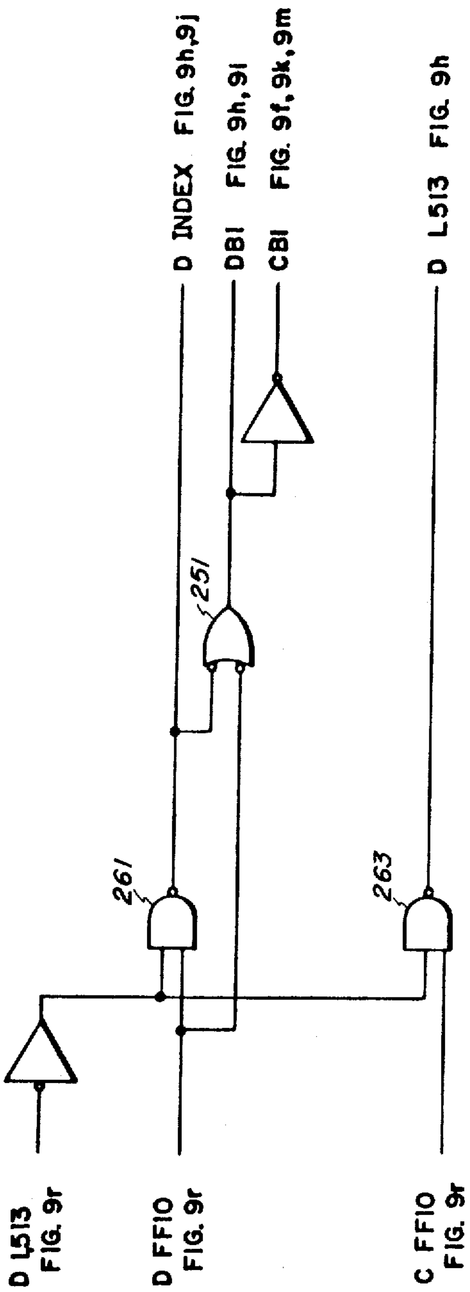
Figure 9Q:
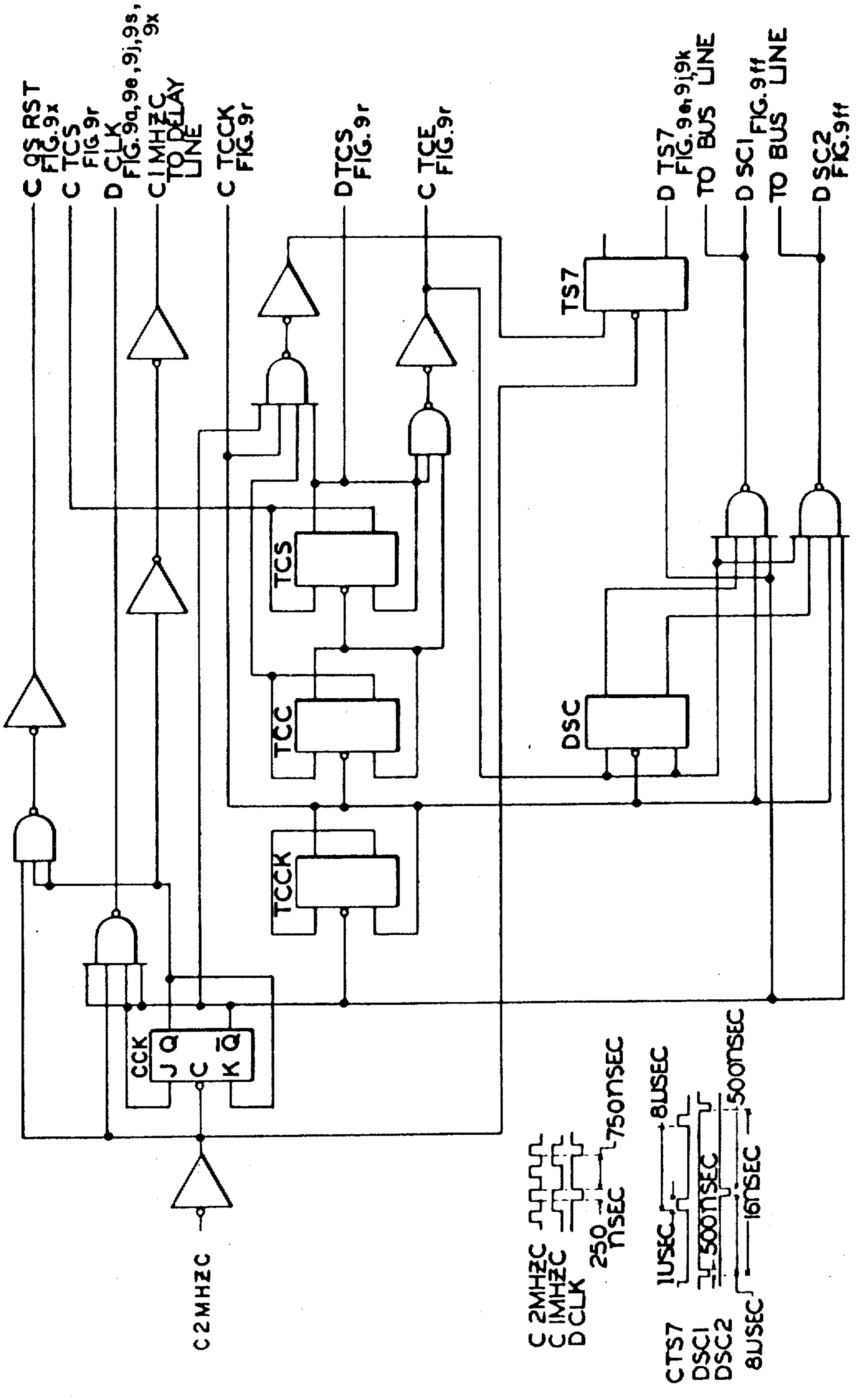
Figure 9R:
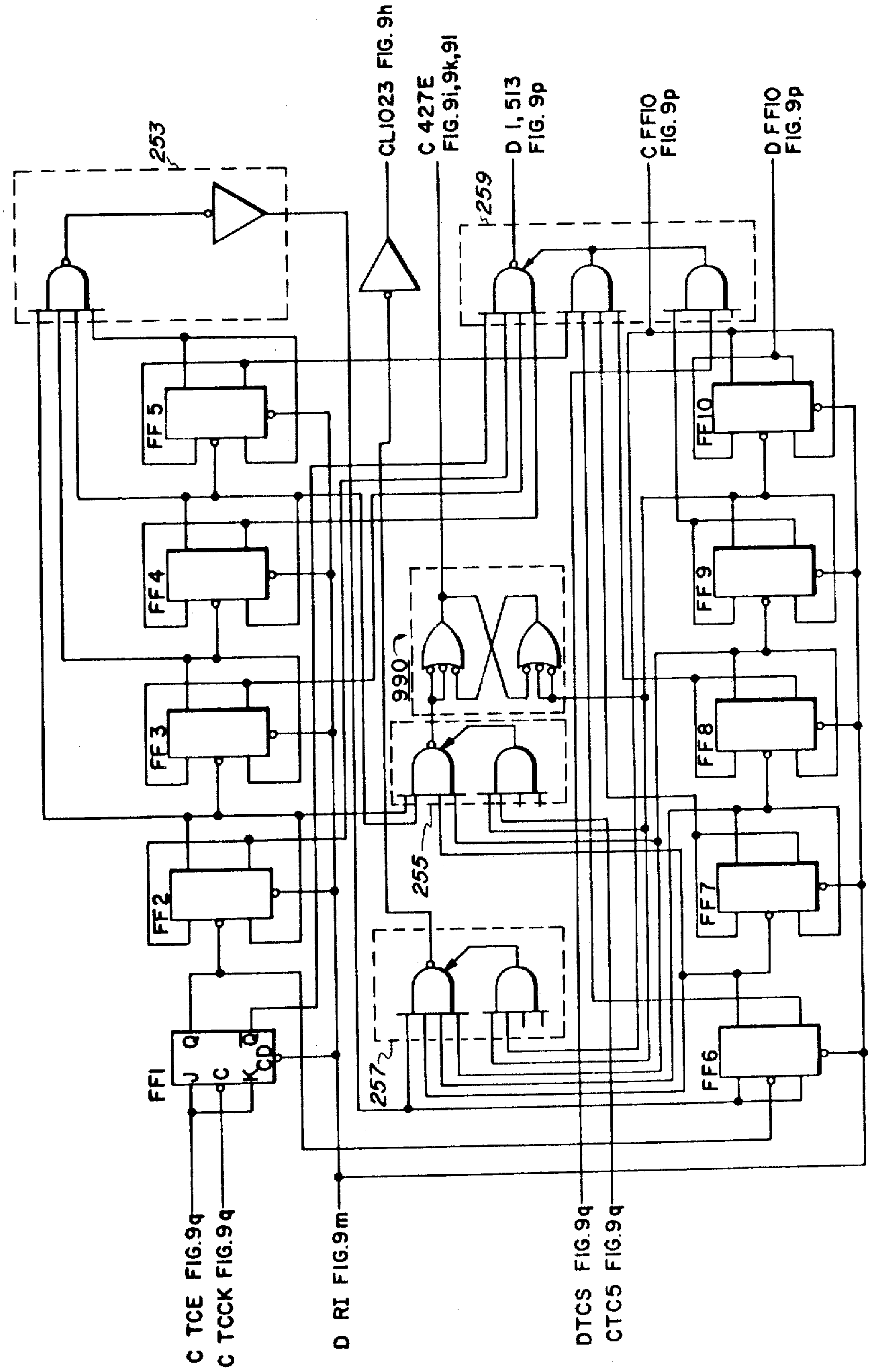
Figure 9S:
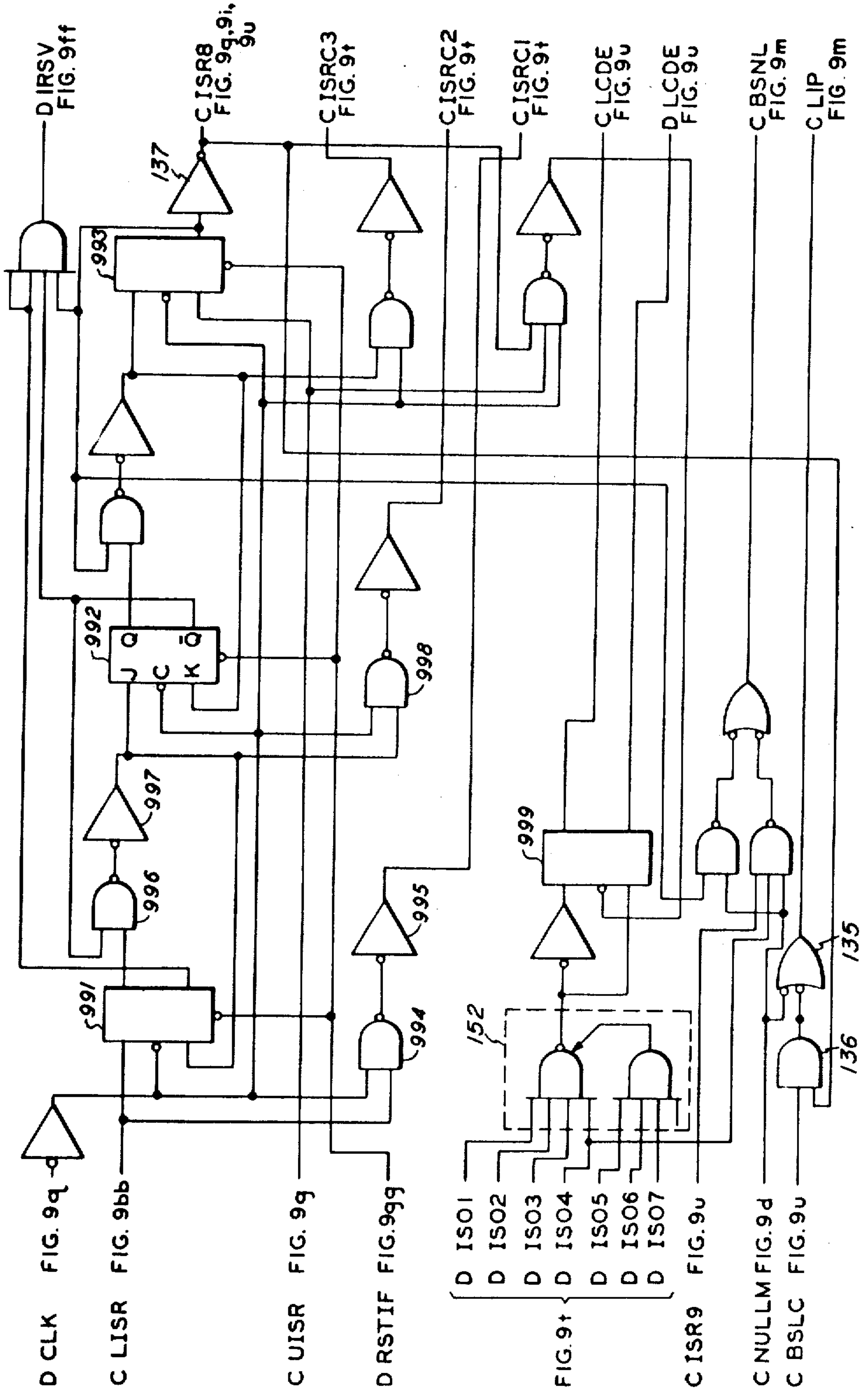
Figure 9U:
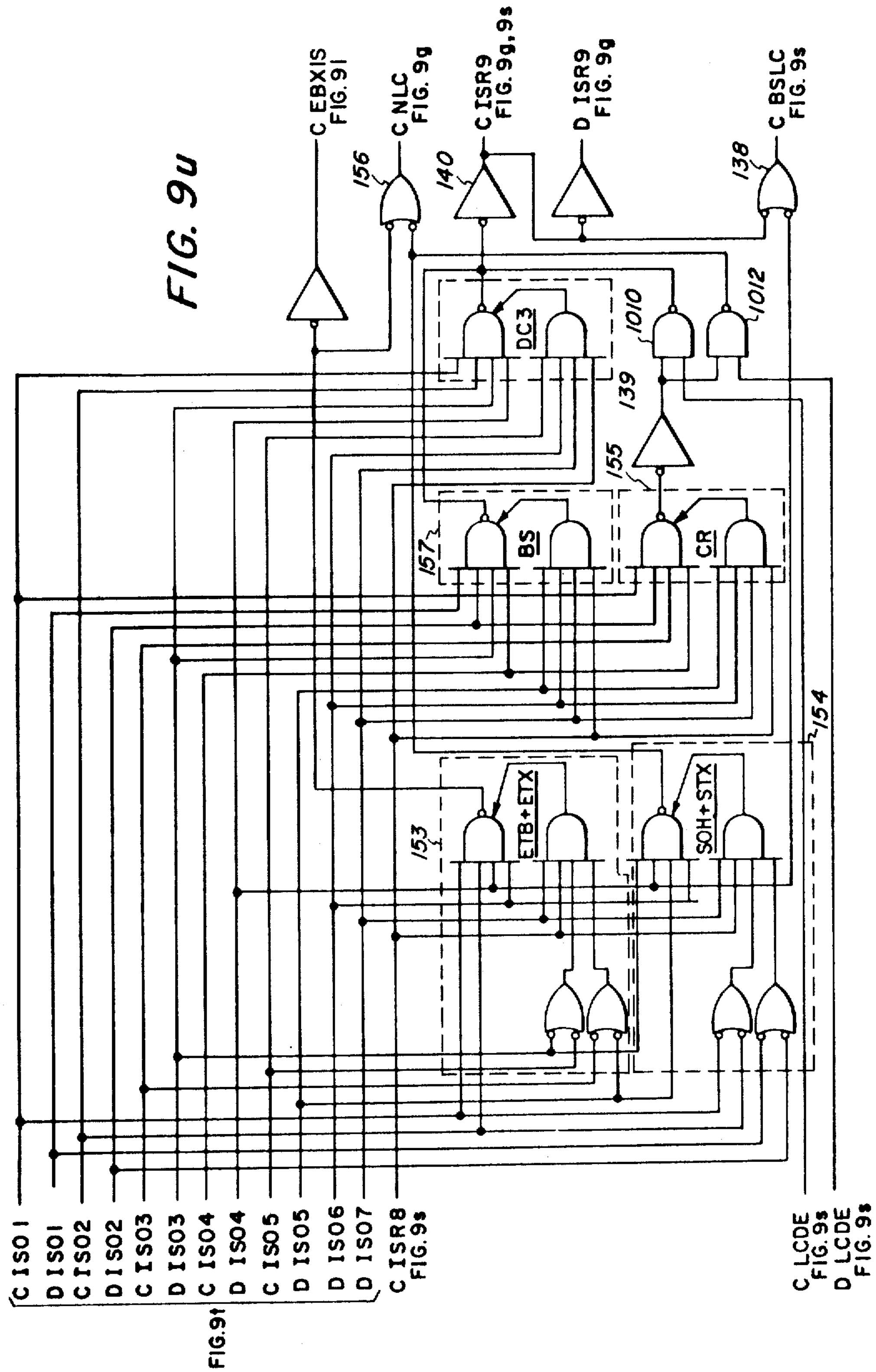
Figure 9X:
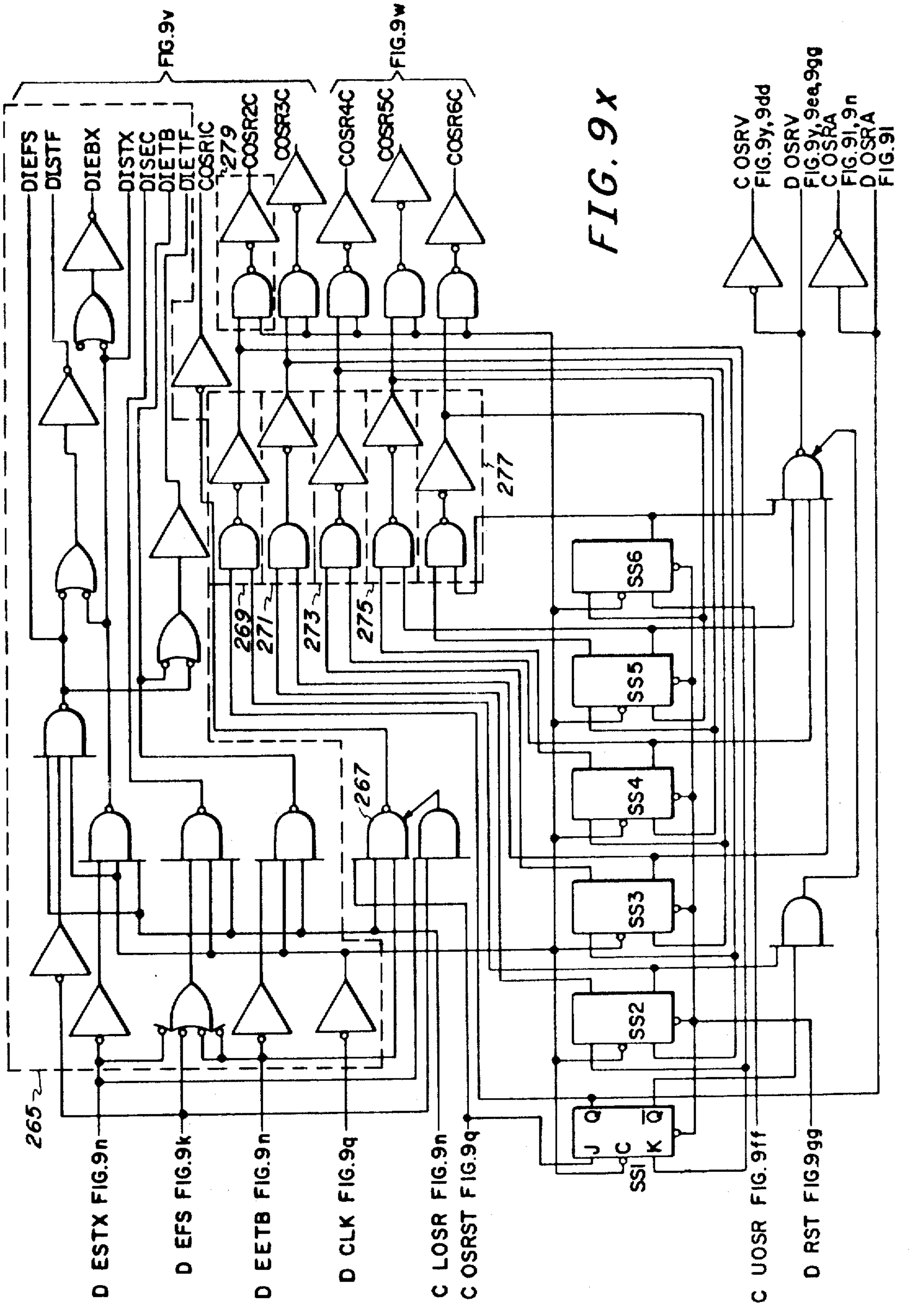
Figure 9Y:
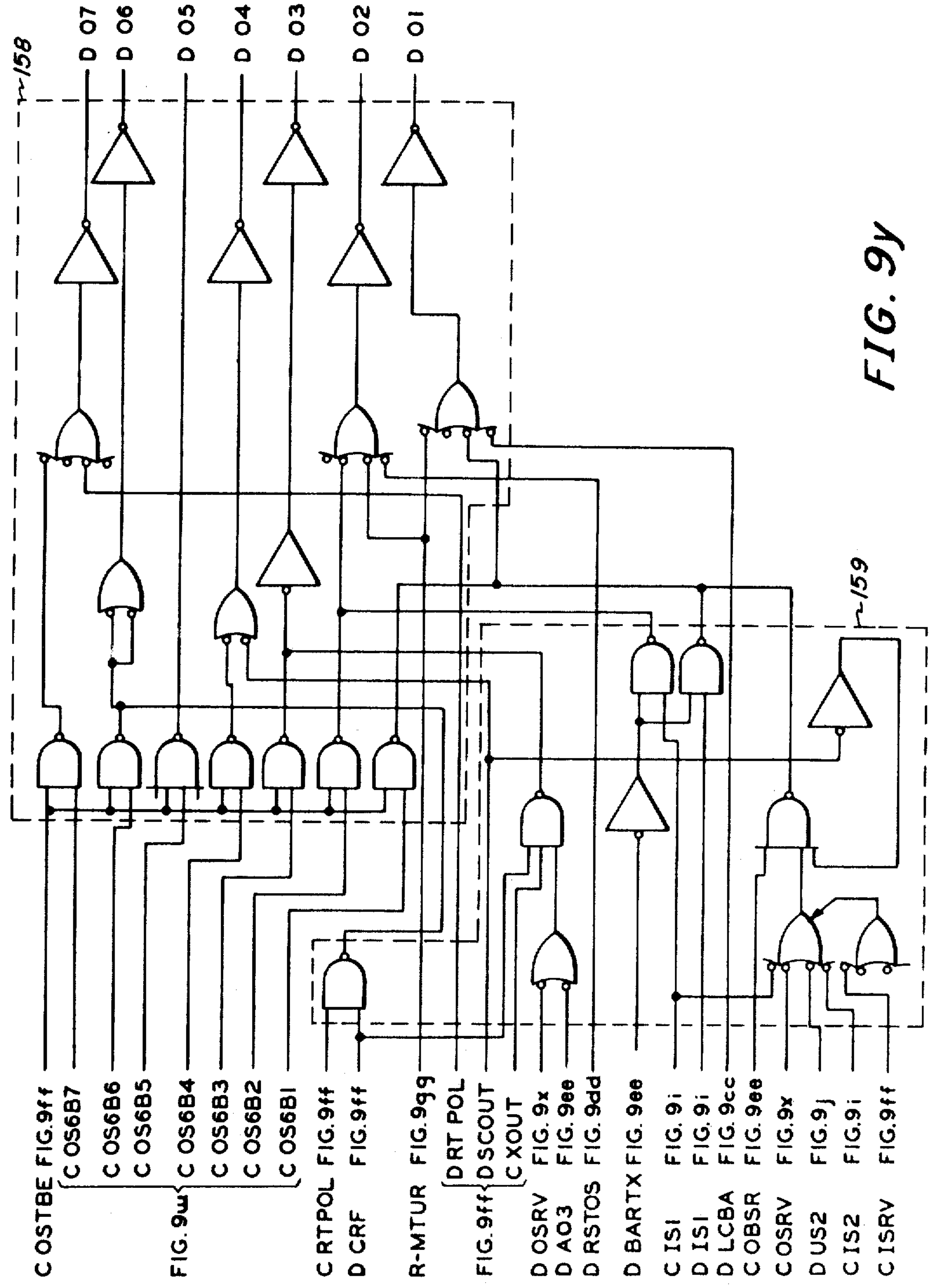
Figure 9Z:
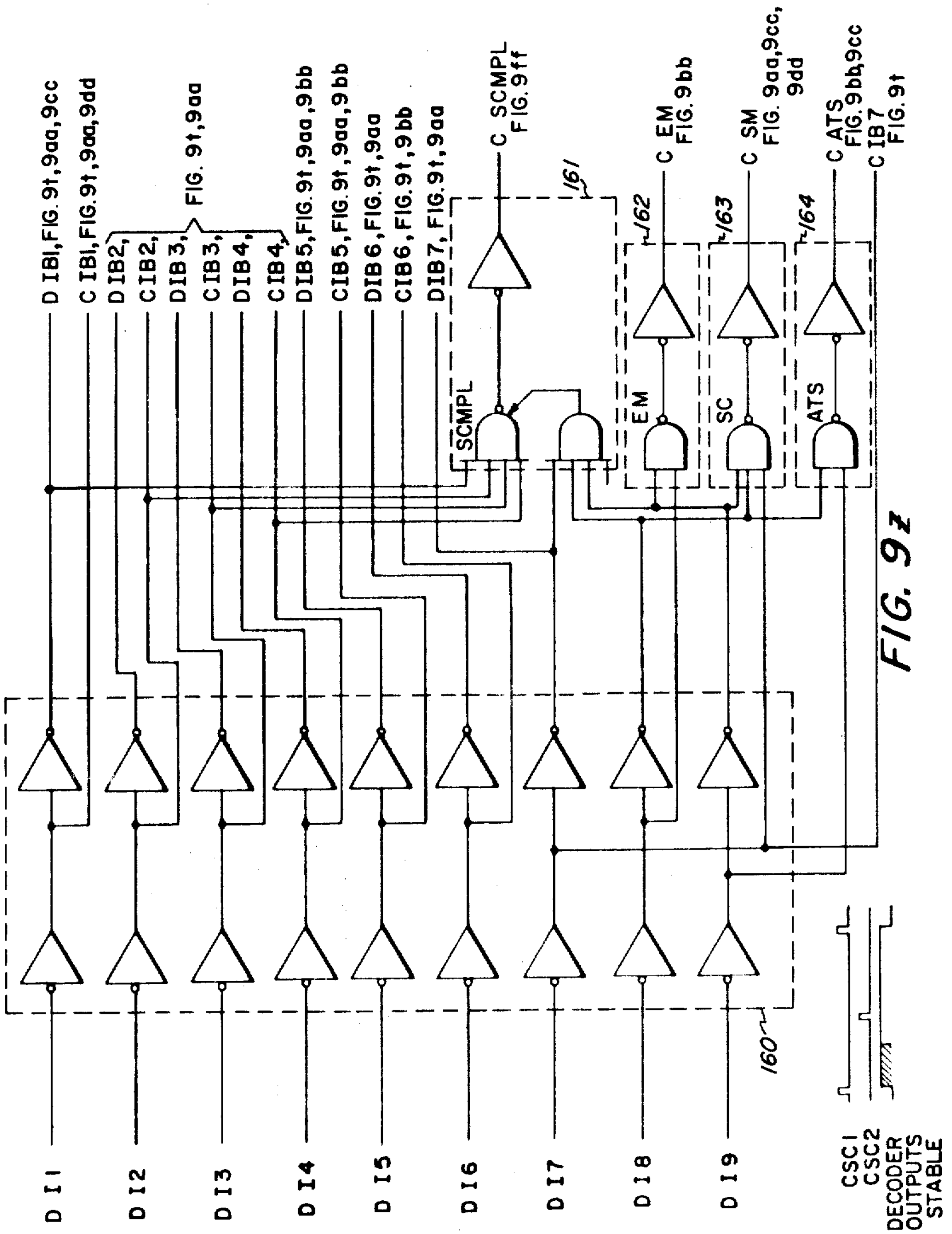
Figure 9A:
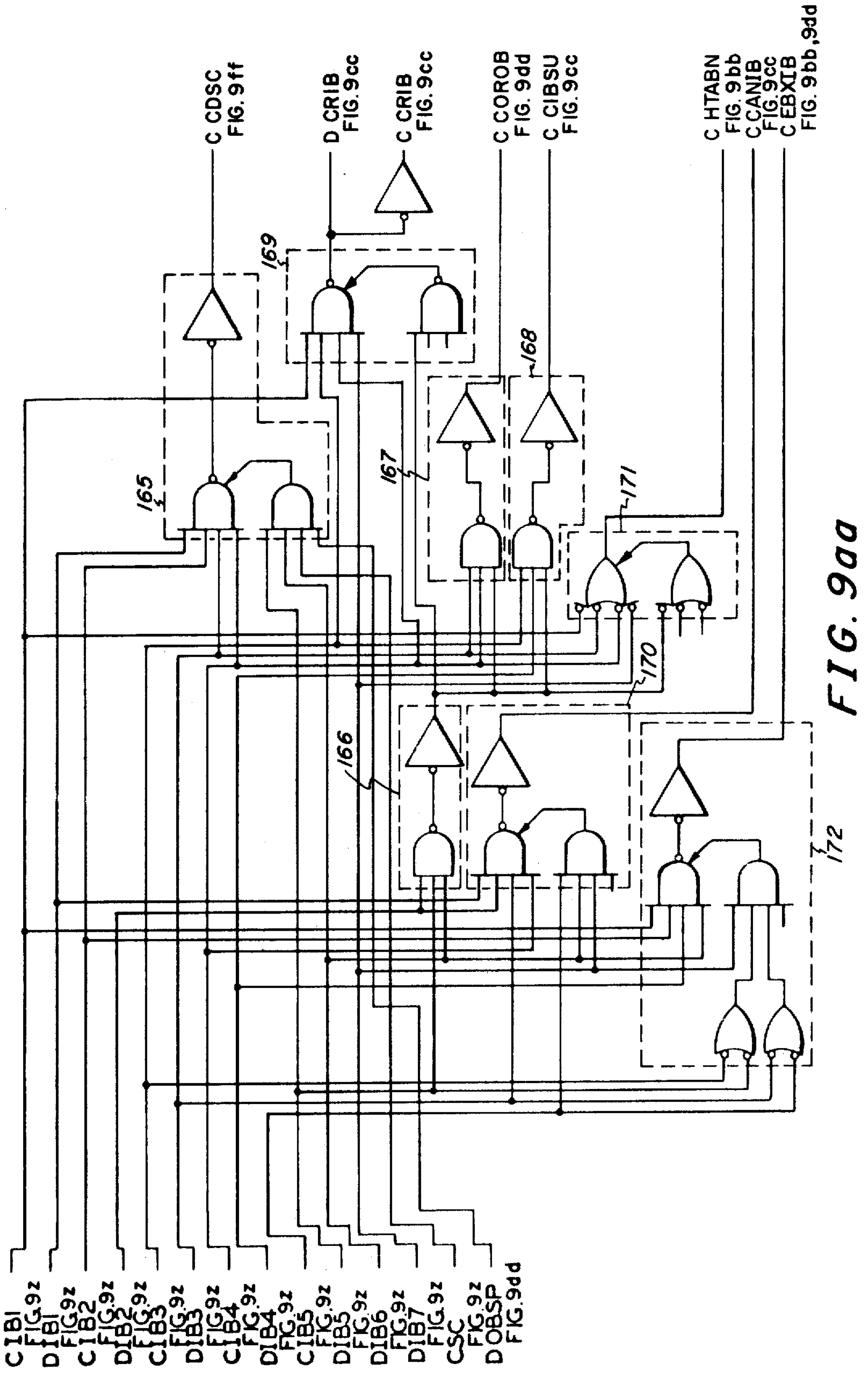
Figure 9B:
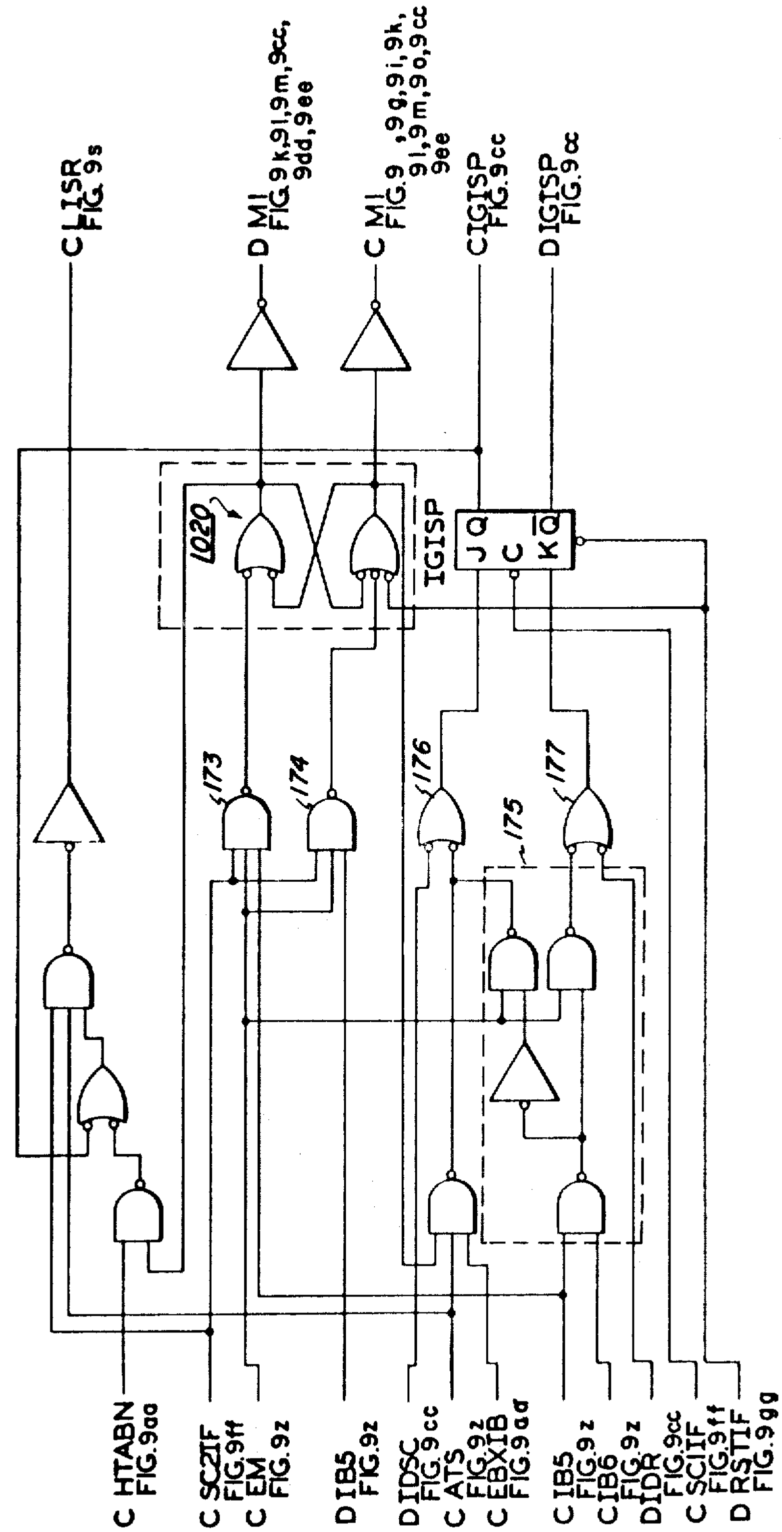
Figure 9C:
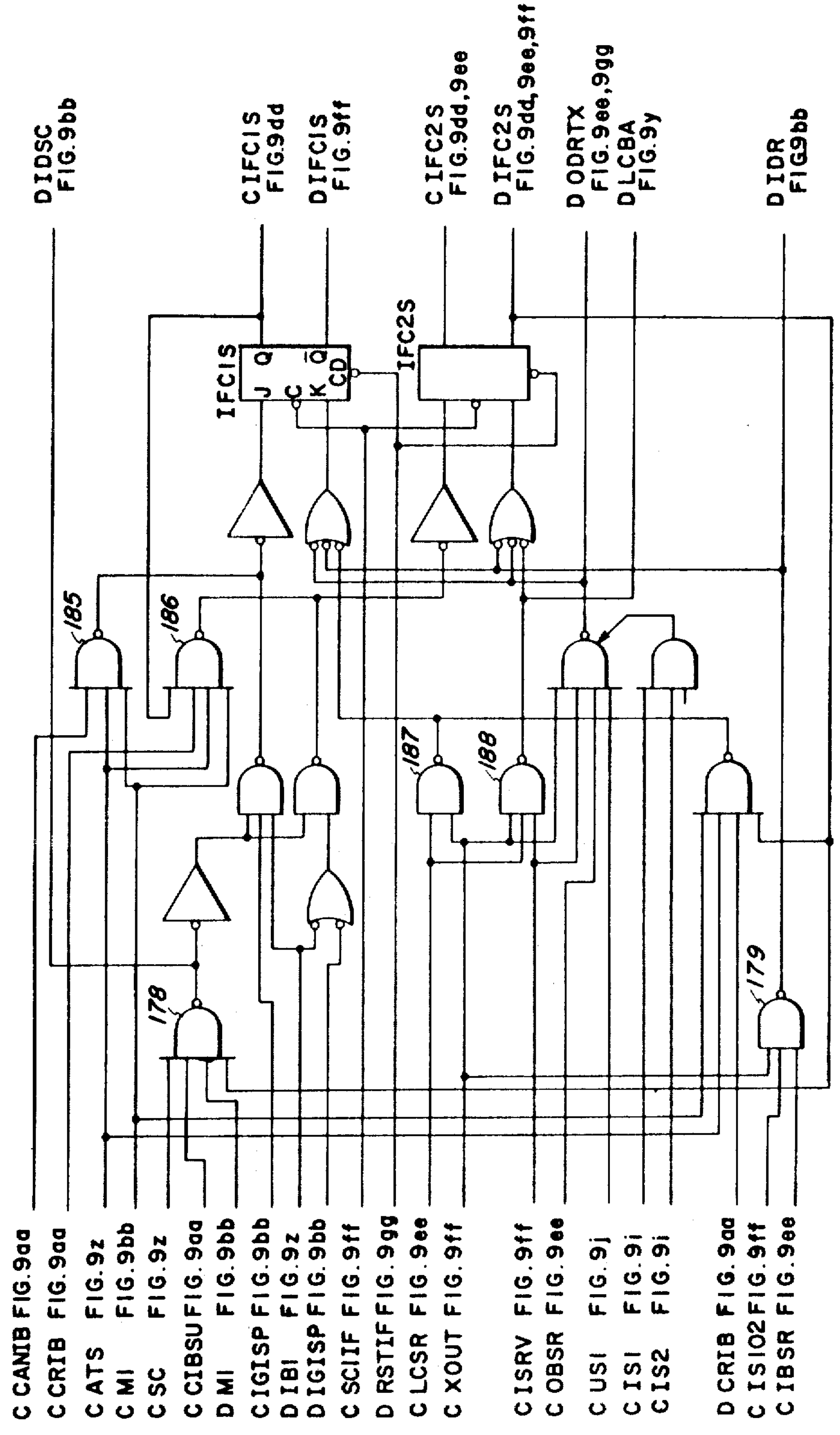
Figure 9D:
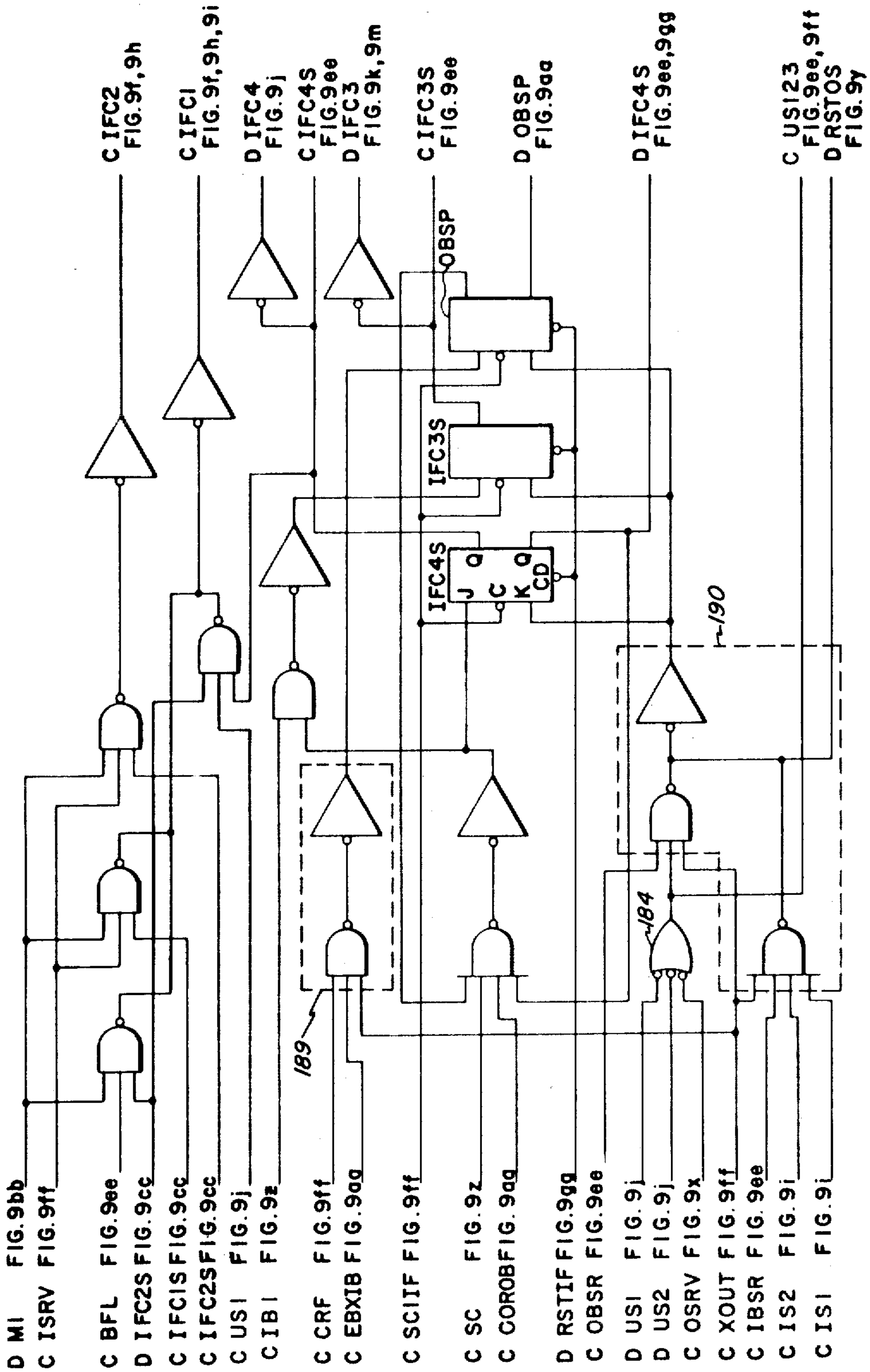
Figure 9E:
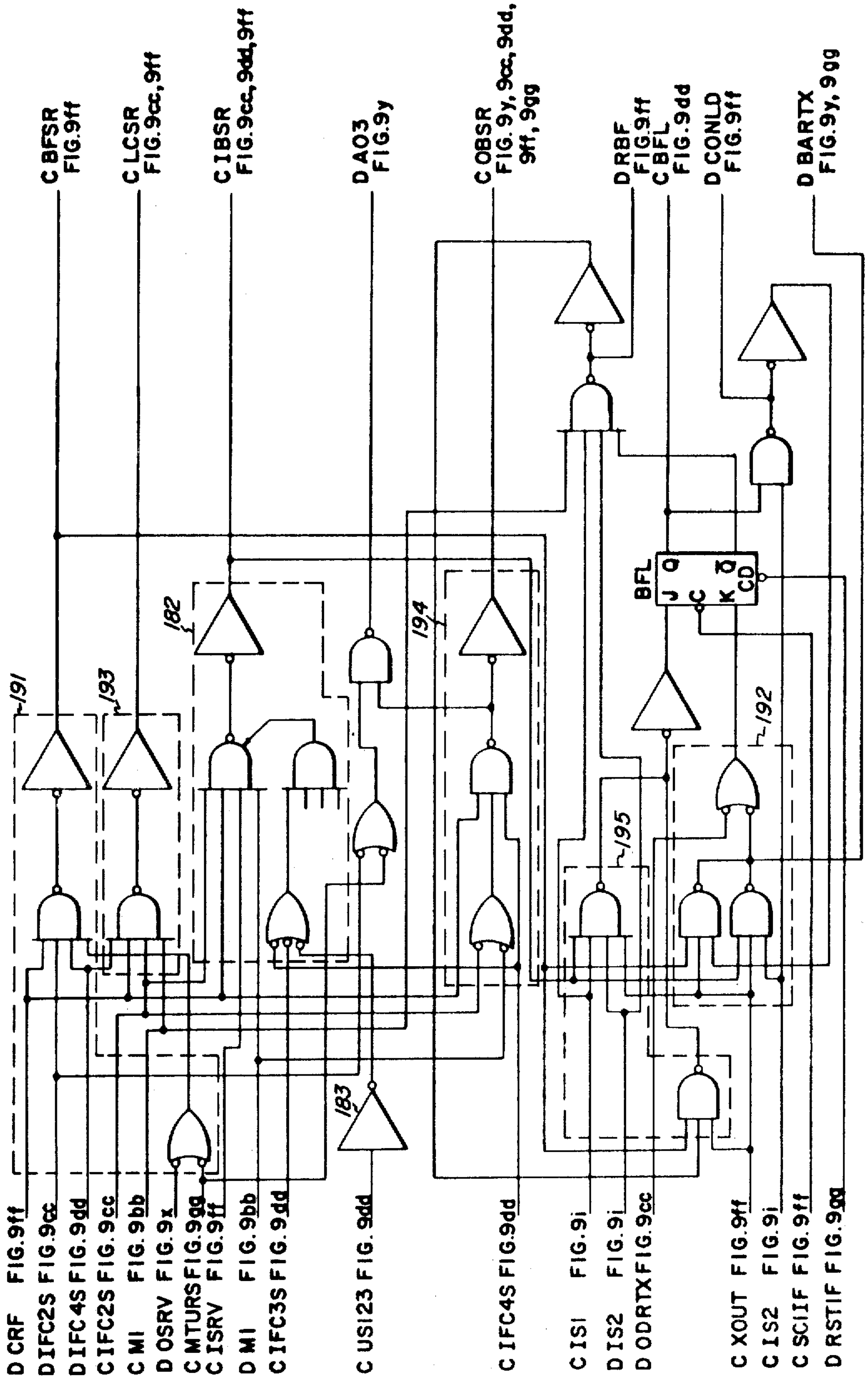
Figure 9F:
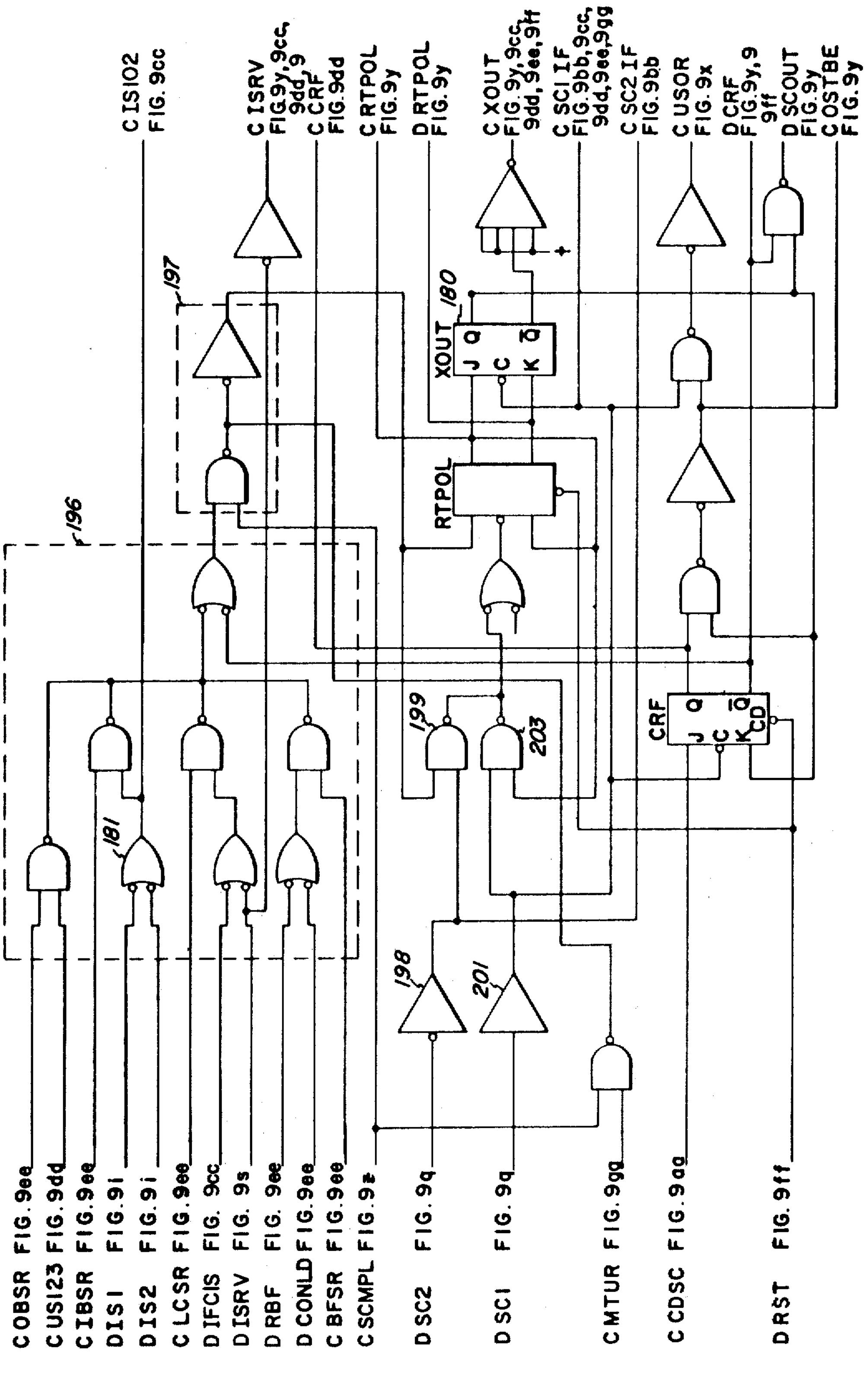
Figure 9G:
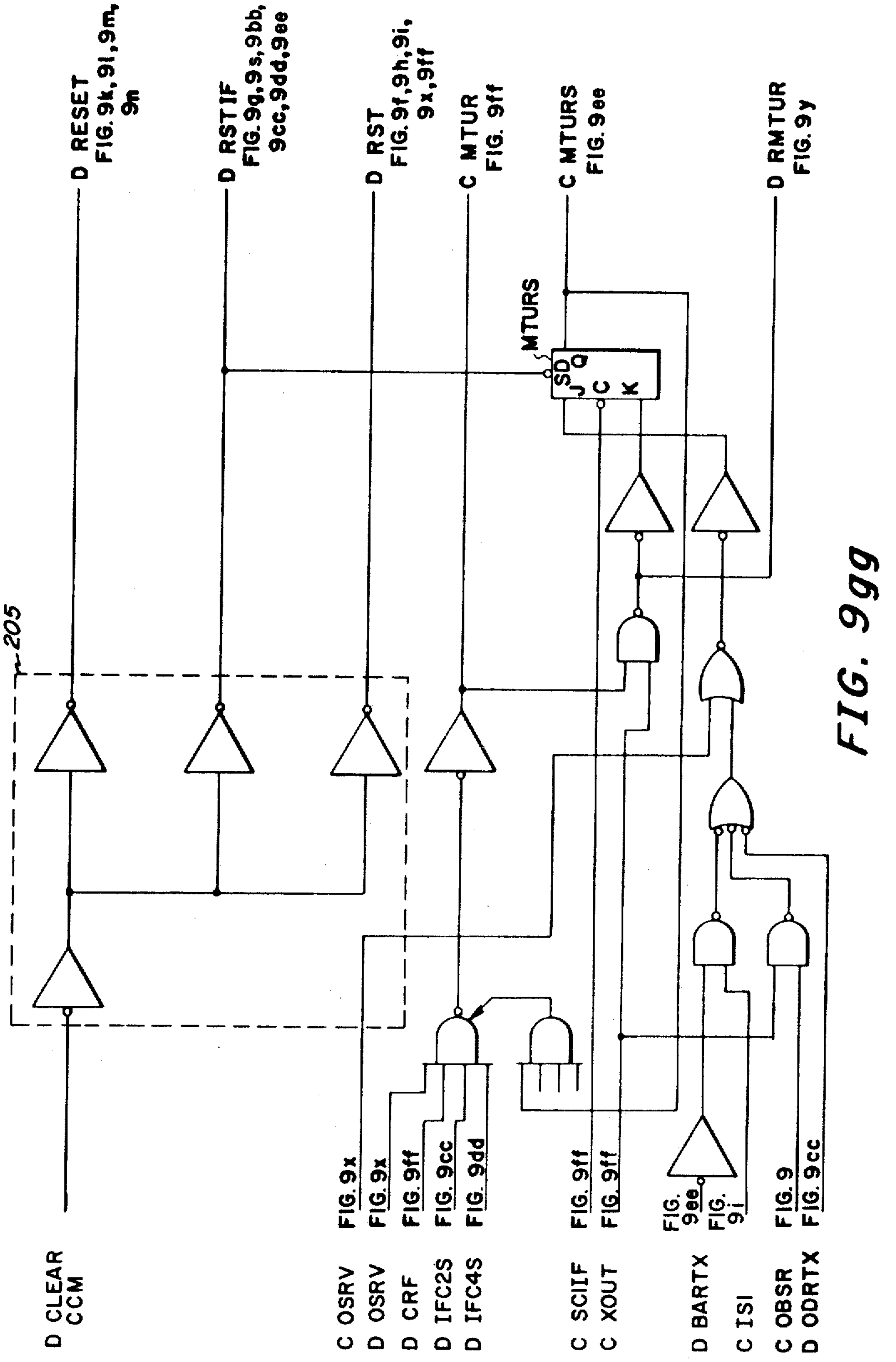
Figure 9B:
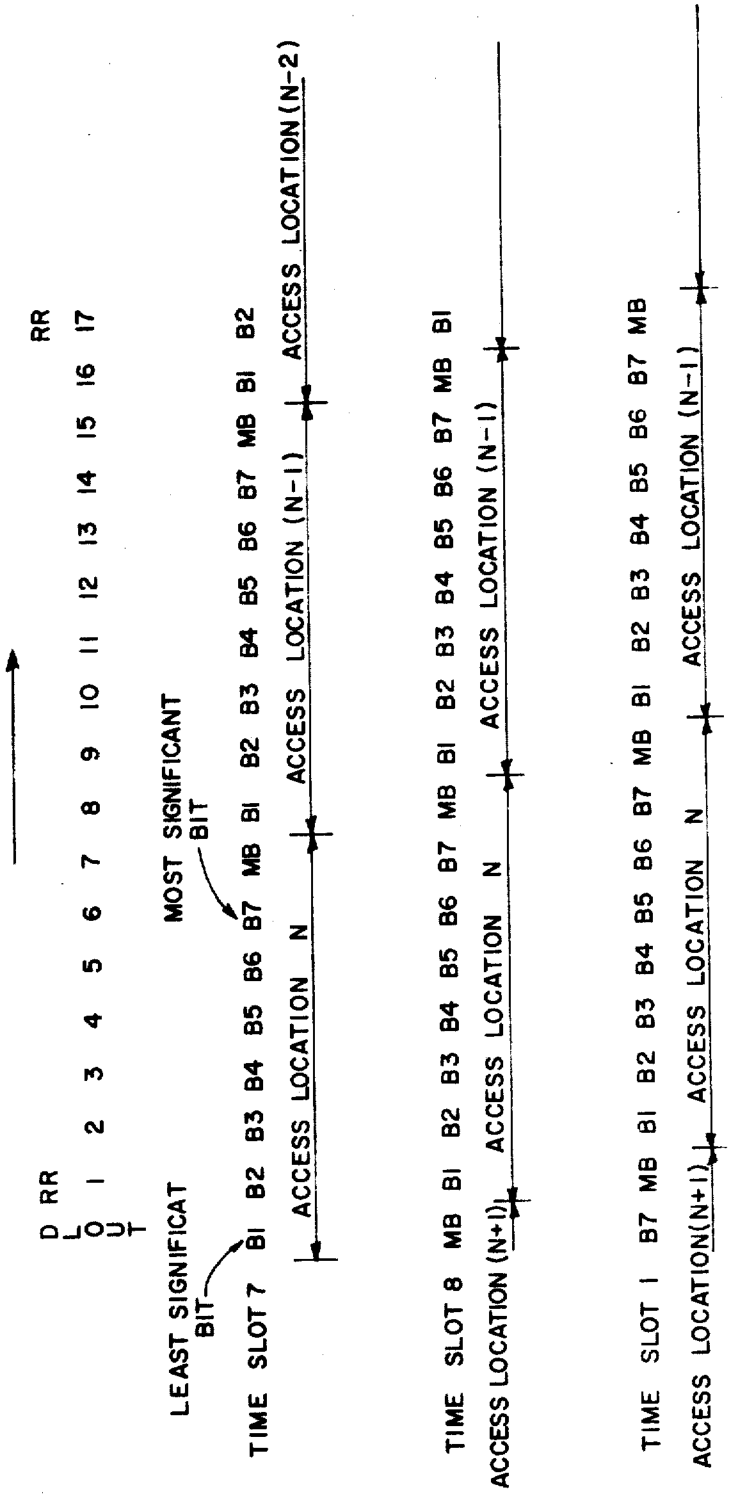

FIG. 9*d* illustrates additional decodes for the STX, ETX, ETB, CR and SOH control codes for decoding the control codes in the N location. D NULLM represents a code for determining the vacancy of the current access location N.

FIGS. 9*e*–9*i* are schematic diagrams of the load control logic. Flip-flop 920 is a register which stores the fact that the null code has been found. The NULLM signal is applied to its set terminal via NAND gate 922. The signal DTS7 is coupled to the other input of NAND gate 922. DTS7 samples the NULLM decoders and sets flip-flop 920 when the null is detected. Flip-flop 920 is only active for one bit time. Flip-flop 922 stores the fact that the access location is preceded by a new line code and monitors CRL and SHXL through gate 6, sampled at TS7 time at gate 7. If either CRL or SHXL signal is active coincident with TS7, flip-flop 922 is set. Flip-flop 922 will only be active for one microsecond out of any 8 microsecond period. Flip-flop 924 indicates that the current load access location is coincident with the unload position marker location and ensures that information is loaded into the location preserving the unload position marker. When flip-flop 924 is active, or set, an operation has occurred which caused the unload position marker to be coincident with the load position marker in Mode I operation. NAND gate 926 couples UME and CRR7 to the set terminal of flip-flop 924 meaning that a bit is located at the access location at TS7 sampling time when a NULLM code and DTS7 is present at the input of NAND gate 922. This particular location may be a load location or an unload location. The unload marker bit should be perserved but at the same time it is desired to load information in that location if that location is available and it is available since a NULLM code is present. Flip-flop 924 therefore protects the marker bit from being destroyed and as information is loaded into memory, the marker bit in that location will not be destroyed because it is used as a designator for the unload control in Mode I and a new marker bit is inserted at the next location as a load position marker. Flip-flop 928 is the load position marker flip-flop and is activated whenever the current access location has a load position marker in it. Flip-flop 928 is active for all load positions other than an index location. The control procedure for loading information into storage says either flip-flop 928 is set or there is a NULLM at index. One or the other is sufficient for loading information into the delay line.

The gate array, indicated by reference numeral 8, controls the set conditions for flip-flop 928. Conditions for setting flip-flop 928 are that DCLR1 be at a logic 0 stage indicating that a load clear operation is not in progress; DOVFLW be at a logic 1 indicating that an overflow condition is not in progress; that CRR7 be at a 1 indicating that a marker bit is present at the access location N; and that DIDXLC be at a logic 1 indicating that the current access location is not the index location. These conditions set up a logic 1 condition at the output of gate 9 which samples for the presence of a logic 1 at the DUME input to gate 10 indicating that the current marker bit location is not contained within the unload marker field and that a logic 1 condition be set up at gate 10 from the output of inverter 11 due to the presence of a logic 0 condition at DTS7 allowing the content of the recirculation register at TS7 time to be sampled and that input CM1 is at a logic 1 condition indicating that Mode I operation is in progress. The active conditions of gates 9 and 922 sets up gate 12 allowing a 1 to be set at the output of gate 13 to initiate the proper setup of flip-flop 928.

Gate 10 is associated with Mode loperation and gate 11 is associated with either Mode I or Mode II operation. Gate 11 is active when loading information into an access location which is presently void of information and gate 10 is active in Mode I when entering information into an access location which contains information which was stepped over during a correction sequence by doing a sequence of backspaces. Flip-flops 920, 922, 924 and 928 are only set for one microsecond (1 bit time) at any given period of time.

FIG. 9*f* includes clear flip-flop 930 which is active in Mode I when a line cancel operation is being performed. After completing the backspaces, the access position is adjacent a new line code. It is necessary that the delay line is cleared from this access location all the way to the index location for the next line. Flip-flop 930 is then set and the clear operation is started. Flip-flop 930 clears out the recirculation register.

When flip-flop 930 is set causing signal DCRR1 to be at a logical 0 state, gate 20 represented by the desired element in FIG. 9*g*, is caused to be active correspondingly causing output DRR9K(FIG. 9*o*) to be at a logic 0 state. When output DRR9K is logic 0, the recirculation register is cleared via gate 3 (FIG. 9*b*) at the synchronous input of flip-flop RR9. Gate 17 initiates the setting of flip-flop 930 in the Mode I line cancel operation. Gate 17 requires the signal input CCSBS to be at a logic 1 state representing the initiation of a correction sequence backspace operation, the signal CISO1L to be a logic 1 state and the signal CIS04L to be at a logic 1 state, these two signals comprising two unique bits from the coded (ASCII) character set which can differentiate the control code backspace from the control code forward step and line cancel, and the signal CSSCL being at a logic 1 condition indicating that flip-flop 922, FIG. 9*e*, has been set since a new line code has been sensed at the N − 1 access location of the recirculation register. Since CSSCL is only available for 1 microsecond, gate 17, and consequently gate 16, are only active for one microsecond sufficient to set flip-flop 930 on the trailing edge of CCLKLC, the signal which represents a high speed clock distributed to the load control logic. The flip-flop 930 is reset when gate 931 is active. Gate 931 senses the fact that the index location is currently equivalent to the access location. Flip-flop 930 requires that the signal CSIC be at its active condition, or logic 1 state, in order to set flip-flop 930. CSIC is active when the conditions of gate 18 are fulfilled. Gate 18 requires that flip-flop 930 be in a reset condition and that the input DICC be at a logic 1 condition indicating that an input command is not in progress indicating that the clear input block command currently requested to initiate a clear operation is a current command and is not a command which has already been completed by the load control, DRR7 must be at a logic 0 condition indicating the absence of a marker bit at the access location and that DM1LC be at a logic 1 condition indicating that a Mode II operation is in progress and that information is being compiled from a high speed input device in a preblocked data format, and that CIFC2 is at a 1 condition indicating that there is a command stored in the interface waiting to be operated on and that CTS7LC is at a logic 1 indicating that the sampling for the marker bit location is occurring at TS7 time. In summary, gate 18, when active, indicates that the current access location does not contain a marker bit, Mode II operation is in effect, a command has been initiated by the interface as a result of the command originating from the input device, this command not being operated on, and the current access location is to be sampled to ascertain whether or not this command can be initiated. Gates 19 and 21 decide in conjunction with gate 18 via gate 22 to initiate the operation requested by the input device. The operation is initiated if the current access location is coincident with the index location represented by an active 0 condition at input DIXLC on gate 21 while CIFC1 is at a logic 0 condition thereby activating gate 22 and setting up conditions at flip-flop 930 for the initiation of a clear operation. If DIDXLC is at a logic 1 condition, gate 19 monitors for the presence of a start code preceded by an end code by looking for an active 1 condition at its input CEBXL and CSHXM such that it may actively initiate a clear operation at flip-flop 930 in conjunction with the signals CIFC1 through inverter 23 applied to the input of gate 22. CIFC1 differentiates between a start unload and a clear input block command.

Flip-flop 932 sets marker bits in through RR9J and is used whenever the buffer is exiting an overflow operation, marking a message block to be unloaded or inserts the Load Position Marker following a Clear Input Block Operation. Flip-flop 932 sets up a marker bit up at the current load, or access location.

Flip-flop 932 is set whenever a clear input block or start unload operation is initiated by the load control. NOR gate 24 samples the conditions of gates 19 and 25 to establish when flip-flop 932 is to be set. Gate 25 samples for a start unload operation to be performed upon a message block which originates at the index location. The inputs to gate 25 must be at an active 1 condition indicating that a start unload command is to be initiated at the index location. Gate 25, when active, in conjunction with the conditions at gate 18 being fulfilled, activates gate 26 thereby setting up the conditions to set flip-flop 932 via gate 27. A second condition for setting flip-flop 932 exists whenever a start unload or clear input block command is to be performed on information which begins at some location in the delay line other than the index location. Gate 19 senses the fact that a start command is accessible at access location N preceded by an end of message code at access location N − 1 and through NOR gate 24 and NAND gate 26 in conjunction with CSIC at an active 1 condition sets flip-flop 932 to insert a marker bit via RR9J at recirculation register flip-flop RR9.

A start unload command requires that start codes stored in the delay line be marked such that the unload control can sense that message as available for unloading to the output device. In any clear input block situation at the initiation of a clear input block command, a load position marker must be inserted into access location N to ensure that subsequent data will be loaded in a continuous fashion within the delay line.

After an overflow has occurred, flip-flop 932 looks for a NULLM code in either the first block of storage or the 513th character location. When it finds one, it sets in a load position marker if a load position marker is not there and forces it to be within the first 513 character locations of memory. Whenever a buffer full situation is exited, 512 character locations should be available. In the case where the 513th character location is vacant, 512 character locations are available.

Gate 28 initiates the insertion of the load position marker at the exit of the overflow condition. NOR gate 29 senses that the current access location is either the 513th location of storage or is contained within the first block of storage. Either DB1 or DL513 set to a 0 conditions gate 28 to sense an overflow condition. Additional requirements of gate 28 are that DM1 be set to a 1 indicating that a Mode II operation is in progress, COVFLW be set to a 1 indicating that an overflow condition has been sensed and the overflow state is in progress, and that input CNLS7 is set to a 1 indicating that the conditions for gate 922 (FIG. 9*e*) have been fulfilled and a NULL code is present at the access location N within the recirculation register thereby enabling the overflow mode to be exited, setting flip-flop 932 and causing the insertion of a marker bit at recirculation register flip-flop RR9 via signal DRR9J. Flip-flop 932 is only active during Mode II operation. During Mode I operation the delay line is prevented for overflowing.

FIG. 9*g* is a schematic diagram of the control lines and gating utilized with the load control flip-flops.

NAND gate 30 sets up the conditions for transferring information from the input silo register to the recirculation register in Mode II operation. Input conditions to gate 30 that must be fulfilled for transfer include CLPM at a logic 1 state representing that a load position marker has been sensed and stored by the flip-flop 923 in FIG. 9*e*; CISR8 equal to a 1 representing that information is present in the input silo register and available for transfer to the recirculation register; and input DM1L equals 1 indicating that the current mode of operation is Mode II. The active condition for the output of gate 30 causes the signal DISRXE to go to a logic 0 condition allowing the parallel loading of the recirculation register from the input silo register as discussed hereinabove. Coincident with the transfer of information from the input silo register to the recirculation register the load position marker must be moved. Consequently, the activation of gate 30 causes DRRIJ to be active thereby causing the insertion of a marker bit at access location N + 1 at recirculation register flip-flop RR1 and gate 20 to be active causing DRR9K to be active and subsequently causing the marker bit at access location N to be removed from storage via the synchronous reset input of flip-flop RR9 of the recirculation register.

In addition to transferring information and moving the marker bit, gate 30 also causes the output silo register to be unloaded by causing CUISR to be active via gate 31. Gate 29 controls the loading of information into the index location in both Mode I and Mode II operations. Gate 32 acts similar to gate 30 in that it also activates DISRXE, DRR1J, CUISR, DRR9K, through the same gate structure to transfer information from the input silo register to the recirculation register, to move the load position marker, and to empty the input silo register. Conditions necessary to fulfill the activation of gate 32 require the input CISR8 to be at a 1 indicating that information is currently available at the input silo register, DCLR1 equal to a 1 indicating that a load control clear operation is not in progress, and DOVFLW equal to a 1 indicating that an overflow is not in progress and CITXLC at a logic 1 state indicating that the index location is the current access location, and that signal CNM originating from flip-flop 920 (FIG. *e*) is set to a logic 1 condition indicating that the current access location contains a NULL code and consequently void of information.

Gate structure 33 is essentially equivalent to a four input NAND gate which presents an active 0 condition at the output of gate structure 33 when the input CM1 is equal to a 1 indicating Mode I operation, the input CLPM is equal to a 1 indicating that flip-flop 928 has stored data indicating that the current access location is the load position location, input DISR9 is equal to 0 indicating that the input silo register does not contain a correction sequence buffer subroutine and input CISR8 is equal to a 1 indicating that the input silo register does contain a code available for entry into the recirculation register. The output of gate 33 through inverter 34 is used in conjunction with the output of gate 35 and gate 36 to initiate a transfer from the input silo register to the recirculation register in Mode I operation when a new line code is present at the output of the input silo register and is to be loaded into storage at an access location which does not contain information.

Gate 32 monitors for either the presence of a null code at the current access location or the absence of a new line code from the input silo register, either condition in conjunction with the output of gate array 33 being active causing gate 36 to initiate a DISRXE pulse to load the information into the recirculation register from the input silo register and to concurrently activate CUISR through gate 31 thereby unloading the output silo register. If the code present in the input silo register is a new line code then DNM will have to equal a 0 in order for gate 35 to have a positive response allowing gate 30 to activate gates 37 and 31 accordingly. If the new line code was not present at the input silo register, then gate 36 would correspondingly activate gates 37 and 31 by virtue of the fact a new line code was not in the input silo register and therefore if a null code was not present at the current access location it would be assumed that the current word to be loaded into the recirculation register is correcting the word currently stored there. Gate 38 in conjunction with inverter 39 monitors for a correction sequence buffer subroutine. A correction sequence buffer subroutine requires that the inputs to gate 40 be an active 1 condition, i.e. CM1 an active 1 indicating that Mode I operation was currently in progress, CLPM equal to a 1 indicating that the current access location is the load position, and CISR9 equal to a 1 indicating that the control code within the input silo register is a correction sequence code, thereby causing an active 1 condition at the output of inverter 39 to be present on signal line CCSBS.

If the buffer subroutine correction sequence is a backspace operation then gate 41 would become active causing DRR17J to go to a logic 0 condition and by virtue of gate 20 cause DRR9K to be at a logic 0 condition thereby causing the marker bit to be transferred from the access location N to the access location N − 1 thereby performing a backspace operation within the recirculation register. Conditions to be satisfied for gate 41 to be in an active 0 condition require that the conditions for gate 38 be fulfilled, that input CIS04L to gate 41 be set to a one condition indicating that the current word in the input silo register is a backspace code and that input DSSCL, the output of flip-flop 922 of FIG. 9*e*, be equal to a 1 indicating that the current access location is not preceded by a new line code. The operation of signal DRR17J and DRR9K for moving the marker bit was discussed previously. Gate 42 is used to sense that a forward step operation is currently in progress. Gate 42 requires that NAND gate 38 and inverter 39 be set into their active conditions indicating that a correction sequence buffer subroutine is in operation and that the input codes to gate 42, DIS01L and DIS04L be set to a logic 1 condition indicating that a forward step operation is to be performed. Gate 42 via gate 43 activates DRR1J and via gates 44, 45 and 20 activates DRR9J causing the marker bit to move from access location N to access location N + 1. Concurrent with moving the marker bit from access location N to access location N + 1, gate 42 via gate 31 activates CUISR unloading the forward step codes from the input silo register.

Gate 46 is also used in the forward step operation to generate a space code when a forward step is being performed over an access location which contains a null code. Gate 46 requires that the input CNM be at a logic 1 condition indicating that flip-flop 920 (FIG. 9*e*) is storing the data indicating that the access location contains a null code, that input DIS01L and input DIS04L are at a logic 1 condition indicating that the current control code in the input silo register is a forward step code, and that the conditions for gate 38 are fulfilled indicating that a correction sequence buffer subroutine is to be initiated. The operation of the signal DGSP emanating from gate 20 has been discussed previously. Gate 47 is active when a backspace operation is to be performed and causes the activation of CUISR via gate 31, enabling the input silo register to be unloaded following the completion of a backspace operation. The conditions for the activation of gate 47 require that gate 38 be active indicating a correction sequence buffer subroutine and CISO4L and CISO1L be equal to the 1, uniquely describing the buffer subroutine as a backspace operation.

Referring now to FIG. 9*h*, it is noted that overflow in Mode I operation represents that period of time when one character is loaded into the 1,023rd character location. As mentioned previously, 1,023 is a signal encompassing the 1,023rd and 1,024th character locations of memory. In Mode I operation, the last character loaded into memory at any given time is location 1,023. Location 1,024 is never loaded since there is three characters of storage outside the delay line in the output silo register to handle more than 1,023 characters. Overflow means that information can no longer be stored into the line and protects all the information already stored. The input device by virtue of the buffer full command sent to it via the SCM interface stops transmitting data. Overflow is exited by finding a NULL M control character in location 513. Even in Mode I operation, it is necessary to ensure that 512 continuous locations of the buffer are available. In Mode II operation, overflow is activated when we load data in the 1,024th location. The basic algorithm for Mode II operation is that any data block received by the computer will always be less than or equal to 512 characters. Consequently, it is expected when loading the 1,024th character to have a marker bit at the index location, the marker bit differentiating the message block starting at the index location from any other message block as being one suitable for unloading to the output device. Because of this, when location 1,024 is loaded, the next bit coming out of memory is sampled to see what the first bit in the index location is, whether it is a 1 or 0. If it is a 1, an overflow condition exists and data is no longer stored. Overflow is exited when a NULL M location is found in block 1 or at the 513th location of memory. Exiting overlfow from this particular mode means that a new load position marker will be inserted. Any unload clear operation always starts at the index location. Since the clear operation starts at the index location and sampling is initiated from there, it is assumed that after an overflow whenever a NULL M code is sampled, it is the first NULL M code relative to the index location. So that if one is found in first block of memory, data which is designated to be unloaded will have been scanned. Therefore a marker bit is set up at the first NULL M location scanned.

Flip-flop 48 stores the fact that an overflow condition has been sensed and controls the overflow mode. Conditions for setting flip-flop 48 and thereby entering the overflow mode require that either NAND gates 49 or 50 be active for setting flip-flop 48 via NOR gate 51. Gate 49 requires that the input signal CL1023 be at a logic 1 condition indicating that the current access location is the 1023rd or 1024th position of memory, and input CFSCTS be set to a 1 by virtue of gate array 33 and gate 44 or gates 42 and 44 being active (FIG. 9*g*, causing CFSCTS to be active and indicating that either a Mode I character to store operation is in progress as indicated by gate 33 being active or by gate 42 being active indicating that a forward step operation is in progress. A Mode I character to store operation or a forward step operation requires the forward movement of a marker bit in memory. This forward movement is sensed and causes the overflow condition to be set. Gate 50 senses that the word being loaded into the delay line and access location 1024 is coincident to the index location thus initiating an overflow mode. In Mode II it is sufficient to realize that a word has been loaded into memory adjacent to the index location to initiate an overflow operation. This is done by gate 50 sampling its input CDLOUT, the input from the delay line which if set to 1 indicates that the current location being loaded is adjacent to the index location, input CAXE set to a 1 indicating that a coded (ASCII) transfer is in process. The overflow condition is exited and flip-flop 48 reset whenever a null code is found in storage location 513 or the first 512 character locations of storage. Flip-flop 48 is reset when gate 52 is active in conjunction with the signal CNLTS7 input to gate 53 is active causing the output of inverter 54, CRBFO, to be set to a one condition thereby resetting flip-flop 48. The signal CNLTS7 senses the fact that a null code is present at the current access location at TS7 time and, by virtue of gate 52, that this null code is present at either the index location, indicated by DIDXLC equal to a zero, or at the 513th location of storage indicated by DL513 equal to a zero, or within the remaining 511 character locations of the first 512 character locations of storage indicated by DB1 equal to a zero. Output gate 55 senses that terminal overlfow has occurred which is a result to an error in either the SCM or the input device and that the overflow condition has been sensed in the absence of a buffer fill condition, by sampling the output of flip-flop 48 and the input DBFLL. A lamp on the terminal panel may be lighted to indicate the error has occurred and was recognized at the SCM. Gate 56 is redundant to gate 55 providing the same error indication. However, gate 55 pulls a common busline LDWN, indicating to the other modules in the terminal that an error has ensued at the SCM and the current data transfer from the input device to the SCM is in error.

Flip-flop 950 controls the recognition of codes between the SCM interface and the load control. Whenever the input block is to be cleared in Mode II operation and the internal module interface code is set up at the interace and load control, the operation is initiated and flip-flop 950 at the completion of the clear operation ensures another sequence is not initiated. In other words, flip-flop 950 is set when the code command is completed and flip-flop 950 is reset when the code command is initiated. The IFC2 line going to the reset side of flip-flop 950 is always active whenever there is an interface command indicating to the SCM to either start unloading or to clear the input block. When IFC2 is removed, the next interface command may be acted upon. For every command that is initiated by the interface there must be a corresponding reaction by the load control. The load control must tell the interface when it has completed its operation to start the unload or clear commands. This is done by using two lines, IS1 and IS2 prefixed by a C or D to tell the interface that an operation has been completed.

Gates 57 or 58 through gate 59 set the conditions for setting flip-flop 950. Gate 57 senses that a clear input block command has been issued and the corresponding load control operation is presently being completed. The inputs to gate 52, CCLR1 equal to 1 indicating that the clear operation is in progress, CRCLR1 equal to 1, indicating that the clear condition is being reset via gate 931 (FIG. **9*f*) and DM1LC equal to a 1 indicating that the current mode of operation is Mode II is sufficient to set flip-flop 950 by virtue of the completion of a clear input block command. Gate 58 senses that a repeat output block command has been issued and that the corresponding load control function is being completed by the control logic. Gate 58 causes flip-flop 950** to be set when the corresponding inputs are set to a logic 1 condition; CSIC, indicating that a status command has been issued by the interface and is being sampled by the load control, CIFC1, indicating that the status command code is a start unload status command code, and CSOM, indicating that the start of message has been located and the start unload insertion of the control marker bit is being carried out.

Referring to the schematic diagram shown in FIG. **9*i*, latch BFLL, comprised of the cross coupled gates 50 and 51, samples when a buffer full condition arises. Latch RTXLL, comprised of the cross coupled gates 62 and 63**, represents a latch which looks for a condition where the delay line is completely vacant. Whenever an operation is completed, the interface must be informed whether the line is completely vacant, whether there is something in the line or if the line is full.

In Mode I operation, the keyboard operator is only guaranteed one complete line of storage any time she sits down to type. Normally when she starts up after the terminal is reset, she knows she has 1,024 characters, but at any other given time she is only really sure that she can finish the current line she is typing. To compensate for this, a guard band is set up in memory using the 427E signal to decide whether or not a buffer full condition exists. Whenever a new line code or start of header, end of a header code, end of block code or temporary end code is loaded within the last 85 character locations of memory, BFLL is set. This condition is fulfilled by the activation of gate 64. Gate 64 requires the inputs to gate 65 to be at a logic 1 state; CCKLC, the high speed clock, CTS7LC, time slot 7 load control distribution, and DB1, indicating that the current access location is within the second block of storage. Gate 65 provides the strobe for sampling the conditions required to set BFLL. Gate 66 provides a NOR function, sampling for the presence of a new line code within the current area of search. Gate 66 requires that one of the three applied inputs be at a logic 0 state in order to actively set up conditions at the input of gate 64. In particular, either input DEBXL, indicating that the current access location is preceded by an ETX or an ETB code, DCRL, indicating that the current access location is preceded by a new line code, or DSHXL, indicating that the access location is preceded by an SOH or an STX code should be at a logic 0. In addition, input CM1 is at a logic 1 condition, indicating that the current mode of operation is Mode I and C427E is set to a 1, indicating that the current access locations are contained within the last 85 character locations of the last half of storage. In Mode I operation, the fact that BFLL is set is translated immediately to the interface.

The BFLL latch is reset whenever NULL M code is found at the index location or within the first block of data or at the 513th location, so that the buffer full case can be exited. Exiting the buffer full case guarantees the operator 512 character locations. Gate 67 senses the buffer full overflow condition. The BFLL latch is reset when gate 67 becomes active by virtue of the inputs CCKLC and CRBFO being at an active logic 1 condition. CCKLC provides the basic high speed clock strobe and the strobe CRBFO, via gate 67, resets the cross-coupled latches formed by gates 60 and 61.

CRBFO is at a logic 1 condition when the conditions have been fulfilled via gates 52, 53 and 54 of FIG. 9*h* such that flip-flop 48 is steered to a reset condition as previously discussed.

In Mode I operation, the BFLL latch is set whenever an end of block code exists in the 512 character locations in memory. In Mode II, 512 continuous locations of storage must be available prior to every data entry into the delay line. Therefore, when an end of line code is received and stored in the last half of memory and there is no longer 512 character locations, latch BFLL is set after a complete data block has been stored into memory. The conditions for setting latch BFLL are fulfilled by gate 68 in Mode II operation. The inputs to gates 63 are required to be at a logic 1 condition; DB1 indicating that the current access location is within the last 512 character locations of storage, DM1LC, indicating that the current mode of operation is Mode II, CLPM, indicating that the flip-flop 928 (FIG. 9*e* ) has been set and the current access location has been deemed to be a load position, and CEBXIS, indicating that the current code in the input silo register which is about to be loaded into the recirculation register is an end of message code, ETX and ETB. The latch is not reset until the SCM is commanded to either start to unload or to clear the input block.

The RTXLL latch, or flip-flop, constantly monitors the index location. If an NULL M code is present at the index location, it is set and when it is set, it represents the fact that either the index location or the whole delay line is vacant. Gate 69 provides the impetus for setting flip-flop RTXLL. The setting of the latch RTXLL requires gate 69 to be active which correspondingly requires the inputs thereto to be at a logic 1 condition. The required inputs are CNLTS7, originating from gate 922 shown in FIG. 9*e*, CCKLC, the high speed clock sampling pulse, and CIDXLC, indicating that the current access location is the index location. Latch RTXLL is reset when there is data in the index location. The cross-coupled latches formed by gates 62 and 63 are reset when the inputs to gate 70 are at a logic 1 condiiton. These inputs are CIDXLC, indicating that the current access location is the index location, CISR8, indicating that the current access location is to be loaded by a word from the input silo register, and CNM, originating from flip-flop 920, FIG. 9*e*, indicating that the current access location is void of information and can be loaded by the load control logic. The combination of the BFLL and RTXLL latches represent four codes that are transferred to the interface. The four codes indicate: (1) there is something in index but a buffer full case is not present so that a message is in progress or currently being loaded into the line, (2) the buffer full condition, (3) there is nothing in index and the SCM is ready to exit and go into a new mode of operation, and (4) there is no response, the status not being known. The gate represented by dashed element 71 permits transfer of information stored in the BFLL and RTXLL latches to report the status of the load control to the interface via signal lines CIS1 and CIS2. The output of element 71 is active when one of the three following conditions are fulfilled:

1. DM1LC is at a logic 0 indicating that the current mode of operation is Mode I requiring that the status of load control be transferred to the interface as soon as the current status is changed,
2. CIFCI and DIC2LC are set to a 1 indicating that the interface is requesting the transfer of the status of the load control directly to the interface under Mode II operation, or
3. that DICC be at a logic 0 condition indicating that flip-flop 950 has been set in Mode II operation and the interface requires the transfer of the status from the load control directly.

The gate array represented by dashed element 72 samples the cross-coupled latches 60 and 61 forming the BFLL latch an cross-coupled latches 62 and 63 forming the RTXLL latch for coding and transferring the status of the load control as depicted by these latches to the interface module. When RTXLL latch is set, by virtue of a logic 0 at the output of gate 63, element 72 applies under the conditions of element 71 being in a logic 1 condition, a logic 1 condition on outputs CIS1 and CIS2. With the RTXLL latch set and CIS1 and CIS2 equal to a logic 1 condition, the status transfer to the interface is that the load control has sensed that the storage element is completely void of information. Under the conditions of BFLL latch being set a logic 0 would appear at the output of gate 61, thereby forcing the output of element 72, CISI, to be at a logic 1 condition. With BFLL set to a 1, it is inconsistent for RTXLL to be set at logic 1. Therefore, the condition at gate 63 will be a logic 1 forcing the output CIS2 to be at a logic 0 state. CIS1 at a logic 1 condition and CIS2 at a logic 0 condition informs the interface that the load control logic is at a buffer full status. The third status transferred to the interface is the status buffer available. Under this condition both the latches BFLL and RTXLL are reset, forcing a logic 1 condition at the outputs of gates 61 and 63 and a logic 0 condition at the output of gate 60, thereby forcing the CIS2 output of element 72 to be at a logic 1 condition and the CIS1 output of logic element 72 to be at a logic 0 condition. A logic 1 condition applied at the output CIS2 and a logic 0 condition applied at the output CIS1 indicate to the interface that the load control status is buffer available. If the logic element 71 output is a logic 0 then the corresponding code at the CIS1 and CIS2 outputs of element 72 would be a logic 0 indicating to the interface that the current status of the load control logic is unavailable.

FIGS. 9*j* –9*o* show the schematic diagram of the unload control logic. In FIG. 9*j*, flip-flop 960 is similar to flip-flop 950 of the load control section. In particular, when the command code commands the output block to be cleared or repeated, flip-flop 960 makes sure that a subsequent status command code does not start another operation via the gate represented by dashed element 73. Gate 73 indicates that an unload control output block status is present from the interface and a command code is to be operated upon. In order to initiate the command operation required by the interface, gate 73 needs the following conditions to be fulfilled; flip-flop 960 must be in a reset condition indicating that the current operation has not been acted upon by the unload control, DIFC4, the input to inverter 74, must be at a logic 0 condition indicating that a command code is available from the interface to be acted upon, DCLR2 must be at a logic 1 condition indicating the unload control is not currently in a clear operation, DTS7 is at a logic 0 condition at the input to inverter 75 indicating that time slot 7 has occurred and the operation may be initiated if the access location available is at that location of storage at which the command code can be initiated. Inverter 75 output CTS7UC represents the logic 1 TS7 condition for distribution to the unload control. When the conditions for gate 73 are fulfilled inverter 76 distributes the active condition of gate 73 as a logic 1 condition via the signal line CUCOBS indicating to the unload control that an unload output block status is available and a command from the interface is to be acted upon. Lines CUSI, DUSI and DUS2 are similar to lines IS1/IS2 in the load control and represent the unload control status. They are connected to the SCM interface and indicate to the interface the status of the unload condition. Latch CISL stores the fact that there is no more information to be unloaded. After a clear output block condition has been completed, the interface will monitor these two lines to determine the status of the unload control logic. The interface ascertains whether or not there is another block of data ready for the output device or if the line is vacant. Latch CISL is essentially redundant of RTXL in the load control logic in that if monitors whether or not there is something in memory. Latch MIPL also senses whether or not there is something in memory and the combination of these two signals represents the response to the interface command i.e., (1) the memory is vacant and no information is available to be presented to the interface (2) a message is in transit, currently being loaded but not available for an unload operation, or (3) the memory appears vacant, check the status of the input silo register. Initially at power on time, flip-flop 970 (FIG. 9*k*) is set and the IFC4S flip-flop (FIG. 9*dd*) is reset causing signal DIFC4 to be at a logic 1 condition thereby forcing flip-flop 960 to be positively steered into a reset condition. The reset condition of flip-flop 960 disables transfer gates 77 and 78 forcing a logic 1 condition at outputs DUS1 and DUS2 indicating that the unload status is unavailable for the interface. Initially at power on reset time, latch CISL formed by the cross-coupled gates 79 and 80 and latch MIPL formed by the cross-coupled gates 81 and 82 are in a indeterminate state and placed into a determinate state by action of the gates 83 and 84. The interdeterminancy of latches CIS1 and MIPL at power on reset time is of little consequence to the storage control logic since these latches are not presented to the control logic until various sequences have been fulfilled by the control logic at a time prior to satisfying the conditions for gates 83 and 84 to positively steer the latches CISL and MIPL into determinable states. Gate 83 sets the latch CISL via gate 79 and resets the latch MIPL via gate 82 concurrent with the fulfillment of gate 83 active input conditions. Gates 83 and 84 monitor the storage index reference point to determine if information is contained thereat. Gate 83 sets CISL and resets MIPL concurrently when DCLK input to inverter 85 is at a logic 0 condition causing a logic 1 condition to be at the corresponding input of gate 83, thereby strobbing the remaining conditions for gate 83 to act upon the latches. The remaining conditions required are; CNULLM at a logic 1 condition indicating that the current access location of storage is void of information, DINDEX input to gate 86 at a logic 0 condition causing the logic 1 condition to be presented to the corresponding input of gate 83 by inverter 86 indicating that the current access location is the index location of storage, and that input CMSTS7 is at a logic 1 condition indicating that the unload control logic is in a message to unload search mode indicated by the setting of flip-flop 970 (FIG. 9*k*) and that time slot 7 has occurred. The conditions required to reset latch CISL via gate 80 and set latch MIPL via gate 81 are fulfiled by gate 84 requires that gate 84 be strobed by the high speed clock DCLK sampling the access location equivalent to the index location, the sample occurs at TS7 time in a message to unload search, and that the access location contain a character other than a null code. Thus gate 84 samples the storage at the same point as the gate 83 but looks for the signal DNULLM to be at a logic 1 condition indicating that the access location contains data. DNULLM represents the logic 1 complement condition of signal CNULLM thereby assuring that gates 83 and 84 are active concurrently and thus positively steering the latches CISL and MIPL. When the unload control output block command has been completed and flip-flop 960 is set, gates 77 and 78 are conditioned such that the status of latches CISL and MIPL are transferred via the signal lines DUS1 and DUS2 to the interface logic. When latch CISL has been set forcing a logic 1 condition at the output of gate 79 latch MIPL is reset forcing a logic 0 condition at the output of gate 81. Under the condition that flip-flop 960 is set, a logic 0 condition and a logic 1 condition are transferred to signal lines DUS1 and DUS2, respectively, indicating that the memory is vacant. When the latch CISL is in a reset condition causing the output of gate 79 to be at a logic 0 condition and the output of gate 80 to be at a logic 1 condition and the latch MIPL is in a set condition forcing a logic 1 condition at the output of gate 81, conditions are fulfilled at gate 78 with flip-flop 960 set such that the signal line DUS2 has a logic 0 condition and the signal line DUS1 has a logic 1 condition indicating to the interface that a message is in transit. Under the conditions of a logic 1 condition at the signal line DUS1 and a logic 1 condition at the signal line DUS2 indicating that gates 77 and 78 have not been primed by their corresponding inputs to indicate the status of the unload control corresponding to the condition on signal lines DUS1 and DUS2, indicates to the interface that the status of the unload control is either undeterminate or unavailable. In addition, the unload control monitors the load control to see if the information has been designated to be transferred out to the output device.

Referring now to FIG. 9*k*, four flip-flops 970, 972, 974 and 976 are the SCM unload control state register flip-flops. Each flip-flop corresponds to a unique state of the unload control logic. Flip-flop 970 is the message to unload search flip-flop, flip-flop 972 is the unload index flip-flop, flip-flop 974 is the unload mode flip-flop and flip-flop 976 is the clear status pending flip-flop. Each flip-flop is a control flip-flop within the SCM unload control referencing a unique state of the unload control circuitry. Each flip-flop defines the function of the unload control and, in conjunction with the mode of operation, provides a unique operation for the control of data being unloaded from the recirculation register into the output silo register. At reset condition, the unload control enters a message to unload search mode wherein flip-flop 970 is set to a 1 and flip-flops 972, 974 and 976 are set to a 0. Flip-flop 970 searches the delay line for a message to unload. In Mode I operation, flip-flop 970 defines the search for an ETX or ETB control code within the first block, or 512 characters of storage. Under these conditions flip-flop 970 is reset and flip-flop 972 is set concurrently transferring the unload control from the message to unload search mode into an unload index mode. Under these conditions gates 75, 76, 77, 78 and 79 are active, steering the K input to flip-flop 970 and the J input to flip-flop 972 such that both flip-flips move on a trailing edge of the same CCLKUC clock pulse. Gate 87 monitors the condition that the unload control is being steered in a Mode I operation and that the current access location being sampled is in the first block of storage, requiring the inputs CM1 and CB1 to be at a logic 1 condition, thereby conditioning one input to gate 88. An ETB or ETX signal is also required to be stored at the current access location indicated by a logic 1 condition at the input CEBXM to activate gate 88 forcing a logic 0 condition at the output of gate 88 to be transferred to gate 89, thereby forcing a logic 1 condition at the corresponding input to gate 90. Gate 90 monitors the condition of gate 91 via inverter 92 presenting a logic 1 to the input of gate 90 by virtue of CTS7UC being at a logic 1 condition indicating that the timing pulse TS7 is currently available and that flip-flop 970 is set indicating that the unload control is in a message to unload search mode. The conditions required by gate 90 are thus fulfilled forcing a logic 0 at the output of gate 90, forcing a logic 1 at the output of gate 93 and steering flip-flop 970 to be reset and flip-flop 972 to be set. If an ETX or an ETB code is not contained within the first block flip-flop 970 defines a message to unload as a valid operation when a carriage return, SOH or STX code is located within the last 85 characters of first block. The presence of the carriage return, SOH or STX code defines that a message partition code is to be sent to the output device by the SCM. The logic conditions necessary to transfer the unload control from a message to unload search mode into an unload index condition are fulfilled by logic gates 94 and 95. Gate 94 samples storage for the presence of a carriage return code in the last 85 character locations of the first block of storage, and gate 95 samples storage for an SOH or STX code located in the last 85 character locations of block 1. Logic gates 94 and 95 are conditioned, or primed, by fulfilling the conditions of gate 87 indicating the Mode I operation is in progress, that the access location is within the first block of storage and that the signal line C427E is set to a 1 indicating that the access location is within the last 85 character locations of the first block of storage thus priming gates 94 and 95 to sample for the presence of the carriage return, SOH or STX CODE. If this sampling indicates a positive response for a carriage return stored at the access location input, CCRN will be set to a logic 1 at the input to gate 94 thus fulfilling the conditions for gate 89. The output of gate 89 operates in conjunction with the fulfillment of conditions at gate 91 (via inverter 92) at the input of gate 90 to force a logic 1 condition at the output of gate 93 and consequently steering flip-flop 970 to be reset and flip-flop 972 to be set. If the decision is to be made on the presence of an SOH or STX code within the first 85 positions of the first block of storage then signal input CSHXM will be set to a logic 1 condition at the input to gate 95, C427E will be set to a logic 1 and the conditions at gate 87 will be fulfilled indicating that Mode I operation is in progress and the current access location is in the first block of storage thus forcing a logic 0 condition at the output of gate 95. A logic 1 condition will appear at the output of gate 89 sampled at gate 90 by TS7 via gate 91 and inverter 92 forcing a logic 0 condition at the output of gate 90 and a logic 1 condition at the output of gate 93, properly steering the flip-flops 970 and 972. If any one of the ETX, ETB, SOH, STX or carriage return codes are found within the first block of storage at the valid location, flip-flop 970 is reset concurrently with flip-flop 972 being set. The message to unload search is considered complete and we now enter the unload index state. The unload index state defines that the first unload position to be unloaded by the unload control will be the index location. In Mode II operation, flip-flop 970 looks for the presence of a valid message to unload and samples only the index location looking for a marker bit uniquely defining the beginning of the message at the index location to be a message which has been marked for unloading to the output device. In Mode II operation, it is sufficient for flip-flop 970 to sample only the marker bit at the index location and the face that NULLM code is not present. The absence of the null code indicates that a code is present at the index position and under the constraints of Mode II operation that code must uniquely be a start of message code. These conditions are fulfilled when the signal line DM2MTU is set to a logic 0 condition indicating that the inputs to gate 96 are all at a logic 1 condition fulfilling the requirements to reset flip-flop 970 and 972. Gate 96 requires that the following inputs be set to a logic 1 condition; DM1, indicating that the logic is steered in Mode II operation, CIDXUC, indicating that the current access location is the index location, DNULLM, indicating that the current access location does not contain a null code, and CRR7 indicating that the current access location has a marker bit. The logic 0 condition on line DM2MTU caused by gate 96 forces a logic 1 condition at the output of gate 89 which is sampled by TS7 pulse through gate 91 and inverter 92. Logic 1 conditions are therefore applied to the input of gate 90 forcing a logic 0 at the output of gate 90 and a logic 1 at the output of gate 93 steering flip-flop 970 to be reset and flip-flop 972 to be set. Once flip-flop 970 is reset and flip-flop 972 set, the unload index occurs.

In Mode I, the unload control waits until the index location is reached before an unload operation begins. The unload index flip-flop 972 may be inactive waiting for the index location to occur for 512 or more character locations (512 times 8 microseconds). In Mode II operation, flip-flop 972 is set for only 1 microsecond because the search of flip-flop 970 occurred only at the index location. The index location is now ready to be unloaded. Flip-flop 984 in FIG. 9*n* is set at the index location when flip-flop 972 is set in Mode II or at the index location when flip-flop 972 is set to a 1 when index occurs in Mode I. Flip-flop 984 defines an unload to occur.

Flip-flop 984 controls the transfer of information from the recirculation register into the output silo register. Flip-flop 984 is set when the conditions at gate 97 are fulfilled. These conditions are; CIDXUC set to a 1 indicating that the index location is the current access location, CUI set to a 1 indicating that flip-flop 972 is set to a 1 and the index location is to be unloaded, CTS7 set to a 1 indicating TS7 has occurred and the transfer of information from the recirculation register to the output silo register and the transfer of the unload position marker into the recirculation register is to occur at the next time slot. When the conditions at gate 97 are fulfilled, a logic 0 at the output of gate 97 forces a logic 1 condition at the output of gate 98 for 1 bit time sufficient to clock flip-flop 984 into a set condition at the trailing edge of CCLKUC setting flip-flop 984 for 1 microsecond. If the current mode of operation is Mode I, then gate 99 (FIG. 9*o*) becomes active upon the setting of flip-flop 984 during the unload index state forcing a 1 condition at signal DRR9K via gate 100 and inverter 101 clearing any marker bit present in the marker bit location of the access word stored at the index location via gates 3, 4 and 5 properly steering flip-flop 912 of FIG. 9*b* into a reset condition. Conditions necessary at the input of gate 86 to clear the marker bit present at the index location require that inputs to gate 86 be set to a logic 1 condition. These inputs are, CUI; indicating that flip-flop 972 is set to a 1 indicating that an unload index condition is present, CM1 set to a 1 indicating Mode I operation, and CLOSRS set to a 1 indicating that flip-flop 984 is set to a 1. This event occurs concurrent with the activation of gate 102 (FIG. 9*l*) causing the activation of gate 43 (FIG. 9*g*) forcing a logic 0 condition at the signal line DDR1J input to FIG. 9*a*. The output of NOR gate 2 forces a logic 1 condition at the set input of flip-flop RR1 and a logic 1 condition at the reset input of flip-flop RR1 thereby steering flip-flop RR1 to be set and causing the insertion of a marker bit equivalent to the unload position marker at the marker bit location of the access word N + 1. Thus, flip-flop 984 in conjunction with flip-flop 972 inserts the unload position marker into storage.

As the index location is unloaded from the recirculation register into the output silo register, flip-flop 972 is reset and flip-flop 974 is set concurrently by the same clock pulse (by virtue of gate 102, FIG. 9*l*, sampling flip-flop 972 and 984). Flip-flop 974 designates the unload mode where the unload position is uniquely designated by the unload control marker present within a data string. Simultaneously with the setting of flip-flop 974, flip-flop 978 in FIG. 9*l* is also set by gate 102 via gate 103. Flip-flop 978 defines the unload marker field where the search for the unload position marker will occur. The control line OSRA in FIG. 9*l* indicates that the output silo register is available and the fact that physical unload operation to occur where information is transferred from the recirculation register to the output silo register. As the mode of operation progresses from the set condition of flip-flop 972 to the set condition of flip-flop 974, an unload position marker is inserted into the recirculation register via signal line RR1J by virtue of gate 102 acting through gate 43 forcing DRR1J to a logic 0. As flip-flop 974 is set, the unload control attempts to continue unloading information into the output silo register as long as the output silo register can take characters.

Flip-flop 984 controls the transfer of information from the recirculation register to the output silo register under the conditions of flip-flop 974 being set and an unload mode in progress. Gate 104 via gate 98 (FIG. 9*n*) controls the setting of flip-flop 984 in an unload mode initiating the transfer of information into the output silo register. Conditions required to transfer information via the action of gate 104 are; flip-flop 978 set to a 1 forcing CUME to a logic 1 condition and setting up the corresponding input to the logic gate 104 indicating that the unload marker field envelope designates the current access location to be an unload access location, CTS7UC set to a 1 indicating that time slot 7 has occurred and that the marker bit location of the current access word should be sampled, CRR7 set to a 1 indicating that the current access location has the corresponding marker bit set to a 1 indicating that this access location is an unload location, CUM set to a 1 indicating that flip-flop 974 is set to a 1 and an unload mode is in progress. In addition to the conditions for setting flip-flop 984, a logic 1 is transferred via inverter 105 to the CUPM signal line indicating that the current access location is the unload position marker location. The action of setting flip-flop 984 forces a 1 on the signal line CLOSRS which is transferred to gate 106 (FIG. 9*o*) to set up conditions to activate signal DRR1J1 to insert the marker bit into the access location N + 1 at recirculation register RR1.

Concurrent with the activation of DRR1J1, signal line DRR9K is also active forcing the marker bit at access location N to be reset by virtue of the gate 107 acting through gate 100 and inverter 101 (FIG. 9*o*) upon gate 4 and inverter 5 of FIG. 9*b* setting up conditions to reset flip-flop RR9 and thus clearing the marker bit from the access location N. Conditions required for gate 107 to be in an active, or logic 0, condition requires the following inputs to be at a logic 1 condition; CLOSRS indicating that flip-flop 984 has been set and that the output silo register is to be loaded from the current access location of the recirculation register, input DEOW indicating that flip-flop 986 is reset, and the output of gate 108 caused by input DUM indicating flip-flop 974 is set and flip-flop 976 is reset. Flip-flop 978 controls the unload marker field of search monitoring the availability of the output silo register to accept characters and the accessability of the unload marker field within the recirculating storage media. During the unload mode, that period of time defined by the set condition of flip-flop 974, flip-flop 978 is reset when gate 109 (FIG. 9*l*) is active and has a logic 0 at the output thereof forcing a logic 1 condition at the output of gate 110 which, in conjunction with the remaining inputs to gate 111, forces a logic 1 condition at the output of gate 111, thus forcing a logic 1 condition at the output of gate 112 and at the K input to flip-flop 978, defining the end of the unload marker field for the current unload sequence and resetting flip-flop 978. This requires the inputs to gate 109 to be set at a logic 1 condition; input CUM indicating that flip-flop 974 is set and an unload mode is in progress, and input DOSRA set to a 1 indicating flip-flop SS1 in FIG. 9*x* is in a set condition and that the output silo register is completely filled with information. Under these conditions the output of gate 109 is forced to a logic 0 forcing the output of gate 110 and the corresponding input to gate 111 to be at a logic 1 condition. The remaining inputs to gate 111 must be at a logic 1 condition in order to force a logic 0 at the output of gate 111 and a logic 1 at the input of the reset side of flip-flop 978, the output of gate 112. This requires that the following inputs be at a logic 1 condition; CTS7UC indicating that time slot 7 has occurred and the marker bit location of the current access word can be sampled for the determination of the existence of an unload position marker, and CRR7 indicating that the current access word contains the unload position marker. The resetting of flip-flop 978 deactivates the unload control until the index location is found and a new unload marker field of search is determined. The setting of flip-flop 978 to initiate a new unload operation requires that gates 113, 114 and 103 be active such that the J input of flip-flop 978 is set to a 1 steering that flip-flop into a set condition. This requires that the input DUM to gate 97 be set at the logic 0 condition indicating that flip-flop 974 is set and an unload mode is in progress, forcing the logic 1 at the output of gate 113 into its respective input to gate 114 which, in conjunction with the input CIDXUC set to a logic 1 indicating that the current access location is the index location and input CTS7UC set to a 1 indicating that time slot 7 has occurred, activates gate 114 forcing a logic 0 upon its output and forcing a logic 1 condition at the output of gate 103 and steering flip-flop 978 to be set to initiate a new unload marker field. The unloading of information from the recirculation register into the output silo register and the transfer of the unload position marker is now dependent upon the availability of the output silo register and is placed under the control of flip-flop 984 reentering the sequence previously discussed to transfer information into the output silo register. If the output silo register is unavailable, flip-flop 978 will be reset upon finding the unload position marker under the conditions of the output silo register being unavailable, thereby deactivating the unload control logic awaiting until flip-flop 978 is again set to redefine the unload marker field. As soon as the end character of a message block is retrieved from the delay line, flip-flop 976 is set and flip-flop 974 is reset.

The final end condition occurs in Mode I when an ETB or an ETX code is retrieved from the first block of storage or if an ETX or ETB code does not exist in the first block of storage, when the first carriage return, SOH or STX code occurs in the last 85 character locations of the first block. The retrieval of the final end code ETB or ETX is sensed by gate 115 FIG. 9*k*. Transferring this condition to gate 11 sets up the conditions that the reset side of flip-flop 974 and the set side of flip-flop 976 steers these flip-flops into the proper state such that CUM moves to a logic 0 condition indicating the end of the unload mode of operation and CCSP moves to a logic 1 condition indicating the initiation of a clear status pending condition. Logic gate 115 requires the determination of an unload position marker indicated by the logic 1 condition of the input CUPM as determined by gate 104 and inverter 105 (FIG. 9*l*) indicating that the current access location of the recirculation register contains a final end code. In Mode I operation, the unload marker bit is advanced into the location following the ETX or ETB code if that was the code that signified the end of the message retrieval.

The setting of the marker bit at access location N + 1 in Mode I operation, is performed by the action of gate 117, FIG. 9*l*. Gate 117 samples input CM1 requiring that it be set to a logic 1 condition indicating Mode I operation and that the input CCSP be set to a 1 indicating that flip-flop 976 has been set forcing a logic 1 condition at the output of gate 113 which, in conjunction with gate 106 under the conditions that CLOSRS be equal to a 1 indicating that flip-flop 984 is set to a 1 since the current unload is a normal unload operation and that flip-flop 986 be set to a 0 indicated by the input DEOW equivalent to a logic 1, forces the logic 0 condition at the output of gate 106 at the signal line DRR1J1. The logic 0 condition on signal line DRR1J1 forces the insertion of a marker bit at flip-flop RR1 in the recirculation register. The unload position marker at access location N is removed from storage by virtue of the signal line DSCP set to a 1 at the input of gate 108 indicating that flip-flop 976 is set which in conjunction with the other inputs to gate 107 discussed hereinabove, forces a logic 0 condition at the output of gate 107. The logic 0 condition at the output of gate 107 forces a logic 1 condition at the output of gate 100 which forces a corresponding 0 condition at the output of inverter 101 at signal line DRR9K. The logic 0 condition on signal line DRR9K forces recirculation register RR9K to be cleared, thus purging the old unload position marker from memory and inserting the new unload position marker into memory at the location following the final end code. If the carriage return, SOH, or STX code was retrieved which signified that a message partition was occurring in Mode I, then the unload control marker bit remains at the access location where that code was located. In this manner, by leaving the marker bit at the location where a message was partitioned, that code is preserved to be used as a start of message code in the next retrieval or of the second partition of that message.

This is accomplished by setting flip-flop 986 while simultaneously setting flip-flop 976. Flip-flop 986 in its interaction with the gates forming the signals DRR1J and DRR9K, inhibits the initiation of these two signals thereby inhibiting the propagation of the marker bit from the access location N to access location N + 1. In this mode of operation, flip-flop 986 is set by action of the signals DUAPSX or DUAPCR going to a logic 0 state. These signals are formed in FIG. 9*l* and are the result of gate 118 acting through inverter 119 acting upon gates 120 or 121. Gate 118 and inverter 119 form the automatic partitioning enable signals required to stop the unload mode at this point. Conditions required to present a logic 1 condition at the output of gate 119 are; CM1 at a logic 1 condition indicating Mode I operation, DDAP at a logic 1 condition indicating that latch DAP comprising cross-coupled gates 122 and 123 (FIG. 9*m*) is reset and automatic partitioning is to occur, and C427E at a logic 1 indicating that the present access location is within the last 85 character locations of block 1. Gate 120 senses that the current access location contains a carriage return code and gate 121 senses that the current access location contains either the SOH or STX code. Either gate 120 or 121 outputs at a logic 0 condition applied to gate 124 in FIG. 9*n* set up conditions to set flip-flop 986 causing CEOW to go to a logic 1 condition. A logic 1 condition on CEOW inhibits gates 106 and 107 (FIG. 9*o* from actively moving the signal DRR1J1 and DRR9K through their respective gates to a logic 0 condition, thereby inhibiting the transfer of the unload position marker from the access location N to the access location N + 1. Simultaneously with the setting of flip-flop 986, flip-flop 978 is reset forcing CUME to a logic 0 condition and DUME to a logic 1 condition thereby signifying the end of the unload operations upon the unload position marker. If automatic partitioning was occurring due to a carriage return then the activation of the signal DUAPCR to a logic 0 condition acts upon gate 116 in FIG. 9*k* to reset the flip-flop 974 and set flip-flop 976, respectively. The action of forcing CCSP to a logic 1 condition and CEOW to a logic 1 condition concurrently causes the output of gate 125 (FIG. 9 *n*) to go to a logic 0 condition upon signal line DEETB thereby forcing an ETB code to be inserted into the output silo register via the gating matrix shown in FIG. 9*x*.

Concurrent with the setting of flip-flop 986, flip-flop 984 is also set via the DUPM input signal to gate 98 causing CLOSR signal to go to a logic 1 due to the action of the reset side of flip-flop 984 acting upon gate 126, setting up conditions to set flip-flop SS1 in FIG. 9*x* and enabling conditions for the gate array at the top of FIG. 9*x* to load the ETB code into the output silo register first bank in conjunction with the signal DEETB at a logic 0. If the flip-flop 986 was set by action of the signal DUAPSX at a logic 0 condition indicating that the automatic partitioning was occurring in an SOH or STX code, then gate 127 in FIG. 9*k* would become active due to the application of a logic 1 on the CEOW line as a result of the setting of flip-flop 986 and the application of the logic 1 at gate 127 from the set condition of flip-flop 974 forcing flip-flop 976 to be set via the logic 0 applied at the output of gate 127 forcing a logic 1 condition at the output of gate 116, thereby resetting flip-flop 974 and setting flip-flop 976 while concurrently placing the logic 0 on signal line DEFS and inserting the ASCII code FS into the input of the output silo register. CLOSRS would concurrently be at a logic 1 level due to the concurrent setting of flip-flop 984 with flip-flop 986. Flip-flop 986 is reset when the automatic partitioning is done at the carriage return time by the interaction of flip-flop 984 applied to the input of gate 128 acting through gate 129 to set up the reset conditions for resetting flip-flop 986. In this situation where the partitioning is done on the carriage return, flip-flop 974 was reset concurrent with the setting of flip-flop 986, thereby forcing a logic 1 condition at the input to gate 128 via signal DUM causing flip-flop 986 to be set for only one time slot duration and completing the sequence of encoding the ETB code. When flip-flop 986 is set due to the action of the signal DUAPSX indicating the automatic partitioning on an SOH or STX code, flip-flop 974 and 976 are set via the interaction of gates 128 and 129 and the set condition of flip-flop 986, causing gate 128 to be inactive and forcing flip-flop 986 to be set for a period of time greater than 1 time slot and overlapping the set condition of flip-flop 976. In this case, the signal DEETB formed through gate 125 is at a logic 0 condition for the duration of the overlap of flip-flop 986 and flip-flop 976 being set to a logic 1 condition. However, the actual ETB code is inserted via the logic 0 applied to the DEETB signal line when the signal CLOSR moves to a logic 1 condition by the action of gate 130 acting through gate 126, thereby activating the signal CLOSR, inserting the ETB code into the output silo register and setting up the conditions to set flip-flop SS1 and simultaneously causing conditions to be applied to the reset input of flip-flop 986 via gate 129 to reset flip-flop 986 and terminate the unload operation. The activation of gate 130 requires that the inputs to that particular gate be set at a logic 1 condition. These inputs are; CEOW indicating the setting of flip-flop 986, CTS7 indicating time slot 7 has occurred and COSRA indicating that the output silo register can currently accept another code. As flip-flop 974 is reset, flip-flop 976 is set, the unload control position marker no longer signifies the next location to be unloaded. Rather it now signifies the end of that field of information which began at the index location and was unloaded to the output device. This marker bit is now a control position marker signifying the end of the field of information to be cleared if the information has been accepted by the output device and successfully transferred or recorded.

In Mode II operation, where the information is assumed to be loaded in pre-blocked data format, the unload control marker which was present at the location of the final end code, ETX or ETB, is expunged from memory. The reason for expunging the unload position marker is that the next code expected to be found in memory, if there is a code in memory, should be the start code for the next message. The marker bit at this location is used for accounting purposes to designate information which is to be unloaded to the output device by inserting a marker bit at the start of message code which uniquely defines a start of message. That location would either be the index location or a start of message code which is preceded by an end of message code. By dropping the unload marker bit from memory, the possibility of ambiguously setting the marker location at the start of message code location for a subsequent message block which may be waiting for the input device to acknowledge that that information is to be sent out to the output device is avoided.

In this particular case the setting of flip-flop 976 and the resetting of flip-flop 974 occurs via gate 115 acting upon gate 116 setting up the condition for setting and resetting the respective flip-flops in a manner similar to the discussion hereinabove relative to Mode I operation. Clearing the marker bit from memory occurs via the interaction of gates 108, 107, 100 and 101 (FIG. 9*o*) by applying a logic 0 to signal DRR9K in the same manner as previously described. At the completion of the retreival of the ETB, ETX code signal, DRR1J1 remains at a logic 1 condition, inhibited by the action of gate 117, FIG. 9*l*. This is because the terminal, when in Mode II, has an inhibit signal applied by virtue of a logic 0 on the CM1 input line thereby effectively inhibiting gate 117 and failing to set up conditions for gate 106 via signal CUMICS to insert the new marker bit.

In summary, the operation of the flip-flops 970 and 972 can be summarized as follows:

Flip-flop 970 is initially set to define a message to unload search. When a message to unload is found, flip-flop 972 is set and flip-flop 970 reset to uniquely define an unload operation to occur at the index location. Once the unload occurs at the index location, a normal unload mode is initiated inserting the unload position marker into memory. As locations are available in the output silo register, information is retrieved from memory during the unload mode until a final end code is found. Once the final end code is found and retrieved from memory, the SCM goes into a clear/status pending mode waiting until it is determined whether or not the output device wants a transfer of the information which was just given to it or, if a successful transfer has occurred, the output device requests that information be cleared from memory and the next message partition to be transferred if it is available.

Once the clear/status pending mode is entered, if the output device requests another data transfer, the SCM can go directly into the unload mode index state. In Mode I operation, going from the clear/status pending condition into the unload index condition requires any marker bits which may interfere with the unique separation of the unload and load marker fields to be expunged from memory. This requires that the unload position marker which was left in memory as a clear control position marker be located and sampled to find out if it is coincident with the load position marker. Coincidence can occur when the unload field ends at the next load position. This would occur in the case of retrieving the last character of a message block and that last character of a message block was the last character entered into memory. In that particular case, the marker bit which was the first marker bit relative to the index location moving forward in memory would be coincident with the load position marker and that location would be the location of a null code, the null code signifying the absence of any data in memory at that location.

To assure that in Mode I operation the clear control position marker will not be confused with a load position marker, the unload marker field envelope flip-flop 978 differentiates the field of search for the unload position marker by moving in conjunction with the load position marker similar to the Mode I unload mode operation, thereby defining the area of storage to be searched for the unload position marker so that it can be expunged from memory while transferring into the unload index condition. This requires the activation of gate 131 in FIG. 9*m*, thereby applying a logic 0 to the input of gate 132, a logic 1 condition to the input of gate 133, a logic 0 condition to the input of gate 134 and causing a logic 1 condition to be applied at the set input of flip-flop 982. Flip-flop 982 applies a logic 1 to the CCCFF output and a logic 0 on the DCCFF output. This causes the activation of gate 100 (FIG. 9*o*) thereby causing a logic 0 to appear at the DRR9K signal output for 1 time, sufficient to clear the marker bit from memory. Conditions required to set flip-flop 982 require that all the inputs to gate 131 be set to a logic 1 condition. These inputs are; CUME indicating that flip-flop 978 has been set allowing the search for the unload position marker to occur, CUCOBS indicating that an unload control output block status has been presented by the interface to be acted upon requesting the transfer of the message block for subsequent retransmission to the output device, DIFC3 differentiating the status command code repeat output block from start output block as transferred by the interface to the unload control, and CRR7 indicating that the current access location contains the unload position marker.

It is further required that the signal CLIP be set to a logic 1 resulting from the output of gate 135, FIG. 9*s*, due to the application of a logic 0 on the signal CNULLM input signifying that the current access location contains a valid data code or by the application of a logic 0 at the output of gate 136 due to the reset condition of flip-flop 993 acting through inverter 137 concurrent with a logic 1 condition on the signal input CBSLC. The signal input CBSLC originates from gate 138, FIG. 9*u* due to a logic 0 applied at the input of gate 138 as a result of signal DISO4 set to a logic 0 condition indicating the absence of a command control code such as backspace, forward step, or line cancel to be operated upon or a logic 0 due to the absence of the DC3 code indicating a forward stop operation via gates 139 and 140. Since flip-flop 982 was set at the trailing edge of the TS7 signal, flip-flop 980 remains reset and the signal at the output of gate 141, DRI, remains at a logic 1 condition. Since flip-flop 980 is reset and flip-flop 982 is set, a logic 1 condition is applied to both inputs of gate 142, FIG. 9*k*, forcing the output of gate 142 to a logic 0 condition. The output of gate 142 is applied to gates 143 and 93 setting up the proper conditions to insure that on the next clock pulse flip-flop 976 is reset, flip-flop 970 remains reset and flip-flop 972 is set thus transferring the terminal from a clear status pending condition to a unload index condition. Activating gate 143 such that a logic 1 condition is applied at the signal CRCSP causes a logic 1 to be applied at the reset input to flip-flop 982 consequently resetting that particular flip-flop. In this particular mode of operation, flip-flop 982 is set for 1 bit time and 1 bit time only.

In Mode II operation, the transfer from clear status pending mode to unload index condition may occur as soon as the decision has been made to retrieve the information stored a second or subsequent time. This is achieved by gate 144 sampling for logic 1 condition on inputs DM1, indicating Mode II operation, DIFC3 indicating repeat output block operation, and CUCOBS indicating an unload control output block status command has been issued by the interface. A logic 0 is thus produced at the output of gate 144 which is applied to the inputs of gates 143 and 93 setting up conditions for resetting flip-flop 976, setting of flip-flop 972 and assuring that flip-flops 970 and 982 are maintained in the reset condition.

If a clear operation is to occur while flip-flop 976 is set, a command code indicating that the information is to be cleared will set flip-flop 980 (FIG. 9*m*) when the index location is reached. This occurs by virtue of gate 145 becoming active, the output thereof being applied to the input of inverter 146 forcing a logic 1 at the set input to flip-flop 980, beginning the clear operation. Thus the setting of flip-flop 980 requires a logic 1 to be applied to the inputs of gate 145 to begin a clear operation. The following signals must be at a logic 1 condition; the output of gate 147 due to the application of a logic 0 at signal line DIFC3 which differentiates the command clear output block from the command repeat output block, CUCOBS indicating that an unload control output block status has been initiated fulfilling the requirements of gate 73 (FIG. 9*j*) as set forth hereinabove, and CIDXUC indicating that the current access location is the index location. The setting of flip-flop 980 applies a clear signal to the recirculation register via gate 100 and inverter 101 applying a logic 0 to the signal DRR9K, thereby forcing a clear operation at the input of flip-flop RR9 of the recirculation register. In order to complete the clear operation and reset flip-flop 980 it is required to first set flip-flop 982 defining the end of the unload field clear operation. This is accomplished via gate array 148 (FIG. 9*m*) which requires the following input conditions; DM1 at a logic 1 condition indicating Mode II operation, and CEBXN at a logic 1 condition indicating that the last code cleared was an ETX or an ETB final end code forcing a logic 0 at the output of gate array 148 which is applied to the input of gate 134 setting up the conditions to set flip-flop 982. In Mode I operation, the conditions required are a logic 1 condition at CM1 input indicating Mode I operation and a logic 1 condition at the input CCR7 indicating the clear unload control position marker has been found causing a logic 1 at the output of gate 134 and forcing flip-flop 982 to be set.

In addition, gate 149 is activated to set up gate 141 to apply a logic 0 signal to the DRI output for repositioning the index location. In Mode II operation, gate 141 is set up by virtue of setting flip-flop 982, gate 141 additionally requiring that signal input CTS7UC be set to a logic 1 indicating that time slot 7 has occurred and the application of a logic 1 from the Q, or set output of flip-flop 980 indicating that flip-flop 982 is set concurrent with flip-flop 980 terminating a clear input block operation. Applying a logic 0 signal at the output of gate 141 to signal line DRI resets flip-flops FF1 through FF10 in FIG. 9*r* to the corresponding index locations. Gate array 150, FIG. 9*k* sets up the conditions for simultaneously setting flip-flop 970, resetting flip-flop 976, resetting flip-flop 980 via the signal line CSMTUS and via the activation of the output of gate 143 to a logic 1 condition, applying a logic 1 to signal line CRCSP to reset flip-flop 982. The logic conditions required to complete the output block clear operation and enter a message to unload search mode and exiting the clear status pending mode require the following states at the input to gate array 150; CCLR2 and CCCFF at a logic 1 condition indicating that a clear operation is in progress and that flip-flop 982 has been set signifying the completion of the clear operation and that either a logic 0 be applied to input signal DTS7 or to signal DM1 signifying that either a Mode I operation is in effect in which case gate 150 may immediately set flip-flop 970, reset flip-flop 976, reset flip-flop 980 and 982 or, in Mode II operation, to wait until the signal TS7 occurs signifying the completion of the clear of the last word of the output block, permitting the proper setup of the aforementioned flip-flops.

Flip-flop 980 thus defines a clear operation which begins at the index location and ends at the end of the unload field. The unload field ending in Mode I is uniquely defined by the first marker bit which is found after the index location. In Mode II, the end of the field of information to be cleared is uniquely defined by the first end code which is reached relative to the index location. In Mode I operation, when the first bit is found, flip-flop 982 is set for one bit time to clear out the marker bit. This stretches the clearout so that it clears the first bit of the next memory word. The coincidence of flip-flops 980 and 982 being set defines the reset conditions for flip-flops 980, 982, 976 and 970 in Mode I. In Mode II, since the end of the field of information to be cleared is uniquely defined as the first final end code found in the first block of memory relative to index, once the final end code is cleared out, the clear operation stops, flip-flop 976 is reset and flip-flop 972 is set.

Flip-flop 982 again is set when the final end code is found and stretches the clear operation out such that the final end code is cleared out. The sampling is done on the word as it still stored memory and the clear operation has to clear that end code out of memory so that in this particular case, flip-flop 982 would be set for a full word time or 8 microseconds and would not clear out the marker bit location of the next word memory since that marker bit location would uniquely define whether or not the next code in memory is a start of message code which now must be retrieved to the output device. After a clear operation when flip-flop 976 has been reset, flip-flop 970 is set and searches for another message to unload. In Mode I operation, the search is initiated at the final position where the clear operation was ended and within the next pass of the delay line it will be determined whether or not there is another message to unload. At the last location which was cleared during a message clear operation, a pulse RI (via gate 141) is initiated (FIG. 9*m*) which repositions the index reference location. The repositioning is accomplished by resetting the tracking counter. The tracking counter is reset to the index location and, thus, the index is repositioned for the delay line. The new index location is that location following the last location cleared during the message clear operation.

In Mode II operation, the message is searched for the reoccurrence of the index so a full revolution of the delay line must occur in Mode II before the next message to unload can be sampled. The act of repositioning the index location causes the next message in buffer to start at the new index location so that sampling for a marker bit defining a message to unload would have to occur at the new index location. It should be noted that flip-flops 970, 972, 974 and 976 change state on the trailing edge of the clock and are set and reset concurrently. For example, flip-flop 970 is reset and flip-flop 972 is set on the concurrent edge of a concurrent clock pulse. When going from flip-flop 976 to flip-flop 972, or resetting flip-flop 976 while setting flip-flop 972 the flip-flops are reset on the same edge of a clock pulse. Flip-flops 970, 972, 974 and 976 define the field of search, the first location to be unloaded, the normal unload mode and the clear status pending, respectively. The clear status pending definition enables information already retrieved from an output device to be retrieved again. If it was not required to have the capability of retrieving information again, data being unloaded could have been cleared from memory as each word was extracted from memory. In this case, each character, or word, that was unloaded would define the new unload position and the unload position marker would move around memory one character position at a time as unloading occurs. Flip-flop 978 in FIG. 9*l* defines the unload marker field. This flip-flop is used at any time flip-flop 974 is set to a 1 and is used in practically the same manner in Mode I and Mode II while the unload operation is occurring. Flip-flop 978 is set at index location and reset whenever the unload position occurs and there is no room available in the output silo register. In Mode I, this flip-flop is used in the clear status pending mode in the current unload mode of operation to assure that the unload position marker remaining in memory is not confused by the load control with the load position marker. When flip-flop 976 is set to a 1, flip-flop 974 is set to a 0. Flip-flop 978 is always set at index location and reset at the first marker bit that occurs relative to the index location. As set forth hereinabove, flip-flop 980 (FIG. 9*m*) is the clear control flip-flop and flip-flop 982 a sub-control flip-flop when clearing which defines the end of the clear operation. Flip-flop 982 is used to clear the marker bit in Mode I when going from from a clear status pending to an unload index (flip-flop 976 going from a 1 to a 0 and flip-flop 972 going from a 0 to a 1).

Flip-flop 984 (FIG. 9*m*) is used in both Mode I and Mode II and controls the transfer of information from the recirculation register to the output silo register on a word by word basis. Flip-flop 984 is active when flip-flop 972 is set to a 1 and when flip-flop 974 is set to a 1. It is not active when flip-flop 976 is set to a 1. There are three conditions for setting flip-flop 984.

The first one (gate 97) effectively says that at TS7 time when flip-flop 976 is set at the index location, flip-flop 984 will be set on the next clock edge for only one bit time and defines the control signals which load the output silo register and the control signals which insert the unload position marker. Flip-flop 984 is then used when flip-flop 974 is set to a 1, whenever an unload position marker is located and the output silo register has the ability to accept one more character. A signal on line UPM (FIG. 9*l*) would require that flip-flop 974 be equal to a 1 at TS7 time and that the first output silo register location be void of information. The third condition (gate 151) for setting flip-flop 984 is when the SCM is in a message to unload search in Mode II operation and a marker bit is present in index position and it is desired to unload the index position. This unique event occurs when flip-flop 972 goes to a 1 and flip-flop 984 goes to a 1 concurrent therewith. The duration of flip-flop 984 in this particular event is equal to the duration of flip-flop 972. Flip-flop 986 is only used in Mode I operation. This flip-flop is set and whenever it is desired to encode an output word from the recirculation register for loading into the output silo register. Flip-flop 986 defines that the word in the recirculation register is going to be substituted with a new word in the output silo register. No information is changed in the delay line or at the recirculation register. All information is changed at the output silo register.

Initially, the first condition which sets flip-flop 986 to a 1 would be if there was an absence of an SOH or an STX code at the index location when slip-flop 972 was set to a 1 and index was being unloaded. This occurs when a message which was inserted from the keyboard has been automatically partitioned and a character which would be present at the index location would be expected to be a carriage return or a new line code signifying that we have partitioned a message and the first partition has already gone to the output device. A start code is substituted for the carriage return code and sent to the output device to start the next data transfer. Flip-flop 986 would next be set to a 1 when an SOH, STX or a carriage return code is found in the last 85 character locations of the first block of memory. If the carriage return code is located, flip-flop 986 would be set to a 1 (via DUAPCR) for only 1 bit time concurrent with flip-flop 984 and would be used to encode an ETB code into the output silo register. In this particular event, flip-flop 984 would go to a 1, flip-flop 986 would go to a 1, flip-flop 974 would go to a 0 and flip-flop 976 would go to a 1 concurrently. The word which would be inserted into the output silo register would be an ETB code. Flip-flops 984 and 986 would both go to a 0 concurrently on the next trailing edge of the clock so both flip-flops in this particular event would only be set to a 1 for 1 microsecond. The next possible event which would result in the setting of flip-flop 986 would be when an automatic partitioning was occurring at a location where an SOH or an STX code was present (via DUMAPSX). In this particular case, finding an SOH or an STX code at a location where an automatic partition is to be done, flip-flops 984 and 986 would be set concurrently, and flip-flop 974 would remain a 1 until the trailing edge of flip-flop 984 and then flip-flop 974 would be set to a 0. Flip-flop 984 would be set to a 1, for only one microsecond. Flip-flop 986 would remain set and flip-flop 976 would be set on the trailing edge of flip-flop 984. The SCM then waits until the output silo register is capable of taking one more word. Flip-flop 986 when it is set concurrent with flip-flop 984 defines an encoding of an FS code into the output silo register. The FS code tells the output device that the message has been automatically partitioned at an SOH or STX code, the FS code effectively telling the output device that this is a delineator of the end of address field. It is necessary to give the output device a special code here in order to uniquely maintain the integrity of the SOH or STX code since in the next partition of the message which is transferred the integrity of that particular code may be lost. Flip-flop 986 remains at a 1 during the set period of flip-flop 976 until the output silo register is capable of taking another character. The control signals are then clocked to the output silo register with TS7 gating flip-flops 976 and 986 to encode an ETB code at the output silo register. The ETB code tells the output device that message partition has been completed. Concurrently with the encoding of the output silo register with an ETB code, flip-flop 986 is reset, the SCM being now in the normal clear status pending mode, the transfer of data to the output device being completed as the SCM waits for the status of the message.

As described hereinabove, FIG. 9*o* shows two control signals, RR1J1 and RR9K, which control the transfer of the unload position marker into the recirculation register. Multiplexed in with these two signals are signals from the load control which also cause the transfer of the load position marker. Output line RR1J1, synchronously sets the RR1 flip-flop via the DRR1J output line of FIG. 9*a*. RR9K, the second output line, synchronously resets the RR9 flip-flop as shown in FIG. 9*b*.

FIGS. 9*p* – 9*r* are the schematic logic diagrams of the tracking counter. The gating arrangement for defining the index location, block 1 (B1) and location 513 decoders is shown in FIG. 9*p*. L513 is the 513th count defining the first character of block 2 relative to index, index being considered the very first location. B1 defines the field of the first 512 characters relative to the index position. The index location is chosen not to occur coincident with B1 by virtue of gate 251. In other words, B1 is only up for 511 character locations. It defines location 2 through 512 with index referencing location 1 and L513 referencing location 513 in memory. FIG. 9*q* is the basic time base circuitry for generating the system clocks. The input to this figure is the 2 megahertz oscillator which is counted down into the various clocks used to control both the SCM and the other modules. The basic clock for the SCM is DCLK. The phase relationship of the clocks and also the timing of the clocks is illustrated in the timing waveform shown in the lower left-hand corner of the figure. DCLK is 250 nanoseconds wide with a 1 microsecond period. DSC1 and DSC2 are the bus clocks used for interfacing the modules, their period being 16 microseconds, 180 degrees out of phase, and 500 nanoseconds wide. CTS7 is a 1 microsecond pulse recurring every 8 microseconds. CTCE is the tracking counter enable signal. DTCS is the tracking counter sample pulse, a pulse that samples the tracking counter outputs.

FIG. 9*r* shows an asynchronous fast carry serial type counter. The first five stages, FF1–FF5, operate synchronously and the last five stages, FF6–FF10, move asynchronously with a synchronous reference defined by gate 253. Gate 253 decodes the set condition of flip-flops FF2 through FF5, setting up FF6 to toggle on the 1 to 0 transition of FF1, Q output, synchronizing FF6 through FF10 transitions to FF0 transition. This permits FF6 through FF10 to ripple asynchronously while FF2 through FF5 is asynchronously rippling to decrease the total settling time of the counter. Latch 990 defines signal 427E which in turn defines the last 85 character locations in either block 1 or block 2. Gate 255 decodes locations 427 and 939 to set latch 990. It is used in block 1 to find the field of search for automatic message partitioning (location 427 through 512 inclusive). It is used in block 2 to define the buffer full location during Mode I operation (location 939 through 1024 inclusive). Line CL1023 is used to define the buffer full location for Mode II operation by virtue of the decoding gates 253 and 257, decoding locations 1023 and 1024. Signal DI513 is defined by gate 259 and represents the multiplexed signals DL513 and DINDEX. Flip-flop FF10 demultiplexes DL513 and DINDEX from DI513 on FIG. 9p gates 261 and 263.

Figure 9D:
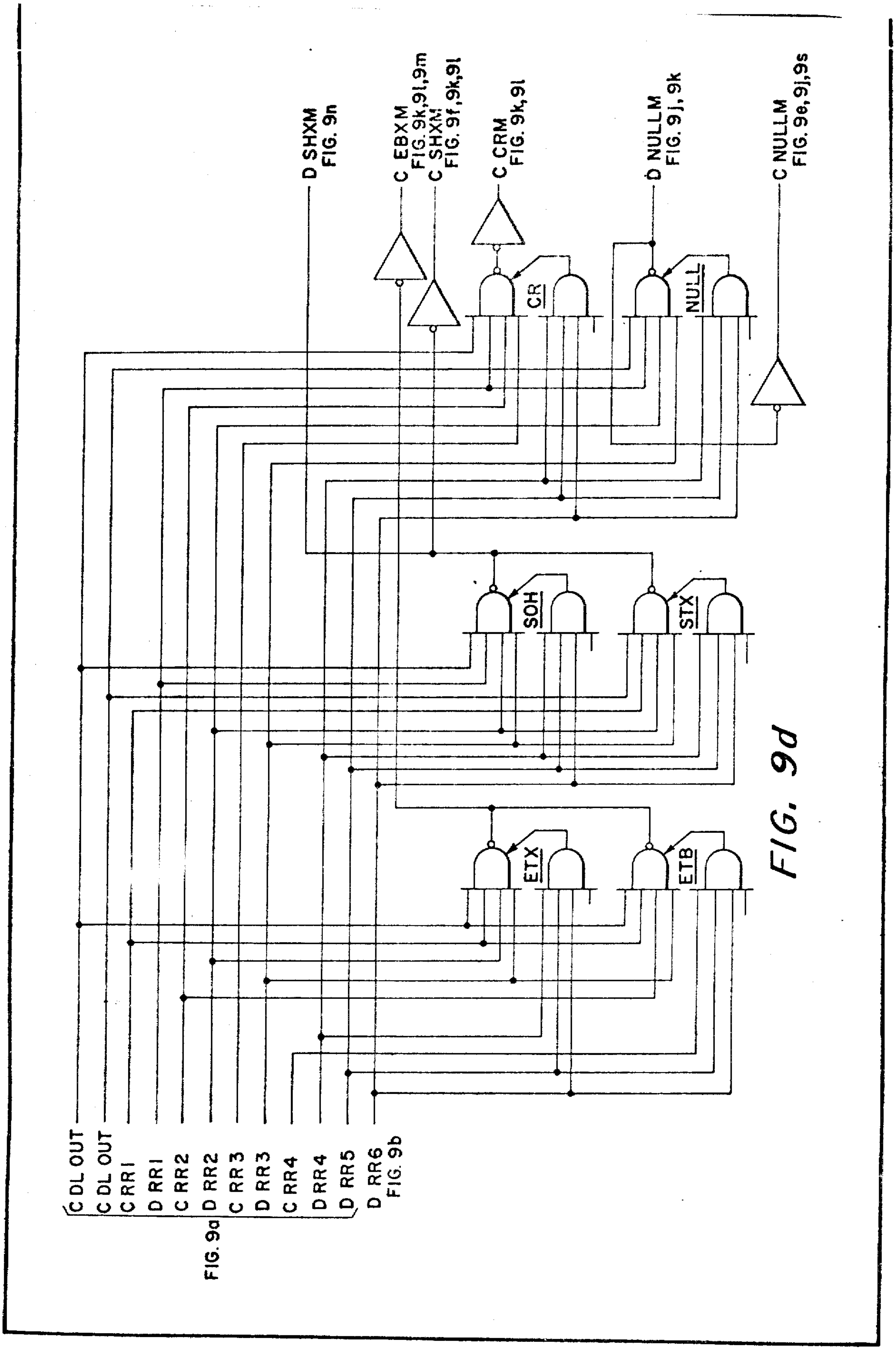
Figure 9T:
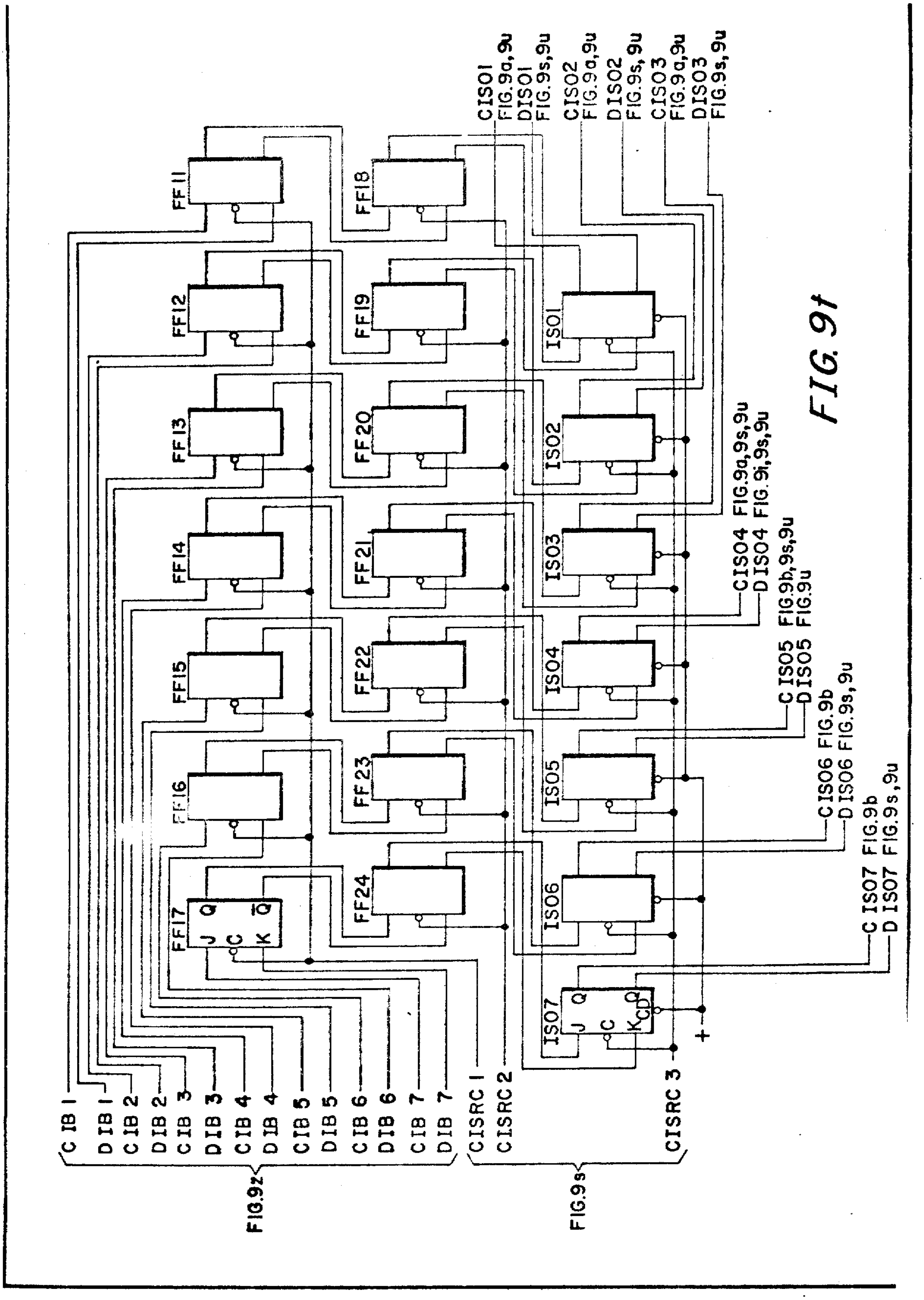

FIGS. 9s – 9u are the schematic logic diagrams of the input silo register. Referring to FIG. 9s, three control flip-flops 991, 992 and 993 for indicating whether a particular bank of the input silo register is loaded is shown. CLISR is a signal indicating that there is information on the input bus which must be loaded into the input silo register. CLISR is clocked by DCLK and sets flip-flop 991. Simultaneously, CLISR is clocked to line CISRC1 via gates 994 and 995 and the information is clocked into the first bank of the register. If flip-flop 991 is set to 1 and if flip-flop 992 is at a zero, gate 996 goes to ground setting up a set condition for flip-flop 991 via inverter 997, and setting up gate 998 to activate line CISRC2. Line CISRC2 strobes information from the first bank to the second bank of the input silo register. On the subsequent clock cycle, flip-flop 992 is set to a 1, and flip-flop 991 is reset to a 0.

Referring to FIG. 9t, the second bank of the input silo register, or flip-flops FF18 through FF24, is clocked. FF11 to FF17 are not acted upon because the action in resetting flip-flop 991 effectively says that there is not valid information within registers FF11 through FF17. The fact that flip-flop 992 is set says that there is valid information within flip-flops FF18 to FF24. Information is propagated into flip-flop 993 in the same manner, flip-flop 993 being reset when information is unloaded from the input silo register and loaded into the recirculation register. Flip-flops 991, 992 and 993 indicate where information is present and considered valid and stable within the input silo register. Once a code is inserted into FF11 to FF17, the code propagates down into flip-flops ISO1 to IS07. When all three control flip-flops are set to a 0, the first code inserted in the input silo register will cause the first three banks to be filled with the same code. However, only one control flip-flop will be set to a 1 in any given time, and that control flip-flop will define where the information that is considered to be valid and stable is located. Three characters may be loaded into the silo in sequence and the input silo register is considered to be self steering wherein it loads information one behind the other synchronous to clock.

Flip-flop 999 in Mode I operation is used to differentiate a line cancel code. This is done by decoding the line cancel code at flip-flops IS01 to IS07 at gate 152, setting flip-flop 999 and then sampling the next code for a carriage return. If the next code is a carriage return, a line cancel operation is initiated. If the next code is not a carriage return, flip-flop 999 is reset and nothing more is done since a line cancel operation is not going to be initiated.

FIG. 9t is a schematic diagram of the input silo character storage registers. Twenty-one flip-flops representing three character storage, each character being seven bits is shown. The way the flip-flops are arranged, FF11 to FF17 represent one character of storage in the first bank of the input silo register. FF18 to FF24 represent the second bank of the input silo register and one character's worth of storage. IS01 through IS07 represent the third bank of the input silo register and one character's worth of storage. ASCII code information coming from the CCU bus is clocked into FF11 through FF17 and then propagates from there into the next band FF18 to FF24 and finally into the output bank, IS01 to IS07. Lines IS01 to IS07 represent the input silo register outputs and the information which is designated to be loaded into the recirculation register.

FIG. 9u represents decoders which decode the word in the third bank of the input silo register and sample lines IS01 through IS07 looking for various control codes. EBXIS represents the decoded output when either an ETB or an ETX code is present in the input silo register and decoded at gate array 153. CNLC represents the decoding of a new line code as decoded by logic array 153 and 154 and gates 155, 1012 acting upon gate 156. The CNLC signal is true whenever we have an ETB, ETX, SOH, STX or CR in the input silo register which is ready for loading into the delay line. The new line code CNLC is decoded because whenever a series of backspace operations has been done and it is desired to insert a new line code into memory, it is necessary to make sure that the code is inserted into a vacant storage location. CNLC is available for the load control logic so that it knows that a sequence of forward step operations must be performed until a vacant location of storage is found for proper insertion of a new line code. CISR9 is an encoding bit used to tell the load control that a special buffer subroutine is going to be occurring. The decoders defining CISR9 contain a decoder for the ASCII DC3 code (gate 139) which is used to define a forward step operation. CISR9 is true when a backspace operation (gate 157) is to be performed and is also true whenever a line cancel operation in Mode I is to be done. The carriage return (gate 155) used in the line cancel operation has to be distinguished from a carriage return which is a new line code. Gates 1010 and 1012 differentiate between a new line code and a line cancel sequence. The control signal LCDE (from flip-flop 999, FIG. 9s) defines whether the carriage return code is part of a line cancel or a normal new line code. BSLC (gate 138) is a control signal which indicates backspace (gate 157) or line cancel.

Figure 9V:
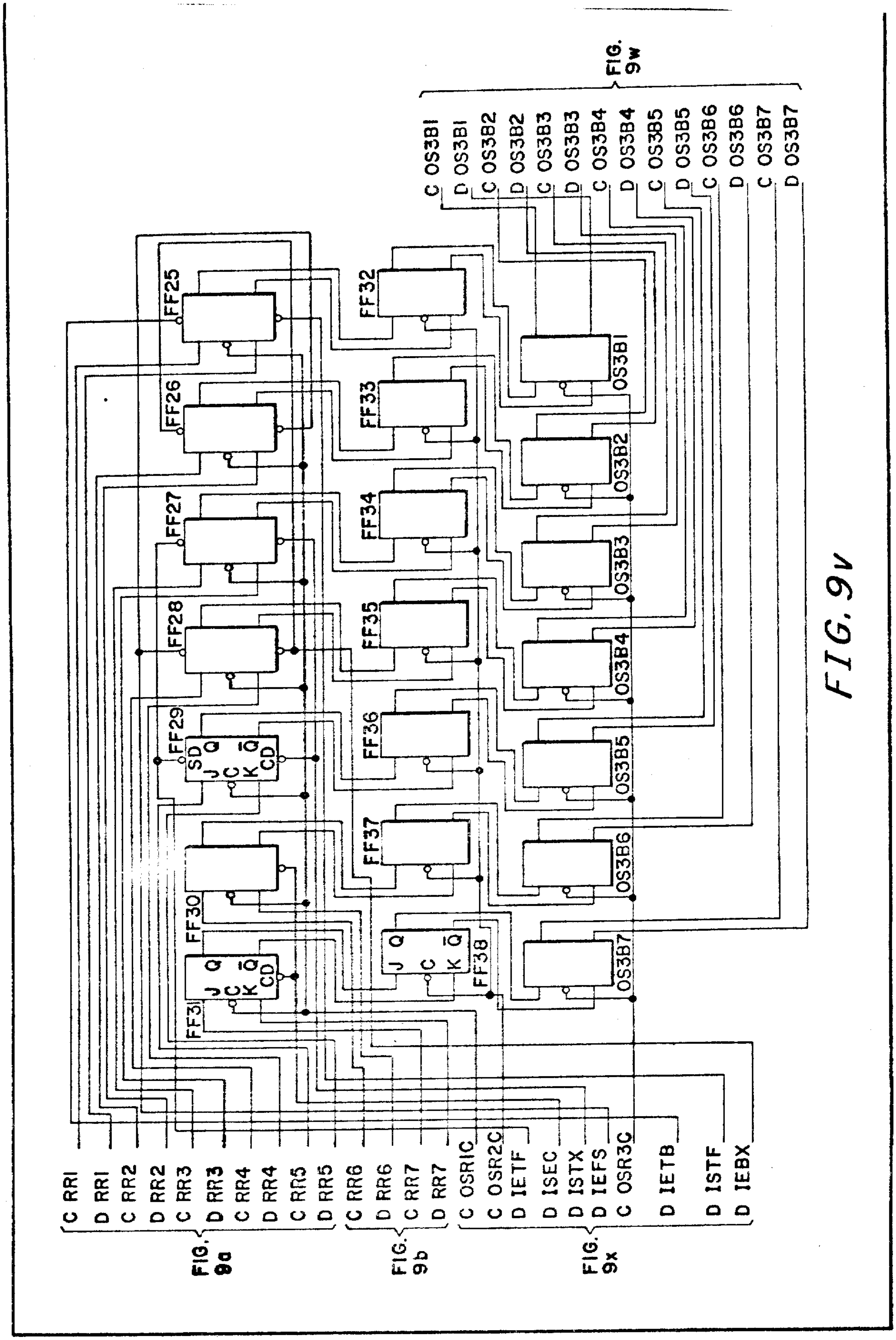
Figure 9W:
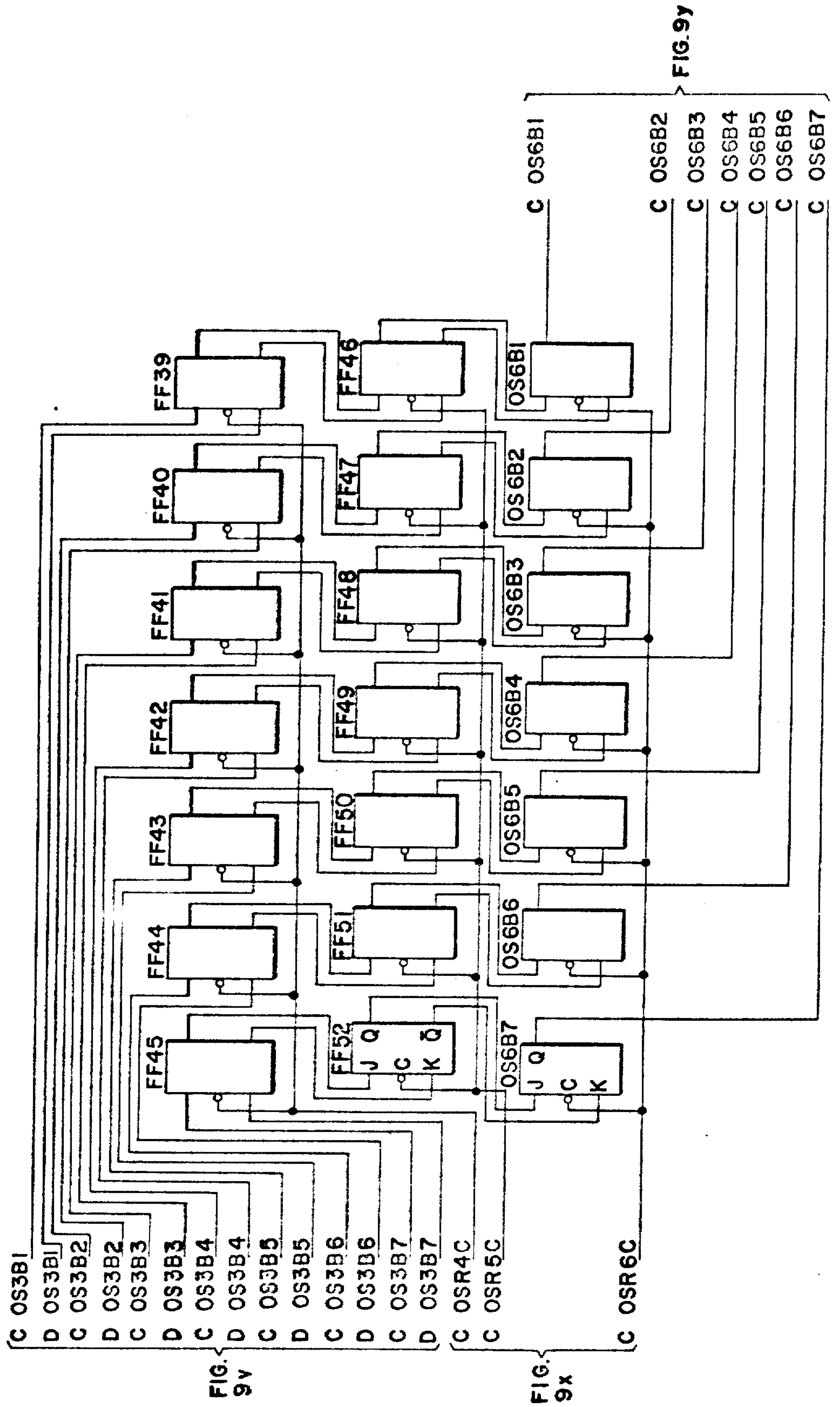

FIGS. 9v – 9x are the schematic logic diagrams of the output silo register. FIG. 9v shows the first three stages of the output silo register. The flip-flop configuration is very similar to that of the input silo register. FF25 to FF31 represent the first bank of the output silo register, asynchronous set and reset signals being utilized. The encoding of ETB, FS and STX is done on flip-flops FF25 through FF31 at the asynchronous inputs via gate array 265, FIG. 9*x*. Activating signals DESTX, DEFS or DEETB with the signal CLOSR causes either the ASCII code STX, FS or ETB code to be respectively asynchronously loaded into the register defined by FF25 through FF31. As the asynchronous load operation is initiated, FF25 through FF31 synchronous clock input COSR1C is inhibited by the encoding signal DESTX, DEFS or DEETB at gate 267, thus avoiding an ambiguous register set up. FF32 to FF38 represent the second bank of the output silo register and flip-flops OS3B1 to OS3B7 represent the third bank of the output silo register.

FIG. 9*w* illustrates the remaining three banks of the output silo register, the fourth bank comprising FF39 to FF45, the fifth bank comprising FF46 to FF52 and the sixth bank comprising OS6B1 to OS6B7.

FIG. 9*x* is the schematic diagram of the control register for controlling the transfer of information from bank to bank of the output silo registers. Flip-flop SS1 represents the control register for the first bank, flip-flop SS2 the control flip-flop for the second bank, SS3 the control flip-flop for the third bank, etc. The propagation of information to the output silo register occurs in a manner similar to propagation of information to the input silo register. The unload control logic transmits a load output silo register pulse LOSR to the output silo register which is one microsecond duration (1 bit time), and which is clocked by the 1 megahertz clock CLK and sets up flip-flop SS1 when it is at zero for transfer of information into the first bank. Data is presented to the first bank of the output silo through the synchronous input of FF25 through FF31 via signals CRR1, DRR1, etc., or through the asynchronous inputs via the encoding signals DESTX, DEFS, or DEETB acting upon FF25 through FF31 via gate array 265. A control register, composed of SS1 through SS6, propagates the data to the sixth rank of the output silo register where it is available for transfer to the output device. The output silo stacks the data unloaded from the recirculation register in temporary storage for transfer to the output device. Gates 269 through 277 sample the states of flip-flops SS1 through SS6 providing the steering pulses to control the silo tracking register and strobe data into the appropriate bank of the silo. Signals COSR1C through COSR6C are the synchronous clock inputs to silo bank 1 through 6, respectively, strobing data from one silo bank into another. As data is transferred to bank 2 from bank 1, gate 269 is activated steering SS1 into a reset condition, SS2 into set condition and enabling gate 279 to pass DCLK through signal line COSR2C strobing data into bank 2 from bank 1. Resetting SS1 and setting SS2 is equivalent to defining valid data in bank 2, and invalid data in bank 1. Movement of data to bank 3 is then dependent upon the presence of valid data in bank 3. If SS3 is set, further propagation of the data word is inhibited until SS3 is reset indicating that silo bank 3 does not contain valid data, having been previously passed to bank 4. In a similar manner, using steering gate 271, developing strobe signal COSR3C, the data will propagate from bank 2 to bank 3, and in a similar fashion, eventually enter the silo bank 6, accessible and available for transfer to the output device. When information is unloaded from the output silo register, it is unloaded from the sixth bank of the output silo register and an unload output silo register pulse USOR is presented to flip-flop SS6. USOR is clocked by the one megahertz clock CLK. Unloading the silo sixth bank by resetting SS6, causes the silo tracking register to propagate the next data bank into the output stage (bank 6). Operating as described herein, the output silo can stack 1, 2, 3, 4, 5 or 6 data words as required, for transfer to the output device. The output silo can be expanded to match the maximum data rate of the fastest output device to translate the access time of the recirculating memory into an acceptable output device data rate. The output silo also allows the output device to work at a variable data rate as long as it is below the maximum silo data rate.

FIGS. 9*y* – 9*gg* are schematic logic diagrams of the interface. FIG. 9*y* is a schematic diagram of the output transfer gates to transfer information from the output silo register to the output bus gate array 158. Encoding gate array 159 encodes output commands and transfers them to the output bus in response to a SCM poll.

FIG. 9*z* shows isolation gate array 160 to isolate the input bus from the input loading requirements of the interface decodes. Decoding gates to decode various signals from the input bus are also shown. The first of these is SCMPL, gate 161, which decodes the SCM poll code. For the particular implementation of the preferred embodiment of the present invention, the following code structures were defined. To define the SCM poll code: DI9, DI8 and DI7 equal to a logic 0 state, these three bits uniquely defining the remaining six bits of the input code as being a poll code, DI6 and DI5 equal to a logic 0, an arbitrary selection, DI1 through DI4 containing the unique four bit device address signifying this poll code is the SCM poll code with DI4, DI3 and DI2 set to a logic 1 condition and DI1 set to a logic 0 condition. EM, gate array 162, is a two input decoder decoding entermode codes. Entermode code is defined by the application of a logic 0 at DI9 and a logic 1 at DI8. SC is a three input decoder, gate array 163, decoding a status command code. The status/command code is defined by setting DI9 and DI8 to the 0 state and DI7 to the one state. ATS is a two input decoder, gate 164 decoding an ASCII-to-store code. An ASCII-to-store code is defined by setting DI1 to a logic 1 condition and DI8 to a logic 0 condition. These four decoders are general decoders decoding the general types of input signals that will occur on the input bus.

FIG. 9*aa* illustrates interface status command decoders. The first is CD, the character demand decoder, gate 165, which produces a signal CDSC. The character demand code is issued by the output device demanding a character from the SCM. The character demand status code is defined by the four bit status command code represented by the inputs DI1 and DI6 in conjunction with the proper bits on input DI7 through DI8. The following 6 bit code sequence defines the status command character demand; DI6, DI5, DI3 and DI1 set to a logic 0, DI4, DI2 set to a logic 1. The next two decoders produce output signals COROB and CIBSU, the result of multiplexing the decoding of various status command codes. COROB represents the multiplexing of the clear output block and repeat output block status/commands. Clear output block command is a request by the output device for the next block in memory. COROB is decoded by the interaction of gates 166 and 167. The following six bit code structure defines a repeat output block status command; DI6, DI5, DI3, DI2 and DI1 set to a logic 0, and DI4 set to a logic 1. The following six bit code represents a clear output block status command: DI6, DI5, DI3, DI2 set to a logic 0, DI4 and DI1 set to a logic 1. The repeat output block command is the request by the output device to repeat the last block which was transferred to the output device once again. CIBSU represents the multiplexing of the clear input block command and the start of the unload command. The clear input command requests the load control logic to clear the input block which was transferred to the SCM. The start unload command is the request by the input device to the load control logic to transfer the device to the output device. These multiplex commands are differentiated by one another by the least significant bit of the input code. A decoding of the status command codes clear input block and start unload forming the multiplexed signal CIBSU is decoded by the interaction of gates 166 and 168. The following code structure defines a start unload command: DI1, DI5, DI4, DI2 and DI1 set to a logic 0, and DI3 set to a logic 1. The code structure DI6, DI5, DI4, DI2 set to the logic 0, DI3 and DI1 set to the logic 1 defines the clear input block command code.

The output CRIB represents the decoding of the carriage return code on the input bus at gate 169 interacting with gate 166. It is used in conjunction with the output CANIB to decode the cancel code on the input bus. Logic array 170 is used to decode the ASCII cancel code. These two codes represent a two code sequence for a line cancel code. The interface must decode the line cancel code just as the load control logic must decode the line cancel code. The interface has to tell the input device to cease sending data to the SCM while the line cancel operation takes place. Since these codes are stored in the input buffer, a small amount of time may transpire between initiation of the line cancel operation and the period of time at which the next character can be received by the SCM. Consequently the interface must hold up the input device until line cancel operation is completed. The line cancel operation can take anywhere from 16.4 milliseconds to upwards to a 0.5 second in the implementation. The next output HTABN represents the decoding of a horizontal tab. A horizontal tab code is decoded so that the interface by the interaction of logic gates 166 and 171, can decide whether or not to accept the horizontal tab code. EBXIB represents the decoding of an ETX or ETB code on the input bus by logic array 172. The ETX or ETB code is used in Mode II operation to enable the interface to tell when the end of the input block is completed and the status of the input block to be transferred by the input device. The EBXIB code is also used in decoding the image of the code transferred from the SCM to the output device as it reflects on the input bus to tell when the completion of an output block has been transferred to the output device in order to define the end of a block. Once the end of block is transferred the SCM expects to see a clear output block or repeat output block status command from the output device and will respond to no other command from the output device.

FIG. **9*bb* shows a cross-coupled latch and a flip-flop. The cross-coupled latch 1020 is used to store the SCM mode of operation as defined by the entermode command. The entermode command code structure is defined as follows: DI1 set at a logic 0, DI8 set at a logic 1, DI7 a don't care condition, DI6 a special bit used to define the print mode of the printer where a logic 1 condition indicates a low speed print mode or a compositional type data entry from the keyboard to the printer with a logic 0 condition indicating a high speed print mode where the printer is going to be the primary output device taking information at a very high rate, DI5 is that particular signal which tells the SCM which load and unload method is to be employed in the data transfer between the input device and the output device with logic 1 indicating Mode I operation and a logic 0 indicating Mode II operation, DI1 through DI4 contains a 4 bit address of the device in which the mode has been entered and designated an an output device. Gates 173 and 174 control the setting of the cross-coupled latches of gate array 1020, sampling the entermode command from the input bus and determining by virtue of the setting of input bit DI5 whether Mode I or Mode II operation is in effect. Both gates 173 and 174 are strobed by the signal input CSC2IF representing the SC2 clock used to synchronize the decoding of input words. CIB5 represents the buffer DI5 input and when a logic 1 is applied via the CIB5 input to gate 173, it indicates that the mode of operation is going to be Mode I. DIB5 is the complement of CIB5 and when set at a logic 1 condition at the input of gate 174 steers the cross-coupled latch 1020** such that it is reset, forcing a Mode II indication at the DM1 and CM1 signal lines.

IGISP is a flip-flop which has a dual function dependent upon the mode of operation. In Mode I operation, IGISP stores the fact that a low speed print mode is in process so that horizontal tab codes can be ignored by the interface. The gate array 175 determines in Mode I operation the setting or resetting of flip-flop IGISP. CEM input to 175 must be a logic 1 condition indicating that entermode is in progress. CIB5 and CIB6 must both be at a logic 1 condition indicating that there is a low speed print mode and load method I operation in order to set up conditions via gate 176 to set flip-flop IGISP. If either CIB5 or CIB6 are set at a logic 0 condition indicating that either a high speed print mode or a load method II operation is requested by the input device, logic array 175 at the initiation of an entermode command via gate 177 will reset IGISP. In Mode II operation IGISP stores the fact that an ETX and ETB code has entered the input silo register and latches the interface such that it will not respond to anything from the input device other than a clear input block or start unload status command.

Flip-flop IGISP is set at the application of a logic 0 signal at the input to gate 176, DIDSC consequently setting up the J input to flip-flop IGISP to steer it in a logic 1 condition. DIDSC originates from gate 178, FIG. **9*cc* and is a result of a logic 1 condition upon the following inputs; CSC indicating that a status command code is present at the input bus, CCIBSUF indicating that that status command code is either a clear input block or a start unload status command code, and DM1 indicating that Mode II operation is in effect and flip-flop IFC2S is in a reset condition indicating that all previous status command codes issued to the input device have been completed. Flip-flop IGISP is reset in Mode II operation when the signal input to gate 177, DIDR, is set to a logic 0 condition forcing a logic 1 at the K input to flip-flop IGISP steering the flip-flop in a reset state. DIDR originates in FIG. 9*cc* from gate 179** requiring the following inputs to be at a logic 1 condition; CXOUT indicating that flip-flop 180 (FIG. 9*ff*) has been set and that a response is being issued by the SCM to the store status command code, CIS102 originating from FIG. 9*ff* as a consequence of a logic 0 being applied to gate 181 by either DIS1 or DIS2 indicating that the load control has completed an input device status command code and the load control status is available for transfer to the input device, and CIBSR (FIG. 9*ee*) generated at the output of gate array 182. Gate array 182 requires the following inputs to form a logic 1 condition at the output CIBSR; CIFC2S set to a logic 1 indicating that flip-flop IFC2S has been set to a logic 1 condition and an input device status command code is therein stored, DCRF set to a logic 1 indicating that flip-flop CRF, FIG. 9*ff*, is reset and a status command is being issued, CISRV set to a logic 1 indicating that the input silo register is vacant and DM1 set to a logic 1 indicating that the current mode of operation is Mode II and either CISC4S set to a logic 0 indicating that an output status command code is not available having priority of response over the input status command code or CIFC3S set to a logic 0 indicating that if the status command code does exist for the output device, that status command code is a clear output block status command code. The response to the input device may be satisfied by the response to the output device or the input from inverter 183 is a logic 0 condition indicating that the input to inverter 183, CUS123 is set at a logic 1 condition as a result of the gate 184 (FIG. 9*dd*) having a logic 0 applied to one of its three inputs via the signal DUS1, DUS2 or COSRV indicating that if an output device is being responded to, the output device status command code is also pertinent to the input device.

FIG. 9*cc* shows two flip-flops IFC1S and IFC2S which buffer the status command codes which are presented to the SCM in Mode II operation from the load control. In Mode I operation, these two flip-flops are used to control the buffer full/buffer available responses to the input device during the line cancel sequence. When the cancel code is decoded at the SCM interface, IFC1S is set. The IFC1S flip-flop is set by virtue of gate 185 when the inputs thereto fulfill the conditions that CCANIB is set to a logic 1 indicating that the current code on the output bus is a cancel code, CATS is set to a logic 1 indicating that the cancel code is an ASCII to store code and that CM1 is set to a logic 1 indicating the current mode of operation is Mode I operation, each of these signals set as previously described. This enables the next code to be sampled to see whether or not it is a carriage return. If the next code is a carriage rturn, IFC2S is set via gate 186 requiring a logic 1 on input CIFC1S, CR1B, CATS, CM1. With IFC1S and IFC2S both set to a 1 the SCM interface sends a buffer full status command and resets IFC1S via gate 187 storing the fact that the buffer full command was sent. Once the input silo register has been vacated of all information indicating that the line cancel operation has been completed by virtue of the storage contained in these two flip-flops, a buffer available command is then set to the input device to tell it to resume transfer of information and IFC2S is reset via gate 188. In Mod II operation, status command codes that clear the input block and start the unload command are decoded and then inserted into these two flip-flops to be reencoded and transferred to the load control to steer the load control in the operation it has to perform.

FIG. 9*dd* shows three flip-flops pertinent to the output block transfer. IFC3S and IFC4S are flip-flops which store the status command code representating the status of the output block and reencode these for control of the unload control. These two flip-flops store the clear output block and repeat output block commands until the unload control completes the operation and then these two flip-flops control the response to the bus. The OBSP flip-flop stores the fact that an ETX or an ETB code has been sent by the SCM to the output device, set via gate array 189, and ensures that the SCM will not respond to any more output block commands other than a clear output block or repeat output block command. This flip-flop is reset when the SCM interface response is generated for the appropriate output block command via the gate array 190 with interacting gate 184.

FIG. 9*ee* shows a flip-flop BFL which indicates a buffer full condition for the generation of buffer full status command code to the input device when a buffer full has occurred at the delay line. This flip-flop is set when a buffer full command is issued via gate array 191 and reset via gate array 192 when the buffer available command has been issued. The gates at the tope of the figure, gate arrays 182, 191, 193 and 194 are transfer gates which dictate the hierarchy of events in terms of responding to the SCM poll. Specifically, in Mode I operation, these gates, gate array 194 for the input device and gate arrays 191, 193 and 195 for the output device, insure that when the two status command codes are issued the output device will be serviced first since that device is considered to be the fastest device in the data transfer. In Mode II operation, these gates will ensure that the input device is the first device honored under the conditions of the status command code pending for both the input and the output device. In Mode II operation, the input device is considered to be the fastest device in the data transfer.

FIG. 9*ff* shows three flip-flops, RTPOL, XOUT and CRF, which control the SCM;s response to the poll. Flip-flop RTPOL stores the fact that an SCM poll has been issued and the SCM is about to respond to the poll as determined by gate array 196, sampled by CSCMPL at gate 197. The SCM poll is sampled at SC2 tim via inverter 198 and gate 190 and the decision is made at that time to respond to the poll. The RTPOL flip-flop is set for 8 microseconds when responding to the poll. The XOUT flip-flop is set and reset at SC1 time via inverter 201 and gate 203 and has a period of 16 microseconds. This flip-flop gates the information out to the output bus from the SCM. XOUT also transfers either a status/command code or an ASCII code to the output device. Flip-flop CRF stores the fact that a character demand has been issued by the output device and ensures that the ASCII code to the output device will be the first response issued by the SCM.

FIG. 9*gg* shows buffering circuits 205 to gate out a clear signal into various reset signals for SCM loading constraints. Flip-flop MTURS controls the message to unload response to the poll after power and reset condition or after a ready to exit code has been issued by the SCM. MTUR is set when initial power is applied and reset when the first message to unload is sent from the SCM.

Figure 10A:
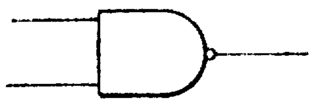
FIGS. 10*a* – 10*f* illustrate typical logic symbols utilized in the schematic diagrams of FIGS. 9*a* – 9*gg*.

Although every logic element and interconnection in the drawing has not been described in detail, given the detailed schematics and the interconnections thereof as set forth in the drawing one skilled in the logic art would be enabled to make and use the present invention. For the purposes of completeness, the symbols used to denote various logic functions in FIGS. 9*a* – 9*gg* are set forth in FIGS. 10*a* – 10*f*. FIG. 10*a* shows how a NAND gate is denoted in the logic circuits. When two logic 1 signals are applied to the inputs of this gate simultaneously, a logic 0 signal is generated at the output, otherwise the output is logic 1. A logic or binary 1 may be defined as +5 volts, for example, while a logic or binary 0 may be defined as ground.

Figure 10B:
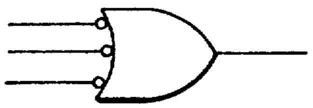
Figure 10C:
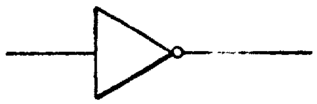
Figure 10D:
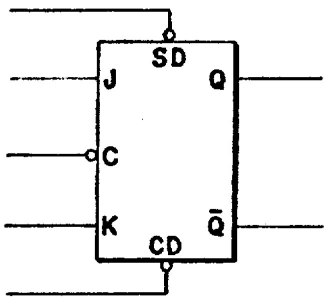
Figure 10E:
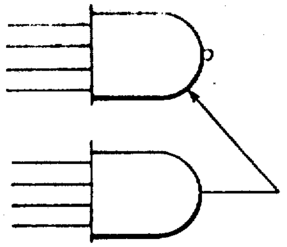
Figure 10F:
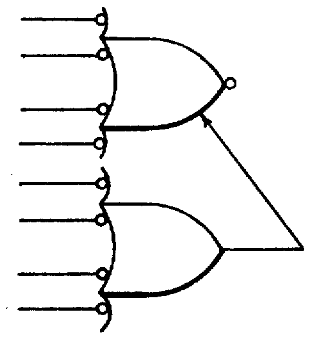

FIG. 10*b* shows a NOR gate. When logic zero signals are applied to all the inputs of the gate simultaneously, a logic 1 signal is generated at the output, otherwise the output is logic 0. FIG. 10*c* shows the symbol used in the logic drawings to provide an "inverter" function. FIG. 10*d* shows the symbol used in the drawings to designate a conventional flip-flop having three negated inputs, the J input conditioning the flip-flop to store a 1, the K input resetting or conditioning the flip-flop to store a 0, the SD input setting the flip-flop to store a 1 regardless of the condition of any other input, CD resetting the flip-flop to store a 0 regardless of the condition of any other input and C, an input normally from a clock, to enable the flip-flop. FIG. 10*e* shows a circuit used to add inputs to another NAND circuit and the connection from the second circuit to the first is made at other than a normal input or output of the first circuit. FIG. 10*f* shows a NOR gate with extended inputs in the manner described in FIG. 10*e*.

The logic symbols utilized throughout the logic diagrams are described in more detail in MIL-STD-806B, 1962, AIEE91-ASA Y32.14, 1962, and Xerox Corporation Drafting Manual sections DM 590.1 and DM 502.2, dated Sept. 23, 1969, which are incorporated by reference herein.

All inputs are from the left side of the drawing as it is viewed and all outputs are to the right side. The input and output lines have been labeled to indicate from what figure it was received and to what figure it is being sent, respectively. The symbols and circuits of FIG. 10 represent those chosen for use in the illustrative embodiment of the invention. The functions represented by the logic symbols can be realized by circuits of many forms obtainable from numerous manufacturers and all of which are well known in the art. Those skilled in the art will also realize that logical circuitry of the type shown has a certain overall input-output relation which can be duplicated using different arrangements of the same basic logical elements and furthermore, that this function can be realized using quite different types of logical elements which need not even be electronic. Merely as an illustration, it may be noted that AND/OR gates may be substituted for the illustrated NAND/-NOR gates and that it might even be possible thereby to simplify the described embodiment of the invention. In general, the designer will choose the type and design of his logical building blocks based on such considerations as cost, size, reliability, voltage and current requirements, speed, fan-in and fan-out capabilities, etc.

The control codes described hereinabove are standard ASCII control codes. For example, ETB represents the end of a transmission block, STX represents the start of the next material, ETX represents the end of text (message), and SOH represents the start of the address (or header) field.

The various signal leads shown in the logic diagrams described hereinabove are defined as follows:

DLIN = Delay Line Input
CRL = $(CR)_{(N-1)}$
SHXL = $(SOH + STX)_{N-1}$
EBXL = $(ETB + ETX)_{(N-1)}$
SHXM = $(SOH + STX)_N$
CRM = $(CR)_N$
NULLM = $(NULL)_N$
MILC = Method I Operation Load Control Distribution
NM = Access Location Vacant
SSCL = Access Location Vacant Preceded by New Line Code
LPM = Load Position Marker at Access Location
CLRLC = Clock Load Control Distribution
NAUNM = $(\overline{AUM}) + (\overline{NM})$
NLTS7 = (NULLM) (TS7)
SIC = Sample Entermode Command
SOM = Start of Message
CLR1 = Load Clear Operation
RR9J = Insert Marker Bit at Recir. Reg. 9—J Input
RCLR1 = Reset Load Clear Control Flip-flop
AXE = ASCII Transfer Enable
ISRXE = ISR to RR Data Transfer Enable
CSBS = Correction Sequence Buffer Subroutine
RR17J = Insert LPM at Location (N−1) at Recir. Reg. 17—J Input
RR1J = Insert LPM at Location (N) at Rec. Reg. 1-J Input
GSP = Generate Space Code
UISR = Unload Input Silo Register
FSCTS = Forward Step or Character to Store Operation
ICC = Input Command Process Complete
DEV·DWN = SCM Device Down Due to Overflow
OVFLW = Overflow
DIS2LC = $\overline{IFC2}$ Load Control Distribution
IDXLC = Index Load Control Distribution
BFLL = Buffer Full Load Control Latch
IS1 = Interface Status Bit 1
IS2 = Interface Status Bit 2
IS01L = IS01 Load Control Distribution
IS04L = IS04 Load Control Distribution
UCOBS = Unload Control Output Block Status
TS7UC = TS7 Unload Control Distribution
OCC = Output Command Process Complete
CLRUC = CLK Unload Control Distribution
US1 = Unload Status Bit 1
US2 = Unload Status Bit 2
IDXUC = Index Unload Control Distribution
M2MTU = Unload Method II Message to Unload
SMTUS = Set MTUS
MTUS = Message to Unload Search
UI = Unload Index
UM = Unload Mode
CSP = Clear Status Pending
RCSP = Reset CSP
MSTS7 = (MTUS) (TS7)
EFS = Encode File Separator
RUI = Reset UI
UMICS = (UM) + (M1) (CSP)
UME = Unload Marker Field
UAPCR = (UPM) (APE) (CRM)
UAPSX = (UPM) (APE) (SHXM)

UPM = Unload Position Marker
APE = Automatic Partitioning Enable
DAP = Disable Automatic Partitioning
RI = Reposition Index
CLR2 = Unload Clear Operation
CCFF = Clear Completion Cycle
EETB = Encode ETB
ESTX = Encode STX
LOSRS = Load Output Silo Register Signal EOW = Encode Output Word
LOSR = Load Output Silo Register
RR1J1 = Insert UPM at location (N+1) at Recir. Reg. 1—J Input
RR9K = Clear Store or UPM location (N) at Recir. Reg. 9—K Input
TCS = Tracking Counter Sample
CLK = 250 ns/750 ns 1MHz Clock
1MHZC = 1 Mega Hertz Delay Line Clock
TCCK = Tracking Counter Clock
TCE = Tracking Counter Enable
TS7 = Time Slot 7
SC1 = System Clock 1
SC2 = System Clock 2
L1023 = Location 1023
427 E = Last 85 Character Locations of a Block
I1 = Index
B1 = Block 1
IS01, . . . 7 = Input Silo Output Register 1, . . . 7
IS01, . . . 7 = ASCII B1, B7
OS3B1 . . . , 7 = Output Silo Register 3 Bit 1, . . . 7
OS6B1 . . ., 7 = Output Silo Register 6 Bit 1, . . . 7
ISTK = Insert STX
ISEC = Insert STX or ETB Code
IETB = Insert ETB
OSR1, . . . 7C = Output Silo Register 1, . . . on 7 Clock
OSRLD = Output Silo Register (7 implied) Loaded
OSRV = Output Silo Register Vacant
D1 - D7 = Output Bus Lines 1–7
IB1 - IB7 = I 1 through I 7 Buffered
SCMPL = SCM Poll
EM = Enter Mode Command
SC = Status/Command
ATS = ASCII to Store
CDSC = Character Demand Status/Command (S/C)
COROB = Clear/Repeat Output Block S/C
C1BSU = Clear Input Block/Start Unload S/C
CRIB = Carriage Return on Input Bus
HTABN = Horizontal Tab Not on Input Bus
EBXIB = (ETB + ETX) on Input Bus
CANIB = Character Code on Input Bus
IDSC = Input Device Status Command
IFC1S = Interface Control Register 1
IFC2S = Interface Control Register 2
ODRTX = Output Device Response Ready to Exit
LCBA = Line Cancel Buffer Available
IDR = Input Device Response
IFC2, . . . 4 = Interface Control Bit 1, . . . 4
IFC3S = Interface Control Register 3
IFC4S = Interface Control Register 4
OBSP = Output Block Status Pending
US123 = (US1) + (US2) + ($\overline{\text{OSRV}}$)
RSTOS = Reset Output Status
BFSR = Buffer Full Status Report
LCSR = Line Cancel Status Report
IBSR = Input Block Status Report
OBSR = Output Block Status Report
RBF = Report Buffer Full
BFL = Buffer Full Response Latch
CONLD = Continue Load Response
BARTX = Buffer Available or RTX Response
IS102 = (IS1) + (IS2)
CRF = Character Request Signal
RTPOLL = Respond to Poll
XOUT = Transfer Out
SC1IF = SC1 Interface Distribution
SC2IF = SC2 Interface Distribution
UOSR = Unload Output Silo Register
SCOUT = Status/Command Out
OSTBE = Output Silo to Bus Transfer Enable While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A data communications terminal including a storage device having a capacity of *n* encoded characters for serially storing information therein comprising:

data input means for producing input messages in the form of a plurality of characters each comprising a plurality of binary bits, means for serially loading each said message into said storage device, means coupled to said loading means for determining the number of characters in each message being loaded into said storage device, means coupled to said determining means for partitioning each input message into a smaller message block of *kn* characters when the number of characters in said input message is greater than a predetermined maximum block size, said maximum block size comprising *yn* characters and wherein $k \leq y < l$, and means for transmitting said stored message block of kn characters to a remote data sink, whereby *kn* characters of storage are made available in said storage device.

2. The data communications terminal as defined in claim 1 further including means for retransmitting said block of kn characters to said remote data sink if the initial transmission was received in error.

3. The data communication terminal as defined in claim 1 wherein said data input means comprises a keyboard and wherein said storage device includes a recirculating delay line.

4. The data communication terminal as defined in claim 2 wherein said data sink is a digital computer.

5. Apparatus for accessing and controlling a recirculating delay line having a capacity of *n* encoded characters for serially storing information therein, said recirculating delay line forming a portion of a data communication terminal, comprising:

data input means for producing input messages in the form of a plurality of characters each character comprising a plurality of binary bits, a recirculation register coupling said data input means to said recirculating delay line, said recirculation register serially loading and sensing each input message stored in said recirculating delay line, load control means for controlling the loading of said recirculating delay line by said recirculation register and for inserting position bit markers into storage locations in said recirculating delay line for delimiting the field of the data being stored therein, unload control means coupled to said recirculation register for inserting position bit markers into storage locations in said recirculating delay line for delimiting the field of data to be unloaded therefrom, and means for delimiting the location in said recirculating delay line for the initial entry of data therein, the unload control means unloading data between the initial entry location and the unload bit position marker stored in said recirculating delay line.

6. The apparatus as defined in claim 5 wherein said unload control means determines the number of characters in each message being stored in said recirculating delay line and automatically partitions each message into a smaller message of kn characters when the number of characters in said input message is greater than a predetermined maximum block size, said maximum block size comprising yn characters and wherein $k \leq y < l$.

7. The apparatus as defined in claim 6 wherein said unload control means transfers data within said field of search to an output device, said unload control means retransferring said data to said output device if the initial transfer of data was received in error.

8. A method of transmitting data between a data communication terminal and a data sink comprising the steps of:

producing input messages at said terminal in the form of a plurality of characters each comprising a plurality of binary bits, storing each input message in a storage device located at said terminal and having a capacity of $n$ characters, determining the number of characters in each message stored in said storage device, partitioning each stored input message into a smaller message block of $kn$ characters when the number of characters in said input message is greater than a predetermined maximum block size, said maximum block size comprising $yn$ characters and wherein $k \leq y < l$, and transmitting said stored block of $kn$ characters to said data sink, whereby $kn$ characters of storage are made available in the storage device of said first terminal.

9. The method as defined in claim 8 further including the step of retransmitting said stored block of kn characters to said data sink if the initial transmission of said kn characters was received in error.

10. A method for accessing and controlling a recirculating delay line having a capacity of n encoded characters for serially storing information therein, said recirculating delay line forming a portion of a data communication terminal, comprising the steps of:

producing input messages in the form of a plurality of characters, each character comprising a plurality of binary bits, coupling said plurality of characters to said recirculating delay line, serially loading and sensing each input message stored in said recirculating delay line, controlling the loading of said recirculating delay line, inserting position bit markers into storage locations in said recirculating delay line for delimiting the field of the data being stored therein, inserting position bit markers into storage locations in said recirculating delay line for delimiting the field of data to be unloaded therefrom, delimiting the location in said recirculating delay line for the initial entry of data therein, and unloading data between the initial entry location and the unload bit position marker stored in said recirculating delay line.

11. The method as defined in claim 10 further including the steps of determining the number of characters in each message being stored in said recirculating delay line and automatically partitioning each message into a smaller message of $kn$ characters when the number of characters in said input message is greater than a predetermined maximum block size, said maximum block size comprising $yn$ characters and wherein $k \leq y < 1$.

12. The method as defined in claim 11 further including the steps of transferring data within said field of search to an output device and retransferring said data to said output device if the initial transfer of data was received in error.

* * * * *

UNITED STATES PATENT OFFICE
CERTIFICATE OF CORRECTION

Patent No. 3,790,958 Dated February 5, 1974

Inventor(s) Joseph P. Hruschak et al.

It is certified that error appears in the above-identified patent and that said Letters Patent are hereby corrected as shown below:

Insert Figures 1c, 2, 2a, 3, 4, 5, 6, 7, 8, 9d, 9t, 9v, 9w, 10a, 10b, 10c, 10d, 10e, and 10f as shown on the attached sheets.

Signed and sealed this 15th day of October 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
U.S. GOVERNMENT PRINTING OFFICE 869-930